United States Patent
Hansen et al.

(10) Patent No.: US 12,486,318 B2
(45) Date of Patent: Dec. 2, 2025

(54) ANTI-GUANOSINE ANTIBODY AS A MOLECULAR DELIVERY VEHICLE

(71) Applicant: Yale University, New Haven, CT (US)

(72) Inventors: James Hansen, Guilford, CT (US); Jiangbing Zhou, Cheshire, CT (US)

(73) Assignee: YALE UNIVERSITY, New Haven, CT (US)

( * ) Notice: Subject to any disclaimer, the term of this patent is extended or adjusted under 35 U.S.C. 154(b) by 341 days.

(21) Appl. No.: 16/310,326

(22) PCT Filed: Jun. 15, 2017

(86) PCT No.: PCT/US2017/037753
§ 371 (c)(1),
(2) Date: Dec. 14, 2018

(87) PCT Pub. No.: WO2017/218824
PCT Pub. Date: Dec. 21, 2017

(65) Prior Publication Data
US 2019/0330317 A1     Oct. 31, 2019

Related U.S. Application Data

(60) Provisional application No. 62/350,419, filed on Jun. 15, 2016.

(51) Int. Cl.
| | | |
|---|---|---|
| *A61K 39/395* | (2006.01) | |
| *A61K 9/14* | (2006.01) | |
| *A61K 9/51* | (2006.01) | |
| *A61K 31/704* | (2006.01) | |
| *A61K 47/65* | (2017.01) | |
| *A61K 47/68* | (2017.01) | |
| *A61K 47/69* | (2017.01) | |
| *A61K 49/00* | (2006.01) | |
| *C07K 16/18* | (2006.01) | |

(52) U.S. Cl.
CPC .............. *C07K 16/18* (2013.01); *A61K 9/141* (2013.01); *A61K 9/513* (2013.01); *A61K 31/704* (2013.01); *A61K 47/65* (2017.08); *A61K 47/6843* (2017.08); *A61K 47/6907* (2017.08); *A61K 47/6929* (2017.08); *A61K 49/0002* (2013.01); *C07K 2317/24* (2013.01); *C07K 2317/565* (2013.01); *C07K 2317/569* (2013.01); *C07K 2317/622* (2013.01); *C07K 2317/626* (2013.01)

(58) Field of Classification Search
None
See application file for complete search history.

(56) References Cited

U.S. PATENT DOCUMENTS

| | | |
|---|---|---|
| 4,812,397 A | 3/1989 | Wesibart |
| 4,952,394 A | 8/1990 | Senter |
| 5,618,528 A | 4/1997 | Cooper |
| 5,780,033 A | 7/1998 | Torchilin |
| 5,883,223 A | 3/1999 | Gray |
| 6,004,534 A | 12/1999 | Langer |
| 7,189,396 B1 | 3/2007 | Weisbart |
| 9,107,950 B2 | 8/2015 | Borden |
| 9,283,272 B2 | 3/2016 | Weisbart |
| 9,701,740 B2 | 7/2017 | Hansen |
| 10,040,867 B2 | 8/2018 | Hansen et al. |
| 10,238,742 B2 | 3/2019 | Hansen |
| 10,683,363 B2 | 6/2020 | Weisbart |
| 12,304,970 B2 | 5/2025 | Hansen et al. |
| 2002/0090608 A1 | 7/2002 | Palese |
| 2003/0083305 A1 | 5/2003 | Palese |
| 2003/0109475 A1 | 6/2003 | Debs |
| 2004/0033235 A1 | 2/2004 | Bolognesi |
| 2004/0052820 A1 | 3/2004 | Bolognesi |

(Continued)

FOREIGN PATENT DOCUMENTS

| | | |
|---|---|---|
| EP | 0437092 | 7/1991 |
| EP | 0543653 A1 | 5/1993 |

(Continued)

OTHER PUBLICATIONS

Aboul-Fadl, "Antisense oligonucleotides: the state of the art", *Curr. Med. Chem.*, 12:2193-214 (2005).
Achuthan, et al., "Drug-induced senescence generates chemoresistant stemlike cells with low reactive oxygen species", *J. Biol. Chem.*, 286:37813-29 (2011).
Adjei, "Blocking oncogenic Ras signaling for cancer therapy", *J. Natl. Cancer Inst.*, 93 (14): 1062-74 (2001).
Aguilera, et al., "Systemic in vivo distribution of activatable cell penetrating peptides is superior to that of cell penetrating peptides", *Integr. Biol. (Camb.)*, 1(5-6): 371-81 (2009).
Ahmed, et al., "Extracellular renal guanosine cyclic 3'5'-monophosphate modulates nitric oxide and pressure-induced natriuresis", *Hypertension*, 50:958-63 (2007).

(Continued)

*Primary Examiner* — Yunsoo Kim
(74) *Attorney, Agent, or Firm* — PABST PATENT GROUP LLP

(57) ABSTRACT

Guanosine-targeted nanocarriers for encapsulating an active agent and delivering it to extracellular guanosine and DNA are provided. The nanocarriers, for example, polymeric particles, liposomes, and multilamellar vesicles have targeting moiety that targets guanosine attached, linked, or conjugated thereto. The targeting moiety that targets guanosine is typically an antibody, or variant, fragment, or fusion protein derived therefrom that binds to guanosine. The targeting moiety can be a circulating autoantibody that binds guanosine such as those commonly found in patients with SLE. Cytoplasmic delivery vehicles that do not localize into endosomes or lysosomes are also provided. The delivery agent is typically an antibody, or variant, fragment, or fusion protein derived therefrom that binds to guanosine. In some embodiments, the targeting moiety or delivery agent is antibody 4H2 or a variant, fragment, or fusion protein derived therefrom. Pharmaceutical compositions, methods of use, and dosage regimens are also provided.

20 Claims, 6 Drawing Sheets

Specification includes a Sequence Listing.

(56) References Cited

U.S. PATENT DOCUMENTS

| | | | |
|---|---|---|---|
| 2005/0003343 A1 | 1/2005 | Palese | |
| 2005/0221400 A1 | 10/2005 | Gudas | |
| 2005/0256073 A1 | 11/2005 | Lipford | |
| 2006/0110740 A1 | 5/2006 | Hurwitz | |
| 2006/0127386 A1* | 6/2006 | Muzykantov | A61K 9/5031 424/94.4 |
| 2006/0216701 A1 | 9/2006 | Palese | |
| 2006/0263367 A1 | 11/2006 | Fey | |
| 2007/0166281 A1 | 7/2007 | Kosak | |
| 2008/0004561 A1 | 1/2008 | Genkin | |
| 2008/0085241 A1 | 4/2008 | Stassar | |
| 2008/0292618 A1 | 11/2008 | Weisbart | |
| 2009/0028901 A1 | 1/2009 | Palese | |
| 2009/0186337 A1 | 7/2009 | Eleouet | |
| 2009/0186802 A1 | 7/2009 | Bertrand | |
| 2010/0022680 A1 | 1/2010 | Karnik | |
| 2010/0143358 A1 | 6/2010 | Weisbart | |
| 2010/0150829 A1 | 6/2010 | Garcia-martinez et al. | |
| 2010/0196993 A1 | 8/2010 | Nishimura | |
| 2010/0311171 A1 | 12/2010 | Nakanishi | |
| 2011/0300164 A1 | 12/2011 | Lipford | |
| 2012/0010124 A9 | 1/2012 | Bertrand | |
| 2012/0214240 A1 | 8/2012 | Nakashini | |
| 2013/0137644 A1 | 5/2013 | Bertrand | |
| 2013/0225611 A1 | 8/2013 | Weis et al. | |
| 2013/0266570 A1 | 10/2013 | Wesibart | |
| 2014/0050723 A1 | 2/2014 | Hansen | |
| 2014/0178377 A1 | 6/2014 | Armstrong | |
| 2014/0234309 A1 | 8/2014 | Nishimura | |
| 2015/0064181 A1 | 3/2015 | Armstrong | |
| 2015/0376279 A1 | 12/2015 | Hansen | |
| 2016/0114058 A1 | 4/2016 | Weisbart | |
| 2016/0235859 A1 | 8/2016 | Weisbart | |
| 2017/0073429 A1 | 3/2017 | Hansen | |
| 2017/0130216 A1 | 5/2017 | Armstrong | |
| 2017/0292961 A1 | 10/2017 | Hansen | |
| 2017/0334981 A1 | 11/2017 | Hansen | |
| 2019/0247515 A1 | 8/2019 | Zhou | |
| 2019/0330317 A1 | 10/2019 | Hansen | |
| 2020/0038520 A1 | 2/2020 | Weisbart | |
| 2020/0129636 A1 | 4/2020 | Weisbart | |
| 2020/0199255 A1 | 6/2020 | Hansen | |
| 2020/0216567 A1 | 7/2020 | Campbell | |
| 2020/0216568 A1 | 7/2020 | Campbell | |
| 2021/0137960 A1 | 5/2021 | Hansen et al. | |
| 2024/0166770 A1 | 5/2024 | Hansen et al. | |

FOREIGN PATENT DOCUMENTS

| | | |
|---|---|---|
| EP | 1666055 | 6/2006 |
| EP | 3173428 | 5/2017 |
| EP | 3773919 | 2/2021 |
| WO | 9732602 | 9/1997 |
| WO | 1997032602 | 9/1997 |
| WO | 2004/003019 | 4/2006 |
| WO | 2008/091911 | 7/2008 |
| WO | 2008148063 | 12/2008 |
| WO | 2009/043031 | 4/2009 |
| WO | 2009/134027 | 11/2009 |
| WO | 2009/142326 | 11/2009 |
| WO | 2009143865 A1 | 12/2009 |
| WO | 2010/013836 | 2/2010 |
| WO | 2010056043 | 5/2010 |
| WO | 2010/148010 | 12/2010 |
| WO | 2010138769 | 12/2010 |
| WO | 2011030116 A1 | 3/2011 |
| WO | 2011041721 A1 | 4/2011 |
| WO | 2012/135831 | 10/2012 |
| WO | 2012/145125 | 10/2012 |
| WO | 2012150543 A1 | 11/2012 |
| WO | 2013/031718 | 3/2013 |
| WO | 2013/096835 | 6/2013 |
| WO | 2013/138662 | 9/2013 |
| WO | 2013/166487 | 11/2013 |
| WO | 2013/177428 | 11/2013 |
| WO | 2014087023 | 6/2014 |
| WO | 2014106001 A2 | 7/2014 |
| WO | 2014/130722 | 8/2014 |
| WO | 2014/130723 | 8/2014 |
| WO | 2015/106290 | 7/2015 |
| WO | 2015/134607 | 9/2015 |
| WO | 2015161142 A1 | 10/2015 |
| WO | 2015/192092 | 12/2015 |
| WO | 2016013870 | 1/2016 |
| WO | 2016/033321 | 3/2016 |
| WO | 2016/033324 | 3/2016 |
| WO | 2017007120 A1 | 1/2017 |
| WO | 2017/218824 | 12/2017 |
| WO | 2017/218825 | 12/2017 |
| WO | 2018/049237 | 3/2018 |
| WO | 2018089835 A1 | 5/2018 |
| WO | 2019018426 | 1/2019 |
| WO | 2019018428 | 1/2019 |
| WO | 2019152806 | 8/2019 |
| WO | 2019152808 | 8/2019 |
| WO | 2019/178532 | 9/2019 |
| WO | 2019186141 | 10/2019 |
| WO | 2020047344 | 3/2020 |
| WO | 2020047345 | 3/2020 |
| WO | 2020047353 | 3/2020 |

OTHER PUBLICATIONS

Alarcon-Segovia, "Antinuclear antibodies: to penetrate or not to penetrate, that was the question", *Lupus*, 10:315-8 (2001).

Allesen-Holm, et al., "A characterization of DNA release in Pseudomonas aeruginosa cultures and biofilms", *Mol. Biol.*, 59:1114-28 (2006).

American Cancer Society, Cancer Facts & Figures, pp. 1-70 (2014).

Andersen, et al., "Identification of heme oxygenase-1-specific regulatory CD8+ T cells in cancer patients," *Journal of Investigative Medicine*, 1-12 (2009).

Apte, et al., "Doxorubicin in TAT peptide-modified multifunctional immunoliposomes demonstrates increased activity against both drug-sensitive and drug-resistant ovarian cancer models", *Cancer Biology & Therapy*, 15(1):69-80 (2013).

Arnaudeau, et al., "DNA double-strand breaks associated with replication forks are predominantly repaired by homologous recombination involving an exchange mechanism in mammalian cells", *J. Mol. Biol.*, 307:1235-45 (2001).

ATCC® CCI-86™ Raji, "*Homo sapiens* lymphoblast Burkitt's lymph", http://www.aroc.org/Products/ALL/CCL-86.aspx?&p=1 &rel=characteristics, 1 page, retrieved from the internet Jul. 10, 2015.

ATCC® CRL-1651™ COS-7, "Cercopithecus aethiops kidney", http://www.aroc.org/Products/ALL/CRL1651.aspx 1 page, retrieved from the internet Jul. 12, 2015.

Barenholz, et al., "Doxil®—the first FDA-approved nano-drug: lessons learned", *J. Controlled Release*, 160(2):117-34 (2012).

Barka, et al., "Transduction of TAT-HA—galactosidase Fusion Protein into Salivary Gland-derived Cells and Organ Cultures of the Developing Gland, and into Rat Submandibular Gland in Vivo", *Histochem. Cytochem.*, 48(11):1453-60 (2000).

Barnes, "Sativex: clinical efficacy and tolerability in the treatment of symptoms of multiple sclerosis and neuropathic pain", *Expert Opin. Pharmacother.*, 7:607-15 (2006).

Bassi, et al., "Nuclear PTEN controls DNA repair and sensitivity to genotoxic stress", *Science*, 341:395-9 (2013).

Berglund, et al., "The epitope space of the human proteome", *Protein Sci.*, 17:606-13 (2008).

Bernatsky, et al., "Breast, ovarian, and endometrial malignancies in systemic lupus erythematosus: a meta-analysis", *Br. J. Cancer*, 104:1478-81(2011a).

Bernatsky, et al., "Cancer risk in systemic lupus: an updated international multi-centre cohort study", *J. Autoimmun.*, 42:130-5 (2013).

Bernatsky, et al., "Decreased breast cancer risk in systemic lupus erythematosus: the search for a genetic basis continues", *Lupus*, 21:896-9 (2008b).

(56) References Cited

OTHER PUBLICATIONS

Bernatsky, et al., "Prostate cancer in systemic lupus erythematosus", *Int. J. Cancer*, 129: 2966-9 (2011b).
Bernatsky, et al., "The relationship between cancer and medication exposures in systemic lupus erythaematosus: a case-cohort study", *Ann. Rheum. Dis.*, 67:74-9 (2008).
Bindra, et al., "Down-regulation of Rad51 and decreased homologous recombination in hypoxic cancer cells", *Mol. Cell. Biol.*, 24(19):8504-18 (2004).
Bisazza, et al., "Microbubble-Mediated Oxygen Delivey to Hypoxic Tissues as a New Therapeutic Device", *Engineering in Medicine and Biology Society*. 30th Annual International Conference of the IEEE (Aug. 20-24, 2008).
Bitzer, et al., "Sendai virus vectors as an emerging negative-strand RNA viral vector system", *J. Gene Med.*, 5(7):543-53 (2003).
Brorson, et al., "Mutational analysis of avidity and fine specificity of anti-levan antibodies", *J. Immunol.*, 163:6694-701 (1999).
Brummel, et al., "Probing the combining site of an anti-carbohydrate antibody by saturation-mutagenesis: role of the heavy-chain CDR3 residues", *Biochem.*, 32(4):1180-7 (1993).
Bryant, et al., "Specific killing of BRCA2-deficient tumours with inhibitors of poly(ADP-ribose) polymerase", *Nature*, 434:913-7 (2005).
Burks, et al., "In vitro scanning saturation mutagenesis of an antibody binding product", *PNAS*, 94:412-7 (1997).
Casset, et al., "Peptide mimetic of an anti-CD4 monoclonal antibody by rational design", *BBRC*, 307:198-205 (2003).
Celldex, CDX-011 Clinical program http://www.celldextherapeutics.com/wt/page/cds_011_breast?CMP=KNC-3GS620403736., retrieved from the interned Mar. 31, 2011.
Chan, et al., "Targeting cancer with a cell-penetrating anti-DNA antibody", *J Investigative Med.*, 60(1):148 (2012).
Chauhan, et al., "Strategies for advancing cancer nanomedicine", *Nat. Mater.*, 12(11):958-62 (2013).
Chen, et al., "A lupus anti-DNA autoantibody mediates autocatalytic, targeted delivery of nanoparticles to tumors", *Oncotarget*, 7(37): 59965-59975 (2016).
Chen, et al., "Selection and analysis of an optimized anti-VEGF antibody: Crystal structure of an affinity-matured Fab in complex with antigen", *J. Mol. Biol.*, 283:865-81 (1999).
Chi, et al., "Roles of ATP binding and ATP hydrolysis in human Rad51 recombinase function", *DNA Repair (Amst)*, 5:381-91 (2006).
Chothia et al., "Canonical structures for the hypervariable regions of immunoglobulins", *J. Mol. Biol.*, 196:901-17 (1987).
Chow et al., "Cancer nanomedicine: from drug delivery to imaging", *Sci. Transl. Med.*, 5(216):216rv214 (2013).
Cleaver, et al., "Phosphorylated H2Ax is not an unambiguous marker for DNSA double-strand breaks", *Cell Cycle*, 10:3223-4 (2011).
Coffin, "HIV population dynamics in vivo: implications for genetic variation, pathogenesis, and therapy", *Science*, 267:483-9 (1995).
Colburn et al., "Serum antibodies as a marker for SLE disease activity and pathogen potential", *Clin. Chim. Acta.*, 370:9-16 (2006).
Colburn, et al., "Anti-guanosine antibodies in murine and human lupus have the internal image of G-binding proteins", *J. Rheumatol.*, 30(5):993-7 (2003).
Colburn, et al., "Circulating antibodies to guanosine in systemic lupus erythematosus: correlation with nephritis and polyserositis by acute and longitudinal analyses", *Lupus*, 10:410-7 (2001).
Coleman, "Effects of amino acid sequence changes on antibody-antigen interactions", *Res. Immunol.*, 145:33-6 (1994).
Collingridge, et al., "Pentoxifylline improves the oxygenation and radiarion response of BA 1112 rat rhabdomyosarcomas and EMT6 mouse mammary carcinomas", *Int. J. Cancer*, 90(5):256-64 (2000).
Collins, et al., "Viral vectors in cancer immunotherapy: which vector for which strategy", *Curr. Gene Ther.*, 8(2):66-78 (2008).
Corada, et al., "Monoclonal antibodies directed to different regions of vascular endothelial cadherin extracellular domain affect adhesion and clustering of the protein and modulate endothelial permeability", *Blood*, 97(6):1679-84 (2001).

Croy et al., "Polymeric micelles for drug delivery", *Curr. Pharm. Des.*, 12(36):4669-84 (2006).
Cuesta, et al., "Multivalent antibodies: when design surpasses evolution", *Trends in Biotechnol.*, 28(7):355-62 (2010).
Dausch, et al., "Comparative study of treatment of the dry eye syndrome due to disturbances of the tear film lipid layer with lipid-containing tear substitutes", *Klin. Monatsbl. Augenheilkd.*, 223:974-83 (2006).
Dean, et al, "Current advances in the translation of cascular tissue engineering to the treatment of pediatric congenital heart disease", *Yale J. Biol. Med.*, 85:229-38 (2012).
Demers, et al., "Cancers predispose neutrophils to release extracellular DNA traps that contribute to cancer-associated thrombosis", *PNAS*, 109(32):13076-81 (2012).
DePascalis, et al., "Grafting of abbreviated complementarity-determining regions containing specificity-determining residues essential for ligand contact to engineer a less immunogenic humanized monoclonal antibody", *J. Immun.*, 169:3076-84 (2002).
Derossi, et al., "The third helix of the Antennapedia homeodomain translocates through biological membranes", *J. Biol. Chem.*, 269(14):10444-50 (1994).
Deutsch, et al., "Guanosine possesses specific modulatory effects on NMDA receptor-mediated neurotransmission in intact mice," *Eur. Neuropsychopharmacol.*, 18:299-302 (2008).
Deyev, et al., "Multivalemcy: the hallmark of antibodies used for optimization of tumor targeting by design", *Bioesseays*, 30(9):904-18 (2008).
Dimri, et al., "A biomarker that identifies senescent human cells in culture and in aging skin in vivo", *PNAS*, 92(20):9363-7 (1995).
Dowdy, et al., "Cationic PTD/CPP-mediated macromolecular delivery: charging into the cell," *Expert Opin. Drug Deliv.*, 12:1627-36 (2015).
Dray, et al., "Molecular basis for enhancement of the meiotic DMC1 recombinase by RAD51 associated protein 1 (RAD51AP1)", *PNAS*, 108:3560-5 (2011).
Eivazova, et al., "Specificity and binding kinetics of murine lupus anti-DNA monoclonal antibodies implicate different stimuli for their production", *Immunology*, 101:371-7, (2000).
Elbayoumi, et al., "Antinucleosome antibody-modified liposomes and lipid-core micelles for tumor-targeted delivery of therapeutic and diagnostic agents," *Journal of Liposome Research*, 17:1, 1-14 (2007).
Farmer, et al., "Targeting the DNA repair defect in BRCA mutant cells as a therapeutic strategy", *Nature*, 434:917-21 (2005).
Feng, et al., "Rad52 inactivation is synthetically lethal with BRCA2 deficiency", *PNAS*, 108:686-91 (2011).
Fiorica, "The role of topotecan in the treatment of advanced cervical cancer", *Gynecol Oncol.*, 90:S16-21 (2003).
Ford, "Lupus antibody tops cancer cells", *Sci. Trans. Med.*, 4(157):157-60 (2012).
Foroutan, et al., "Molecular cytogenetic analysis of chemoresistant non-Hodgkin's lymphoma patients with p53 abnormalities using fluorescence in situ hybridisation and comparative genomic hybridisation", *Arch Iran Med.*, 14(5):321-6 (2011).
Frankel and Pabo, "Cellular uptake of the tat protein from human immunodeficiency virus", *Cell*, 55(6):1189-93 (1988).
Fujita, et al., "Brain tumor tandem targeting using a combination of monoclonal antibodies attached to biopoly(beta-L-malic acid)," *Journal of Controlled Release*, 122:3, 356-363 (2007).
Fusaki, et al., "Efficient induction of transgene-free human pluripotent stem cells using a vector based on Sendai virus, an RNA virus that does not integrate into the host genome", *Proc Jpn Acad Ser.*, B85:348-362 (2009).
Genbank, Accession No., L16981.1, "*Mouse Ig rearranged L-chain gene, partial cds*", 1 page, accessed Nov. 30, 2009, updated Mar. 6, 2012, first appeared Jan. 5, 1995.
Genbank, Accession No., AAA65681.1, "immunoglobulin light chain, partial [Mus musculus]", 2 pages, First available May 2, 1995, accessed Mar. 28, 2016.
Genbank, Accession No., AAA65682.1, "This CDS feature is included to show the translation of the of the corresponding V_re-

(56) References Cited

OTHER PUBLICATIONS gion. Presently translation qualifiers on V_regions features are illegal, partial [Mus musculus]", 1 page, First available May 2, 1995, accessed Jun. 21, 2016.
Genbank, Accession No., AAA65679.1, immunoglobulin heavy chain, partial [Mus musculus], 2 pages, accessed Nov. 30, 2009, updated Mar. 6, 2012, first appeared May 1, 1995.
Gregoriadis et al., "Entrapment of proteins in liposomes prevents allergic reactions in pre-immunised mice", *FEBS Lett.*, 45(1):71-4 (1974).
Gregoriadis et al., "Liposomes as carriers of enzymes or drugs: a new approach to the treatment of storage diseases", *Biochem. J.*, 124:58P (1971).
Gregoriadis, "Engineering liposomes for drug delivery: progress and problems", *Trends Biotechnol* , 13:527-37 (1995).
Gregoriadis, "The carrier potential of liposomes in biology and medicine (second of two parts)", *N. Engl. J. Medm.*, 295:765-70 (1976).
Gregoriadis, et al., "Improving the therapeutic efficacy of peptides and proteins: a role for polysialic acids", *Int. J. Pharm.*, 300:125-30 (2005).
Grudzien-Nogalska, et al., "Phosphorothioate cap analogs stabilize mRNA and increase translational efficiency in mammalian cells", *RNA*, 13(10):1745-55 (2007).
Gruhne, et al., "Three Epstein-Barr virus latency proteins independently promote genomic instability by inducing DNA damage, inhibiting DNA repair and inactivating cell cycle checkpoints", *Oncogene*, 28:3997-4008 (2009).
Gu, et al., "Genetic determinants of autoimmune disease and coronary vasculitis in the MRL-lpr/lpr mouse model of systemic lupus erythematosus", *J. Immunol.*, 161:6999-7006 (1998).
Gysin, et al., "Therapeutic strategies for targeting ras proteins", *Genes Cancer*, 2(3):359-72 (2011).
Hacein-Bey-Abina, et al., "LMO-2associated clonal T cell proliferation in two patients after gene therapy for SCID-X1", *Science*, 302(5644):415-9 (2003).
Halazonetis, et al., "An oncogene-induced DNA damage model for cancer development", *Science*, 319(5868):1352-5 (2008).
Han, et al., "Increased Nanoparticle Delivery to Brain Tumors by Autocatalytic Priming for Improved Treatment and Imaging", *ACS Nano*, 10(4):4209-18 (2016).
Hansen, et al. "Antibody mediated transduction of therapeutic proteins into living cells", *Scientific world*, 5(9):782-8 (2005).
Hansen, et al., "Antibody-mediated Hsp70 protein therapy", *Brain Res.*, 1088(1):187-96 (2006).
Hansen, et al., "Antibody-mediated p53 protein therapy prevents liver metastasis in vivo", *Cancer Res.*, 57(4):1769-1774 (2007).
Hansen, et al., "Intranuclear protein transduction through a nucleoside salvage pathway", *J. Biol. Chem.*, 282(29):20790-20793 (2007b).
Hansen, et al., "Targeting cancer with a lupus autoantibody", *Sci. Trans Med.*, 4:157ra142 (2012).
Harrington, et al., "VX-680, a ptent and selective small-molecule inhibitor of aurora kinases suppresses tumor growth in vivo", *Nat. Med.*, 10:262-7 (2004).
Hawes, et al., "Extracellular DNA: A Bridge to Cancer", *Cancer Res.*, 75(20):4260-4 (2015).
Hayflick, et al., "The limited in vitro lifetime of human diploid cell strains", *Exp. Cell Res.*, 37:614-36 (1965).
Ho, et al., "Synthetic protein transduction domains: enhanced transduction potential in vitro and in vivo", *Cancer Res.*, 61(2):474-7 (2001).
Hoeijmakers, "Dna damage, aging, and cancer", *N. Engl. J. Med.*, 361:1475-85 (2009).
Holm, et al., "Functional mapping and single chain construction of the anti-cytokeratin 8 monoclonal antibody TS1", *Mol. Immun.*, 44:1075-84 (2007).
Holtkemp, et al., "Modification of antigen-encoding RNA increases stability, translational efficacy, and T-cell stimulatory capacity of dendritic cells", *Blood*, 108(13):4009-17 (2006).

Hrkach, et al., "Preclinical development and clinical translation of a PSMA-targeted docetaxel nanoparticle with a differentiated pharmacological profile", *Sci. Transl. Med.*, 4(128):128ra139 (2012).
Hucl, et al., "A syngeneic variance library for functional annotation of human variation: application to BRCA2", *Cancer Res.*, 68:5023-30 (2008).
Immordino, et al., "Stealth liposomes: review of the basic science, rationale, and clinical applications, existing and potential", *Int. J. Nanomedicine*, 1(3):297-315 (2006).
Isenberg, et al., "Fifty years of anti-ds DNA antibodies: are we approaching journey's end", *Rheumatology*, 46 (7):1052-6 (2007).
Itoh, et al., "Diagnostic use of anti-modified nucleoside monoclonal antibody", *Tohoku J. Exp. Med.*, 168:329-31 (1992).
Jackson, et al., "Guanosine regulates adenosine levels in the kidney" *Physiol. Rep*, 2(5) pii: e12028. doi: 10.14814/phy2.12028 (2014).
Jain, "Transport of molecules across tumor vasculature", *Cancer Metastasis Rev.*, 6(4):559-593 (1987).
Jain, et al., "Engineering antibodies for clinical applications", *Trends in Biotechnol.*, 25(7):307-16 (2007).
Jang, et al., "Drug delivery and transport to solid tumors", *Phar. Res.*, 20:1337-50 (2003).
Jang, et al., "The structural basis for DNA binding by an anti-DNA autoantibody", *Mol. Immun.*, 35:1207-17 (1998).
Jordan, et al., Mechanism of mitotic block and inhibition of cell proliferation by taxol at low concentrations, *PNAS*, 90:9552-6 (1993).
Kabat, et al., "Sequences of proteins of Immunological Interest", *5 Ed. Public Health service, National Institutes of Health, Bethesda Md.* (1991).
Kabouridis, "Biological applications of protein transduction technology", *Trends in Biotechnol.*, (11):498-503 (2003).
Kaelin, Jr., et al., "The concept of synthetic lethality in the context of anticancer therapy", *Nat. Rev. Cancer*, 5:689-98 (2005).
Kane, et al., "Methylation of the hMLH1 promoter correlates with lack of expression of hMLH1 in sporadic colon tumors and mismatch repair-defective human tumor cell lines", *Cancer Rev.*, 57:808-11 (1997).
Kay, "State of the art gene-based therapies: the road ahead", *Nature Rev. Genetics*, 12(5):316-28 (2011).
Kellner, et al., "Boosting ADCC and CDC activity by Fc engineering and evaluation of antibody effector functions", *Methods*, 65:105-13 (2014).
Kelly, et al., "Targeted liposomal drug delivery to monocytes and macrophages", *J. Drug Deliv.*, 2011: 727241, 11 pages (2011).
Kim, et al., "Heavy and light chain variable single domains of an anti-DNA binding antibody hydrolyze both double- and single-stranded DNAs without sequence specificity", *J. Biological Chem.*, 281(22):15287-95 (2006).
Kobayashi, et al., "Tryptophan H33 plays an important role in pyrimidine (6-4) pyrimidone photoproduct binding by a high-affinity antibody", *Protein Eng.*, 12(10):879-84 (1999).
Kocbek, et al., "Targeting cancer cells using PLGA nanoparticles surface modified with monoclonal antibody", *Journal of Controlled Release*, 120:1-2, 18-36 (2007).
Kozyr, et al., "Anti-DNA autoantibodies reveal toxicity to tumor cell lines", *Immunol Lttr.*, 80:41-7 (2002).
Kulkarin-Kale, et al., "CEP: a conformational epitope prediction server", *Nucleic Acids Res.*, 33:W168-W171 (2005).
Kumar, et al., "Molecular cloning and expression of the fabs of human autoantibodies in *Escherichia coli*", *J Bio Chem.*, 275:35129-36 (2000).
Lallemand, et al., "Cyclosporine A delivery to the eye: a pharmaceutical challenge", *Eur. J. Pharm. Biopharm.*, 56:307-18 (2003).
Lau, et al., "Suppression of HIV-1 infection by a small molecule inhibitor of the ATM kinase", *Nat Cell Biol*, 7(5): 493-500 (2005).
Lee, et al., "A new therapy concept with a Liposome Eye Spray for the treatment of dry eye", *Klin. Monatsbl. Augenheilkd.*, 221:825-36 (2004).
Lee, et al., "Cell-penetrating autoantibody induces caspase-mediated apoptosis through catalytic hydrolysis of DNA", *Bioorg. Med. Chem.*, 15(5):2016-23 (2007).
Lee, et al., "Gene silencing by cell-penetrating, sequence-selective and nucleic-acid hydrolyzing", *Nucleic Acid Res.*, pp. 1-14 (2009).

(56) References Cited

OTHER PUBLICATIONS

Lei, et al., "Targeted Delivery of Doxorubicin by PLGA Nanoparticles Increases Drug Uptake in Cancer Cell Lines", 26th Southern Biomedical Engineering Conference SBEC 2010, Apr. 30-May 2, 2010, College Park, Maryland, USA 32:224-227 (2010).

Levitt, et al., "PTEN-induction in U251 glioma cells decreases the expression of insulin-like growth factor binding protein-2", Biochem. Biophys. Res Comm., 336:1056-61 (2005).

Lewitzky, et al., "Reprogramming somatic cells towards pluripotency by defined factors", Curr. Opin. Biotechnol., 18:467-73 (2007).

Li, et al., "Homologous recombination in DNA repair and DNA damage tolerance", Cell Res., 18:99-113 (2008).

Li, et al., "PTEN, a putative protein tyrosine phosphatase gene mutated in human brain, breast, and prostate cancer", Science, 275:1943-7 (1997).

Liao, et al., "The comet assay: a sensitive method for detecting DNA damage in individual cells", Methods, 48(1):46-53 (2009).

Lin, et al., "Improved affinity of a chicken single-chain antibody to avian infectious bronchitis virus by site-directed mutagenesis of complementarity-determining region H3", African J. Biotech., 10(79):18294-18302 (2011).

Lisi, et al., "Advances in the understanding of the Fc gamma receptors-mediated autoantibodies uptake", Clin. Exp. Med., 11:1-10 (2011).

Liu, et al., "A novel bivalent single-chain variable fragment (scFV) inhibits the action of tumor necrosis factor [alpha]", Biotechnol. App. Biochem., 50(4):173-9 (2008).

Liu, et al., "Iniparib Nonselectively Modifies Cysteine-Containing Proteins in Tumor Cells and Is Not a Bona Fide PARP Inhibitor," Clin. Cancer Res., 18:510-523 (2012).

Liu, et al., "Poly($\omega$-pentadecalactone-co-butylene-co-succinate) Nanoparticles as Biodegradable Carriers for Camptothecin Delivery", Biomaterials, 30:5707-19 (2009).

Ma, et al., "Antibodies to guanosine triphosphate misidentified as anti-double-stranded DNA antibodies in a patient with antinuclear antibody-negative lupus, due to buckling of insolubilized assay DNA", Arthritis Rheum., 50:1533-1538 (2004).

MacCallum, et al., "Antibody-antigen interactions: Contact analysis and binding site topography", J. Mol. Biol., 262:732-45 (1998).

Maeda, et al., "Tumor vascular permeability and the EPR effect in macromolecular therapeutics: a review", J. Controlled Release, 65:271-84 (2000).

Mariuzza, et al., "The structural basis of antigen-antibody recognition", Am. Res. Biophys. Biophys. Chem., 16:139-59 (1987).

Mccabe, et al., "BRCA2-deficient CAPAN-1 cells are extremely sensitive to the inhibition of Poly (ADP-Ribose) polymerase: an issue of potency", Cancer Biology Therapy, 4:934-6 (2005).

McCarthy, et al., "Altering the fine specificity of an anti-legionella single chain antibody by a single amino acid insertion", J. Immunol. Meth., 21:137-49 (2001).

McEllin, et al., "PTEN loss compromises homologous recombination repair in astrocytes: implications for glioblastoma therapy with temozolomide or poly(ADP-ribose) polymerase inhibitors", Cancer Res., 70:5457-64 (2010).

Minko, et al., "New generation of liposomal drugs for cancer", Anticancer Agents Med. Chem., 6:537-52 (2006).

Molfetta, et al., "Regulation of fc receptor endocytic trafficking by ubiquitination" Front Immunol, 5:449. Doi: 10.3389/fimmu.2014.00449 (2014).

Moynahan, et al., "BRCA2 is required for homology-directed repair of chromosomal breaks", Mol. Cell, 7:263-72 (2001).

Muller, et al., "TransMabs: cell-penetrating antibodies, the next generation", Exp. Opin. Biol. Ther., 5(2):1-5 (2005).

Nakanishi, et al., "Development of sendai virus vectors and their potential applications in gene therapy and regenerative medicine", Curr. Gene Ther., 12(5):410-6 (2012).

Noble, et al., "A cell-penetrating nucleoltyic lupus autoantibody damages DNA and is toxic to BRCA2-deficient cancer cells" poster presented at the Proceedings: AACR Annual Meeting 2014; Apr. 5-9, San Diego, CA (2014b).

Noble, et al., "A cell-penetrating nucleolytic lupus autoantibody damages DNA and is toxic to BRCA2-deficient cancer cells", Abstract 4220, Cancer Res., 74:4220 (2014c).

Noble, et al., "A nucleolytic lupus autoantibody is toxic to BRCA2-deficient cancer cells", Sci. Rep -Uk, 4:5958. doi: 10.1038/srep05958 (2014).

Noble, et al., "DNA-damaging autoantibodies and cancer: the lupus butterfly theory", Nat .Rev. Rheumatol., 12(7):429-34 (2016).

Noble, et al., "Optimizing a lupus autoantibody for targeted cancer therapy", Cancer Res., 75(11):2285-91 (2015).

Okita, et al., "Induction of pluripotency by defined factors", Exp. Cell Res., 316(16):2565-70 (2010).

Okshevsky, et al., "Extracellular DNA as a target for biofilm control", Curr. Opin. Biotech., 33:73-80 (2015).

Padlan, "X-ray crystallography of anti-bodies", Adv. Protein Chem., 49:57-133 (1996).

Park, et al., "PEGylated PLGA nanoparticles for the improved delivery of doxorubicin", Nanomed-Nanotechnol., 5:410-8 (2009).

PARP Inhibitor, http://www.parp-inhibitors.com, retrieved from the internet Mar. 31, 2011.

Pavlovic, et al., "Pathogenic and epiphenomenal anti-DNA antibodies in SLE", Autoimmune Diseases, 2010:462841 1-18 (2010).

Porter, et al., "Chimeric antigen receptor-midified T cells in chronic lymphoid leukemia", NEJM, 365(8):725-33 (2011).

Puc, et al., "PTEN loss inhibits CHK1 to cause double stranded-DNA breaks in cells", Cell Cycle, 4:927-9 (2005).

Rabinovich, et al., "Chimeric receptor mRNA transfection as a tool to generate antineoplastic lymphocytes", Human Gene Therapy, 20(1):51-61 (2009).

Rabinovich, et al., "Synthetic messenger RNA as a tool for gene therapy", Hum. Gene Ther., 17(10):1027-35 (2006).

Rahman and Isenberg, "Systemic lupus erythematosus", N. Engl. J. Med. 358:929-39 (2008).

Rathbone, et al., "Neurotrophic effects of extracellular guanosine" Nucleosides Nucleotides Nucleic Acids, 27:666-72 (2008).

Ratnam, et al., "Current development of clinical inhibitors of poly (ADP-ribose) polymerase in oncology", Clin. Cancer Res., 13(5):1383-8 (2007).

Ritter, et al., "Gene therapy in transplantation: Toward clinical trials", Curr. Opin. Mol. Ther., 11(5):504-12 (2009).

Rivadeneyra-Espinoza, et al., "Cell-penetrating anti-native DNA antibodies trigger apoptosis through both the neglect and programmed pathways", J. Auto Immunity, 26:52-6 (2006).

Rudikoff, et al., "Single amino substitution altering antigen-binding specificity", PNAS, 79:1979-83 (1982).

Sakai, et al., "Functional restoration of BRCA2 protein by secondary BRCA2 mutations in BRCA2-mutated ovarian carcinoma", Cancer Res., 69:6381-6 (2009).

Sancar, et al., "Molecular mechanisms of mammalian NA repair and the DNA damage checkpoints", Annu. Rev. Biochem., 73:39-85 (2004).

Sano, et al., "Dna isolated from DNA/anti-DNA antibody immune complexes in systemic lupus erythematosus is rich in guanine-cytosine content" J. Immunol, 128:1341-1345 (1982).

Sapra, et al., "Ligand-targeted liposomes for cancer treatment", Curr. Drug Deliv., 2:369-81 (2005).

Sawant, et al., "Nanosized cancer cell-targeted polymeric immunomicelles loaded with superparamagnetic iron oxide particles" Journal of Nanoparticle Research, 11(7):1777-1785 (2009).

Scott, et al., "Antibody therapy of cancer", Nature Reviews Cancer, 12:278-87 (2012).

Senge, "Immunoliposomes", Curr. Med. Chem., 19(31):5239-77 (2012).

Service, et al., "Nanotechnology. Nanoparticle Trojan horses gallop from the lab into the clinic", Science, 330(6002):314-315 (2010).

Shao, et al., "Reversibly crosslinked nanocarriers for on-demand drug delivery in cancer treatment", Ther Deliv, 3(12):1409-27 (2012).

Shin, et al., "Pharmacokinetics of guanosine in rats following intravenous or intramuscular administration of a 1:1 mixture of guanosine and acriflavine, a potential antitumor agent" Arch Pharm Res, 31(10):1347-53 (2008).

(56) References Cited

OTHER PUBLICATIONS

Shuster, et. al., "DNA hydrolyzing autoantibodies", *Science*, 256 (5057):665-7 (1992).
Singh, et al., "A gene expression signature associated with "K-Ras addiction" reveals regulators of EMT and tumor cell survival", *Cancer Cell*, 15:489-500 (2009).
Skoulidis, et al., "Germline Brca2 heterozygosity promotes Kras(G12D)—driven carcinogenesis in a murine model of familial pancreatic cancer", *Cancer Cell*, 18:499-509 (2010).
Sliwinska, et al., "Induction of senescence with doxorubicin leads to increased genomic instability of HCT116 cells", *Mech. Ageing Dev.*, 130:24-32 (2009).
Smith-Gill, et al., "Contributions of immunoglobulin heavy and light chains to antibody specificity for lysozyme and two haptens", *J. Immunol.*, 139:4135-44 (1987).
Song, et al., "Light chain of natural antibody plays a dominant role in protein antigen binding", *Biochem. Biophys. Res. Comm.*, 268:390-4 (2000).
Spertini, et al., "Idiotypic vaccination with a murine anti-dsDNA antibody: phase I study in patients with nonactive systemic lupus erythematosus with nephritis", *J. Rheumatol.*, 269120:2602-8 (1999).
Stachelek, et al., "Potentiation of temozolomide cytotoxicity by inhibition of DNA polymerase beta is accentuated by BRCA2 mutation", *Cancer Res.* 70:409-17 (2010).
Stanulis-Praeger, et al., "Cellular senescence revisited: a review", *Mech. Ageing Derv.*, 38:1-48 (1987).
Steck, et al., "Identification of a candidate tumour suppressor gene, MMAC1, at chromosome 10q23.3 that is mutated in multiple advanced cancers", *Nat. Genet.*, 15:356-62 (1997).
Stepinski, et al., "Synthesis and properties of mRNA's containing the novel "anti-reverse" cap analogs 7-methyl(3'-O-methyl)GpppG and 7-methyl (3'-deoxy)GpppG", *RNA*, 7(10:1486-95 (2001).
Stollar, et al., "Nucleoside specificity in the carrier IgG-dependent induction of tolerance", *J. Immunol.*, 117:1308-1313 (1976).
Stone, et al., "Neoadjuvant chemotherapy and liver transplantation for hepatocellular carcinoma: a pilot study in 20 patients", *Gastroenterology*, 104(1):196-202 (1993) Abstract Only.
Stroun, et al., "About the possible origin and mechanism of circulating DNA apoptosis and active DNA release", *Clin. Chim. Acta.*, 313(1-2):139-142 (2001).
Sueoka-Aragane, et al., "Correlation between plasma DNA and tumor status in an animal model", *PloS One*, 9(12) (2014).
Sugahara, et al., "Tissue-penetrating delivery of compounds and nanoparticles into tumors", *Cancer Cell*, 16(6):510-20 (2009).
Sung, "Catalysis of ATP-dependent homologous DNA pairing and strand exchange by yeast RAD51 protein", *Science*, 265:1241-3 (1994).
Sung, et al., "DNA strand exchange mediated by a RAD51-ssDNA nucleoprotein filament with polarity opposite to that of RecA", *Cell*, 82:453-61 (1995).
Sung, et al., "Rad51 recombinase and recombination mediators", *J. Biol. Chem.*, 278:42729-32 (2003).
Swystun, et al., "Breast cancer chemotherapy induces the release of cell-free DNA, a novel procoagulant stimulus", *J. Thromb. Haemost.*, 9(11):2313-2321 (2011).
Te Poele, et al., "DNA damage is able to induce senescence in tumor cells in vitro and in vivo", *Cancer Res.* 62:1876-1883 (2002).
Tewey, et al., "Adriamycin-induced DNA damage mediated by mammalian DNA topoisomerase II", *Science*, 226:466-8 (1984).
Tyagi, et al., "Urodynamic and immunohistochemical evaluation of intravesical capsaicin delivery using thermosensitive hydrogel and liposomes", *J. Urol.*, 171:483-9 (2004).
Tzartos, et al., "Epitope mapping by antibody completion", *Methods Molecular Biol.*, 66:55-66 (1996).
Uemura, et al., "Neurochemical analysis of focal ischemia in rats", *Stroke*, 22:1548-53 (1991).
Vajdos, et al., "Comprehensive functional maps of the antigen-binding site of am amti-ErbB2 antibody obtained with shotgun scanning mutagenesis", *J. Mol. Biol.*, 320:415-28 (2002).

Vlietstra, et al., "Frequent inactivation of PTEN in prostate cancer cell lines and xenografts", *Cancer Res.*, 58:2720-3 (1998).
Von Maltzahn, et al., "Nanoparticles that communicate in vivo to amplify tumour targeting", *Nat. Mater.*, 10(7):545-52 (2011).
Wadia and Stan, "Transducible TAT-HA fusogenic peptide enhances escape of TAT-fusion proteins after lipid raft micropinocytosis", *Nat. Med.*, 10(3):310-5 (2004).
Walpita, et al., "Reverse genetics of negative-stranded RNA viruses: a global perspective", FEMS Microbiol. Lett., 244(1):9-18 (2005).
Wang, Mutagenesis in mammalian cells induced by triple helix formation and transcription-coupled repair, *Science*, 271(5250):802-5 (1996).
Ward, et al., "Binding activities of a repertoire of single immunoglobulin variable domains secreted from *Escherichia coli*", *Nature*, 341:544-6 (1989).
Warren, et al., "Highly efficient reprogramming to pluripotency and directed differentiation of human cells with synthetic modified mRNA", *Cell Stem Cell*, 7(5):618-30 (2010).
Weisbart, "Antibody-mediated transduction of p53 selectively kills cancer cells", *Int. J. Oncol.*, 25(6):1867-73 (2004a).
Weisbart, et al. "A conserved anti-DNA antibody idiotype associated with nephritis in murine and human systemic lupus erythematosus", *J. Immunol.*, 144(7): 2653-8 (1990).
Weisbart, et al. "Novel protein transfection of primary rat cortical neurons using an antibody that penetrates living cells", *J. Immunol.*, 164:6020-6026 (2000).
Weisbart, et al., "A cell-penetrating bispecific antibody for therapeutic regulation of intracellular targets", *Mol. Cancer Ther.*, 11(10):2169-73 (2012).
Weisbart, et al., "An autoantibody is modified for use as a delivery system to target the cell nucleus: therapeutic implications", *J. Autoimmun.*, 11:539-46 (1998).
Weisbart, et al., "Cell type specific targeted intracellular delivery into muscle of a monoclonal antibody that binds myosin IIb", *Mol. Immunol.*, 39(13):783-9 (2003a).
Weisbart, et al., "Construction and expression of a bispecific single-chain antibody that penetrates mutant p53 colon cancer cells and binds p53", *Int. J. Oncology*, 25:1113-8 (2004b).
Weisbart, et al., "DNA-dependent targeting of cell nuclei by a lupus autoantibody", *Sci. Rep.*, 5:12022 (2015).
Weisbart, et al., "Nuclear delivery of p53 C-terminal peptides into cancer cells using scFv fragments of a monoclonal antibody that penetrates living cells", *Cancer Lttrs.*, 195:211-19 (2003b).
Wen, et al., "Extracellular DNA in pancreatic cancer promotes cell invasion and metastasis", *Cancer Res.*, 73(14):4256-66 (2013).
Wender, et al., "The design, synthesis, and evaluation of molecules that enable or enhance cellular uptake: peptoid molecular transporters", *PNAS*, 97(24):13003-8 (2000).
Whitchurch, et al., "Extracellular DNA required for bacterial biofilm formation", *Science*, 295(5559):1487 (2002).
Whitney, et al., "Parallel in vivo and in vitro selection using phage display identifies protease-dependent tumor-targeting peptides", *J. Biol. Chem.*, 285(29):22532-41 (2010).
Williams, "DNA hydrolysis mechanism and reactivity", *Nucleic Acids and Molecular Biology*, 13:1-7 (2004).
Wu, et al., "Humanization of a murine monoclonal antibody by simultaneous optimization of framework and CDR residues", *J. Mol. Biol.*, 294:151-62 (1999).
Wu, et al., "pH-sensitive poly(histidine)-PEG/DSPE-PEG copolymer micelles for cytosolic drug delivery", *Biomaterials*, 34:4, 1213-1222 (2013).
Xu, et al., "Dual DNA unwinding activities of the Rothmund-Thomson syndrome protein, RECQ4", *EMBO J.*, 28:568-77 (2009b).
Xu, et al., "MCM10 mediates RECQ4 association with MCM2-7 helicase complex during DNA replication", *EMBO J.*, 28:3005-14 (2009a).
Yee, et al., "The fine specificity of IgG antiguanosine antibodies in systemic lupus erythematosus", *Clin. Immunol. Immunopathol.*, 36(2):161-7 (1985).
Yeh, et al., "A Targeting Microbubble for Ultrasound Molecular Imaging," *PLoS One*, 10(7): e0129681. doi:10.1371/ journal.pone. 0129681 (2015).

(56) References Cited

OTHER PUBLICATIONS

Yoder, et al., "The base excision repair pathway is required for efficient lentivirus integration", PLoS One, 6(3) e17862 (2011).
Yoshizaki, et al., "Naked sendai virus vector lacking all of the envelope-related genes: reduced cytopathogenicity and immunogenicity", J. Gene Med., 8(9):1151-9 (2006).
Young, et al., "Targeting K-ras cancer cells with a lupus antiguanosine antibody", Cancer Res., 74(19 Supp):654 (2014). Abstract Only.
Yung, et al., "Anti-DNA antibodies in the pathogenesis of lupus nephritis—The emerging mechanisms", Autoimmunity Rev., 7(4):317-21 (2008).
Zack, et al. "Mechanisms of cellular penetration and nuclear localization of an anti-double strand DNA autoantibody", J. Immunol. 157(5):2082-8 (1996).
Zack, et al., "DNA mimics a self-protein that may be a target for some anti-DNA antibodies in systemic lupus erythematosus", J. Immunol. 154:1987-94 (1995a).
Zack, et al., "Novel structural features of autoantibodies in murine lupus: a possible superantigen binding site", Immunol. Cell Biol., 72:513-20 (1994).
Zack, et al., "Two kappa immunoglobulin light chains are secreted by an anti-DNA hybridoma: implications for isotypic exclusion", Mol. Immunol., 32:1345-53 (1995b).
Zhan, et al., "Recombinant Fv-Hsp70 protein mediates neuroprotection after focal cerebral ischemia in rats", Stroke, 41(3):538-43 (2010).
Zhou, et al., "Highly penetrative, drug-loaded nanocarriers improve treatment of glioblastoma", PNAS, 110:11751-6 (2013).
Zhou, et al., "Octa-functional PLGA nanoparticles for targeted and efficient siRNA delivery to tumors", Biomaterials, 33(2):583-91 (2012).
Zhu, et al., "Matrix Metalloprotease 2-Rsponsive Multifunctional Liposomal Nanocarrier for Enhanced Tumor Targeting", ACS Nano, 6(4): 3491-3498 (2012).
International Search report for corresponding PCT application PCT/US2017/037753 mailed Oct. 23, 2017.
Andersen, et al.,"Identification of heme oxygenase-1-specific regulatory CD8+ T cells in cancer patients," Journal of Investigative Medicine (2009).
Barenholz, et al., "Doxil®—the first FDA-approved nano-drug: lessons learned", J Control Release, 160(2):117-34 (2012).
Genbank, Accession No., L16981.1, "Mouse Ig rearranged L-chain gene, partial cds", 1 page, accessed Nov. 30, 2009, updated Mar. 6, 2012, first appeared May 1, 1995.
Kelly, et al., "Targeted liposomal drug delivery to monocytes and macrophages", J. Drug Deliv., 2011(727241):1-11 (2011).
Noble, et al., "A nucleolytic lupus autoantibody is toxic to BRCA2-deficient cancer cells", Sci Rep-Uk, 4:5958. doi: 10.1038/srep05958 (2014a).
Pavlovic, et al., "Pathogenic and epiphenomenal anti-DNA antibodies in SLE", Autoimmime Diseases, 2010:462841 1-18 (2010).
Stollar, et al., "Nucleoside specificity in the carrier IgG-dependent induction of tolerance" J Immunol, 117:1308-1313 (1976).
Weisbart, et al., "Novel protein transfection of primary rat cortical neurons using an antibody that penetrates living cells", J Immunol., 164: 6020-6 (2000).
Yee, et al., "The fine specificity of IgG antiguanosine antibodies in systemic lupus erythematosus", Clin Immunol Immunopathol., 36(2):161-7 (1985).
U.S. Appl. No. 16/967,109, filed Aug. 3, 2020, Hansen.
U.S. Appl. No. 16/967,119, filed Aug. 3, 2020, Hansen.
Alarcon-Segovia, et al., "Antibody penetration into living cells. I. Intranuclear immunoglobulin in peripheral blood mononuclear cells in mixed connective tissue disease and systemnic lupus erythematosus", Clin. Exp. Immunol., 35:364-375 (1979).
Allemann, et al., "Drug-loaded nanoparticles: Preparation methods and drug targeting issues", European Journal of Pharmaceuticals and Biopharmaceuticals, 39(5): 173-191 (1993).

Avrameas, et al., "Polyreactive anti-DNA monoclonal antibodies and a derived peptide as vectors for the intracytoplasmic and intranuclear translocation of macromolecules" Proc. Natl. Acad. Sci. U.S.A., 95(10):5601-5606 (1998).
Axup, "Synthesis of site-specific antibody-drug conjugates using unnatural amino acids", Proceedings of the National Academy of Sciences, 109 (40): 16101-6 (2012).
Bao, et al., "PLGA-PLL-PEG-Tf-based targeted nanoparticles drug delivery system enhance antitumor efficacy via intrinsic apoptosis pathway", International Journal of Nanomedicine, 10: 557-66 (2015).
Barthelemy, et al., "Comprehensive Analysis of the Factors Contributing to the Stability and Solubility of Autonomous Human VH Domains" Journal of Biological Chemistry, 283:3639-3654 (2008).
Beibor, et al., "Guided selection of a pan carcinoma specific antibody reveals similar binding characteristics yet structural divergence between the original murine antibody and its human equivalent" Journal of Molecular Biology, 296:833-849 (2000).
Bertram, "Functionalized poly(lactic-co-glycolic acid) enhances drug delivery and provides chemical moieties for surface engineering while preserving biocompatibility", Acta Biomater. 5:2860-71 (2009).
Caster, et al., "Nanoparticle delivery of chemosensitizers improve chemotherapy efficacy without incurring additional toxicity", Nanoscale, 7(6):2805-2011 (2015).
Chan, et al., "Combining intracellular antibodies to restore function of mutated p53 in cancer" Int. J. Cancer, 138(1):182-6 (2016).
Choi, et al., "Predicting antibody complementarity determining region structures without classification", Molecular BioSystems, 7:3327-3334 (2011).
De Genst, et al., "Antibody repertoire development in carnelids" Developmental and Comparative Immunology, 30:187-98 (2006).
Deng et al., "In vivo cell penetration and intracellular transport of anti-Sm and anti-La autoantibodies", Int Immunol 12, 415-423 (2000).
GenBank Acc. No. BAG36664.1, unnamed protein product [Homo sapiens].
Genbank AF289183.1., Mus musculus anti-DNA monoclonal autoantibody G1-5 light chain variable region mRNA, partial cds.
GenBank: L34051.1—Mouse Ig rearranged kappa-chain mRNA V-region.
Golan et al., "Penetration of Autoantibodies into Living Epithelial Cells", J Invest Dermatol 100, 316-322 (1993).
Griffiths, et al., "Human anti-self antibodies with high specificity from phage display libraries", The EMBO Journal, 12:725-734 (1993).
Hong, et al., "pH-sensitive poly (histidine)-PEG/DSP-PEG copolymer micelles for cytosolic drug delivery", Biomaterials, 34(4):1213-1222 (2013).
Huang, et al., "Complications mimicking lupus flare-up in a uremic patient undergoing pegylated liposomal doxorubicin therapy for cervical cancer", Anti-Cancer Drugs, 15:239-241 (2004).
Im et al., "Cell- and nuclear-penetrating anti-dsDNA autoantibodies have multiple arginines in CDR3 of VH and increase cellular level of pERK and Bcl-2 in mesanglial cells", Mol Immunol 67, 377-387 (2015).
Im et al., "Development of single-chain Fv of antibody to DNA as intracellular delivery vehicle", Animal Cells and Systems 21, 382-387 (2017).
Isenberg, et al., "Detection Of Cross-Reactive Anti-Dna Antibody Idiotypes In The Serum Of Systemic Lupus Erythematosus Patients And Of Their Relatives", Arthritis Rheum 28, 999-1007 (1985).
Jang, et al., "A nucleic acid-hydrolyzing antibody penetrates into cells via caveolae-mediated endocytosis, localizes in the cytosol and exhibits cytotoxicity", Cell Mol. Life Sci., 66:1985-97 (2009).
Klimka, et al., "Human anti-CD30 recombinant antibodies by guided phage antibody selection using cell panning", British Journal of Cancer, 83:252-260 (2000).
Lin, et al., "Matrix metalloprotease 2-responsive multifunctional liposomal nanocarrier for enhanced tumor targeting", ACS Nano, 6(4):3491-3498 (2012).
Malia, et al., "Epitope mapping and structural basis for the recognition of phosphorylated tau by the anti_tau antibody AT8" Proteins, 84:427-434 (2016).

(56) References Cited

OTHER PUBLICATIONS

Okudaira, et al., "Monoclonal murine anti-DNA antibody interacts with living mononuclear cells", Arthritis Rheum. 30, 669-678 (1987).
Rattray et al., "Re-Engineering and Evaluation of Anti-DNA Autoantibody 3E10 for Therapeutic Applications", Biochem Biophys Res Commun., 496:858-864 (2018).
Rhodes and Isenberg, "Function and therapeutic potential of intracellular antibodies", Trends Immunol 38, 916-926 (2017).
Rishikesh, et al., "Nanosized cancer cell-targeted polymeris immunomicelles loaded with superparamagnetic iron oxide nanoparticles", Journal of Nanoparticle Research, 11(7):1777-1785 (2009).
Ruiz-Arguelles, et al., "Penetration of anti-DNA antibodies into immature live cells." J. Autoimmun., 11(5):547-56 (1998).
Silosi, et al., "The role of autoantibodies in health and disease", Rom J Morphol Embryol, 57(2 Suppl):633-638 (2016).
Song, et al., "Arginines in the CDR of anti-dsDNA autoantibodies facilitate cell internalization via electrostatic interactions", Eur. J. Immunol., 38(11):3178-90 (2008).
Turchick, et al., "A cell-penetrating antibody inhibits human RAD51 via direct binding", Nucleic Acids Research, 45(20):11782-11799 (2017).
Vlahakos, et al., "Murine Monoclonal Anti-Dna Antibodies Penetrate Cells, Bind To Nuclei, And Induce Glomerular Proliferation And Proteinuria In Vivo." J. Am. Soc. Nephrol. 2(8):1345-54 (1992).
Ward, et al., "Binding activities of a repertoire of single immunoglobulin variable domains secreted from *Escherichia coli*", Nature, 341:544-546 (1989).
Weidle, et al., "The Translational Potential for Target Validation and Therapy Using Intracellular Antibodies in Oncology", Cancer Genomics Proteomics, 10: 239-250 (2013).
Weisbart R H, et al., "An intracellular delivery vehicle for protein transduction of micro-dystrophin", J. Drug Target., 13(2):81-7 (2005).
Weisenthal, Human Tumor Assay Journal, on-line at http://weisenthal.org/synergy1.htm, (Mar. 14, 2012).
Wolf, et al., "RPA and Rad51 constitute a cell intrinsic mechanism to protect the cytosol from self DNA", Nat. Commun., 7:11752 (2016).
Yanase, et al., "Receptor-mediated Cellular Entry of Nuclear Localizing Anti-DNA Antibodies via Myosin 1", J. Clin. Invest., 100:25-31 (1997).
Roby, et al, "Solubilization of Poorly Soluble PDT Agent, Mesotetraphenylporphin, in Plain or Immunotargeted PEG-PED Micelles Results in Dramatically Improved Cancer Cell Killing in Vitro", Eur J Pharm Biopharm, 62(3): 235-240 (2006).
Li, et al, "Cell-Free DNA is Released From Tumor Cells Upon cell Death: A Study of Tissue Cultures of Tumor Cell Lines", Journal of Clinical Laboratory Analysis, 17:103-107 (2003).
Aagaard, et al., "RNAi therapeutics: Principles, prospects and challenges", Advanced Drug Delivery Reviews, vol. 59, No. 2-3, Mar. 30, 2007, pp. 75-86.
Abiri, et al., "Discovery of new TLR7 agonists by a combination of statistical learning-based QSAR, virtual screening, and molecular dynamics", Informatics in Medicine Unlocked, vol. 27, No. 100787, 2021, 12 pages.
Blumberg, et al., "Unraveling the autoimmune translational research process layer by layer", Nat Med., vol. 18, No. 1, Jan. 6, 2012, pp. 35-41.
Bork, Peer, "Powers and Pitfalls in Sequence Analysis: The 70% Hurdle", Genome Research, vol. 10, No. 4, 2000, pp. 398-400.
Brown, et al., "Tolerance of single, but not multiple, amino acid replacements in antibody VH CDR 2: a means of minimizing B cell wastage from somatic hypermutation?", J Immunol., vol. 156, No. 9, May 1, 1996, pp. 3285-3291.
Buolamwini, Johnk. , "Nucleoside Transport Inhibitors: Structure-Activity Relationships and Potential Therapeutic Applications", Current Medicinal Chemistry, vol. 4, No. 1, 1997, pp. 35-66.

Burgess, et al., "Possible dissociation of the heparin-binding and mitogenic activities of heparin-binding (acidic fibroblast) growth factor-1 from its receptor-binding activities by site-directed mutagenesis of a single lysine residue", J Cell Biol., vol. 111, No. 5, Nov. 1, 1990, pp. 2129-2138.
Carratu, et al., "Retinoids: novel immunomodulators and tumour-suppressive agents? : Retinoids: immunomodulators and anti-tumour agents", British Journal of Pharmacology, vol. 167, No. 3, Sep. 5, 2012, pp. 483-492.
Choi, et al., "A general strategy for generating intact, full-length IgG antibodies that penetrate into the cytosol of living cells", mAbs, vol. 6, No. 6, Dec. 2014, pp. 1402-1414.
Clark, et al., "Discovery and Development of Janus Kinase (JAK) Inhibitors for Inflammatory Diseases", J. Med. Chem., vol. 57, No. 12, Jan. 13, 2014, pp. 5023-5038.
Colburn, et al., "Serum antiguanosine antibodies as a marker for SLE disease activity and pathogen potential", Clinica Chimica Acta, vol. 370, No. 102, Aug. 2006, pp. 9-16.
Crump, Andy, "Ivermectin: enigmatic multifaceted 'wonder' drug continues to surprise and exceed expectations", The Journal of Antibiotics, vol. 70, No. 5, Feb. 15, 2017, pp. 495-505.
Delany, et al., "The synthetic retinoid (4-hydroxyphenyl)retinamide decreases collagen expression in vitro and in the tight-skin mouse", Arthritis Rheum., vol. 36, No. 7, Jul. 1993, pp. 983-993.
Greenspan, et al., "Defining epitopes: It's not as easy as it seems", Nat Biotechnol., vol. 17, No. 10, Oct. 1999, pp. 936-937.
Guido, et al., "Virtual Screening and Its Integration with Modern Drug Design Technologies", Curr Med Chem., vol. 15, No. 1, 2008, pp. 37-46.
Henke, et al., "The fungal lactone oxacyclododecindione is a potential new therapeutic substance in the treatment of lupus-associated kidney disease", Kidney International, vol. 86, No. 4, Oct. 2014, pp. 780-789.
Jacobson, et al., "An isotype switched and somatically mutated rheumatoid factor clone isolated from a MRL-lpr/lpr mouse exhibits limited intraclonal affinity maturation", J Immunol., vol. 152, No. 9, May 1, 1994, pp. 4489-4499.
Kosugi, et al., "Systematic identification of cell cycle-dependent yeast nucleocytoplasmic shuttling proteins by prediction of composite motifs", Proceedings of the National Academy of Sciences, vol. 106, No. 25, Jun. 23, 2009, pp. 10171-10176.
Kulmanov, et al., "DeepGO: predicting protein functions from sequence and interactions using a deep ontology-aware classifier", Bioinformatics, vol. 34, No. 4, Feb. 2018, pp. 660-668.
Lazar, et al., "Transforming Growth Factor α: Mutation of Aspartic Acid 47 and Leucine 48 Results in Different Biological Activities", Molecular and Cellular Biology, vol. 8, No. 3, Apr. 1988, pp. 1247-1252.
Ma, Chaoyong, "Animal Models of Disease", Modern Drug Discovery, vol. 7, No. 6, Jun. 2004, pp. 30-36.
Mckeague, et al., "Challenges and opportunities for small molecule aptamer development", Journal of Nucleic Acids, vol. 2012, No. 748913, Oct. 24, 2012, 20 pages.
Miosge, et al., "Comparison of predicted and actual consequences of missense mutations", Proceedings of the National Academy of Sciences, vol. 112, No. 37, Aug. 12, 2015, pp. E5189-E5198.
Ngo, et al., "Computational Complexity, Protein Structure Prediction, and the Levinthal Paradox", The Protein Folding Problem and Tertiary Structure Prediction, 1994, pp. 433-506.
Ola, et al., "Importin beta: A novel autoantigen in human autoimmunity identified by screening random peptide libraries on phage", Journal of Autoimmunity, vol. 26, No. 3, May 2006, pp. 197-207.
Pauley, et al., "RNAi Therapeutics in Autoimmune Disease", Pharmaceuticals, vol. 6, No. 3, Mar. 5, 2013, pp. 287-294.
Skolnick, et al., "From genes to protein structure and function: novel applications of computational approaches in the genomic era", Trends in Biotechnology, vol. 18, No. 1, Jan. 1, 2000, pp. 34-39.
Soderholm, et al., "Importazole, a Small Molecule Inhibitor of the Transport Receptor Importin-B", ACS Chem. Biol., vol. 6, No. 7, Apr. 6, 2011, pp. 700-708.

(56) References Cited

OTHER PUBLICATIONS

Steinman, et al., "Optimization of current and future therapy for autoimmune diseases", Nature Medicine, vol. 18, No. 1, Jan. 2012, pp. 59-65.
Takahashi, et al., "cDNA microarray analysis identifies NR4A2 as a novel molecule involved in the pathogenesis of Sjögren's syndrome: cDNA microarray identifies NR4A2 in SS", Clinical and Experimental Immunology, vol. 190, No. 1, Jul. 21, 2017, pp. 96-109.
Tan, et al., "The Potential Use of Metformin, Dipyridamole, N-Acetylcysteine and Statins as Adjunctive Therapy for Systemic Lupus Erythematosus", Cells, vol. 8, No. 323, Apr. 6, 2019, 18 pages.
Torok, et al., "Pharmacogenetics of Crohn's disease", Pharmacogenomics, vol. 9, No. 7, Jul. 3, 2008, pp. 881-893.
Wang, et al., "Dipyridamole analogs as pharmacological inhibitors of equilibrative nucleoside transporters. Identification of novel potent and selective inhibitors of the adenosine transporter function of human equilibrative nucleoside transporter 4 (hENT4)", Biochemical Pharmacology, vol. 86, No. 11, Dec. 1, 2013, pp. 1531-1540.
Warzocha, et al., "Antisense Strategy: Biological Utility and Prospects in the Treatment of Hematological Malignancies", Leukemia & Lymphoma, vol. 24, No. 3-4, 1997, pp. 267-281.
Wells, JamesA. , "Additivity of mutational effects in proteins", Biochemistry, vol. 29, No. 37, Sep. 18, 1990, pp. 8509-8517.
Yao, et al., "Strategies on the nuclear-targeted delivery of genes", J Drug Target, vol. 21, No. 10, Dec. 2013, pp. 926-939.

\* cited by examiner

SEQUENCE LISTING

```
<160> NUMBER OF SEQ ID NOS: 24

<210> SEQ ID NO 1
<211> LENGTH: 107
<212> TYPE: PRT
<213> ORGANISM: Mus musculus

<400> SEQUENCE: 1

Asp Ile Val Leu Thr Gln Ser Pro Ala Thr Leu Ser Val Thr Pro Gly
1               5                   10                  15

Asp Arg Val Ser Leu Ser Cys Arg Ala Ser Gln Ser Ile Ser Asn Tyr
            20                  25                  30

Leu His Trp Tyr Gln Gln Lys Ser His Glu Ser Pro Arg Leu Leu Ile
        35                  40                  45

Lys Tyr Ala Ser Gln Ser Ile Ser Gly Ile Pro Ser Arg Phe Ser Gly
    50                  55                  60

Ser Gly Ser Gly Thr Asp Phe Thr Leu Ser Ile Ile Ser Val Glu Thr
65                  70                  75                  80

Glu Asp Phe Gly Met Tyr Phe Cys Gln Gln Ser Asn Ser Trp Pro Leu
                85                  90                  95

Thr Phe Gly Ala Gly Thr Lys Leu Glu Leu Lys
            100                 105

<210> SEQ ID NO 2
<211> LENGTH: 11
<212> TYPE: PRT
<213> ORGANISM: Mus musculus

<400> SEQUENCE: 2

Arg Ala Ser Gln Ser Ile Ser Asn Tyr Leu His
1               5                   10

<210> SEQ ID NO 3
<211> LENGTH: 7
<212> TYPE: PRT
<213> ORGANISM: Mus musculus

<400> SEQUENCE: 3

Tyr Ala Ser Gln Ser Ile Ser
1               5

<210> SEQ ID NO 4
<211> LENGTH: 9
<212> TYPE: PRT
```

```
<213> ORGANISM: Mus musculus

<400> SEQUENCE: 4

Gln Gln Ser Asn Ser Trp Pro Leu Thr
1               5

<210> SEQ ID NO 5
<211> LENGTH: 116
<212> TYPE: PRT
<213> ORGANISM: Mus musculus

<400> SEQUENCE: 5

Glu Val Gln Leu Gln Gln Ser Gly Pro Glu Leu Val Lys Pro Gly Ala
1               5                   10                  15

Ser Val Lys Met Ser Cys Lys Ala Ser Gly Tyr Thr Phe Thr Asp Tyr
            20                  25                  30

Tyr Met Asn Trp Val Lys Gln Ser His Gly Lys Ser Leu Glu Trp Ile
        35                  40                  45

Gly Arg Val Asn Pro Ser Asn Gly Gly Ile Ser Tyr Asn Gln Lys Phe
    50                  55                  60

Lys Gly Lys Ala Thr Leu Thr Val Asp Lys Ser Leu Ser Thr Ala Tyr
65                  70                  75                  80

Met Gln Leu Asn Ser Leu Thr Ser Glu Asp Ser Ala Val Tyr Tyr Cys
                85                  90                  95

Ala Arg Gly Pro Tyr Thr Met Tyr Tyr Trp Gly Gln Gly Thr Ser Val
            100                 105                 110

Thr Val Ser Ser
        115

<210> SEQ ID NO 6
<211> LENGTH: 5
<212> TYPE: PRT
<213> ORGANISM: Mus musculus

<400> SEQUENCE: 6

Asp Tyr Tyr Met Asn
1               5

<210> SEQ ID NO 7
<211> LENGTH: 17
<212> TYPE: PRT
<213> ORGANISM: Mus musculus

<400> SEQUENCE: 7

Arg Val Asn Pro Ser Asn Gly Gly Ile Ser Tyr Asn Gln Lys Phe Lys
1               5                   10                  15

Gly

<210> SEQ ID NO 8
<211> LENGTH: 7
<212> TYPE: PRT
<213> ORGANISM: Mus musculus

<400> SEQUENCE: 8

Gly Pro Tyr Thr Met Tyr Tyr
1               5

<210> SEQ ID NO 9
<211> LENGTH: 7
<212> TYPE: PRT
<213> ORGANISM: Artificial Sequence
```

```
<220> FEATURE:
<223> OTHER INFORMATION: synthetic polypeptide

<400> SEQUENCE: 9

Gly Gln Ser Ser Arg Ser Ser
1               5

<210> SEQ ID NO 10
<211> LENGTH: 18
<212> TYPE: PRT
<213> ORGANISM: Artificial Sequence
<220> FEATURE:
<223> OTHER INFORMATION: synthetic polypeptide

<400> SEQUENCE: 10

Gly Gln Ser Ser Arg Ser Ser Ser Gly Gly Gly Ser Ser Gly Gly Gly
1               5                   10                  15

Gly Ser

<210> SEQ ID NO 11
<211> LENGTH: 4
<212> TYPE: PRT
<213> ORGANISM: Artificial Sequence
<220> FEATURE:
<223> OTHER INFORMATION: synthetic polypeptide

<400> SEQUENCE: 11

Gly Ser Gly Ser
1

<210> SEQ ID NO 12
<211> LENGTH: 4
<212> TYPE: PRT
<213> ORGANISM: Artificial Sequence
<220> FEATURE:
<223> OTHER INFORMATION: synthetic polypeptide

<400> SEQUENCE: 12

Gly Gly Gly Ser
1

<210> SEQ ID NO 13
<211> LENGTH: 10
<212> TYPE: PRT
<213> ORGANISM: Artificial Sequence
<220> FEATURE:
<223> OTHER INFORMATION: synthetic polypeptide

<400> SEQUENCE: 13

Gly Gly Gly Gly Ser Gly Gly Gly Gly Ser
1               5                   10

<210> SEQ ID NO 14
<211> LENGTH: 20
<212> TYPE: PRT
<213> ORGANISM: Artificial Sequence
<220> FEATURE:
<223> OTHER INFORMATION: synthetic polypeptide

<400> SEQUENCE: 14

Gly Gly Gly Gly Ser Gly Gly Gly Ser Gly Gly Gly Ser Gly
1               5                   10                  15

Gly Gly Gly Ser
                20
```

```
<210> SEQ ID NO 15
<211> LENGTH: 15
<212> TYPE: PRT
<213> ORGANISM: Artificial Sequence
<220> FEATURE:
<223> OTHER INFORMATION: synthetic polypeptide

<400> SEQUENCE: 15

Gly Gly Gly Gly Ser Gly Gly Gly Ser Gly Gly Gly Gly Ser
1               5                   10                  15

<210> SEQ ID NO 16
<211> LENGTH: 6
<212> TYPE: PRT
<213> ORGANISM: Artificial Sequence
<220> FEATURE:
<223> OTHER INFORMATION: synthetic polypeptide

<400> SEQUENCE: 16

Arg Ala Asp Ala Ala Pro
1               5

<210> SEQ ID NO 17
<211> LENGTH: 13
<212> TYPE: PRT
<213> ORGANISM: Homo sapiens

<400> SEQUENCE: 17

Ala Ser Thr Lys Gly Pro Ser Val Phe Pro Leu Ala Pro
1               5                   10

<210> SEQ ID NO 18
<211> LENGTH: 6
<212> TYPE: PRT
<213> ORGANISM: Artificial Sequence
<220> FEATURE:
<223> OTHER INFORMATION: synthetic polypeptide

<400> SEQUENCE: 18

Leu Glu Ser Ser Gly Ser
1               5

<210> SEQ ID NO 19
<211> LENGTH: 6
<212> TYPE: PRT
<213> ORGANISM: Artificial Sequence
<220> FEATURE:
<223> OTHER INFORMATION: synthetic polypeptide

<400> SEQUENCE: 19

Pro Leu Gly Leu Ala Gly
1               5

<210> SEQ ID NO 20
<211> LENGTH: 6
<212> TYPE: PRT
<213> ORGANISM: Artificial Sequence
<220> FEATURE:
<223> OTHER INFORMATION: synthetic polypeptide

<400> SEQUENCE: 20

Arg Leu Gln Leu Lys Leu
1               5

<210> SEQ ID NO 21
<211> LENGTH: 541
<212> TYPE: PRT
```

<213> ORGANISM: Artificial Sequence
<220> FEATURE:
<223> OTHER INFORMATION: synthetic polypeptide

<400> SEQUENCE: 21

```
Ala Gly Ile His Asp Ile Val Leu Thr Gln Ser Pro Ala Ser Leu Ala
1               5                   10                  15

Val Ser Leu Gly Gln Arg Ala Thr Ile Ser Cys Arg Ala Ser Lys Ser
            20                  25                  30

Val Ser Thr Ser Ser Tyr Ser Tyr Met His Trp Tyr Gln Gln Lys Pro
        35                  40                  45

Gly Gln Pro Pro Lys Leu Leu Ile Lys Tyr Ala Ser Tyr Leu Glu Ser
    50                  55                  60

Gly Val Pro Ala Arg Phe Ser Gly Ser Gly Thr Asp Phe Thr
65                  70                  75                  80

Leu Asn Ile His Pro Val Glu Glu Asp Ala Ala Thr Tyr Tyr Cys
                85                  90                  95

Gln His Ser Arg Glu Phe Pro Trp Thr Phe Gly Gly Gly Thr Lys Leu
            100                 105                 110

Glu Ile Lys Arg Ala Asp Ala Ala Pro Gly Gly Gly Ser Gly Gly
        115                 120                 125

Gly Gly Ser Gly Gly Gly Ser Glu Val Gln Leu Val Glu Ser Gly
    130                 135                 140

Gly Gly Leu Val Lys Pro Gly Gly Ser Arg Lys Leu Ser Cys Ala Ala
145                 150                 155                 160

Ser Gly Phe Thr Phe Ser Asn Tyr Gly Met His Trp Val Arg Gln Ala
                165                 170                 175

Pro Glu Lys Gly Leu Glu Trp Val Ala Tyr Ile Ser Ser Gly Ser Ser
            180                 185                 190

Thr Ile Tyr Tyr Ala Asp Thr Val Lys Gly Arg Phe Thr Ile Ser Arg
        195                 200                 205

Asp Asn Ala Lys Asn Thr Leu Phe Leu Gln Met Thr Ser Leu Arg Ser
    210                 215                 220

Glu Asp Thr Ala Met Tyr Tyr Cys Ala Arg Arg Gly Leu Leu Leu Asp
225                 230                 235                 240

Tyr Trp Gly Gln Gly Thr Thr Leu Thr Val Ser Ser Ala Ser Thr Lys
                245                 250                 255

Gly Pro Ser Val Phe Pro Leu Ala Pro Leu Glu Ser Ser Gly Ser Asp
            260                 265                 270

Ile Val Leu Thr Gln Ser Pro Ala Ser Leu Ala Val Ser Leu Gly Gln
        275                 280                 285

Arg Ala Thr Ile Ser Cys Arg Ala Ser Lys Ser Val Ser Thr Ser Ser
    290                 295                 300

Tyr Ser Tyr Met His Trp Tyr Gln Gln Lys Pro Gly Gln Pro Pro Lys
305                 310                 315                 320

Leu Leu Ile Lys Tyr Ala Ser Tyr Leu Glu Ser Gly Val Pro Ala Arg
                325                 330                 335

Phe Ser Gly Ser Gly Ser Gly Thr Asp Phe Thr Leu Asn Ile His Pro
            340                 345                 350

Val Glu Glu Asp Ala Ala Thr Tyr Tyr Cys Gln His Ser Arg Glu
        355                 360                 365

Phe Pro Trp Thr Phe Gly Gly Gly Thr Lys Leu Glu Ile Lys Arg Ala
370                 375                 380

Asp Ala Ala Pro Gly Gly Gly Gly Ser Gly Gly Gly Gly Ser Gly Gly
```

```
            385                 390                 395                 400
Gly Gly Ser Glu Val Gln Leu Val Glu Ser Gly Gly Leu Val Lys
                405                 410                 415

Pro Gly Gly Ser Arg Lys Leu Ser Cys Ala Ala Ser Gly Phe Thr Phe
            420                 425                 430

Ser Asn Tyr Gly Met His Trp Val Arg Gln Ala Pro Glu Lys Gly Leu
            435                 440                 445

Glu Trp Val Ala Tyr Ile Ser Ser Gly Ser Ser Thr Ile Tyr Tyr Ala
        450                 455                 460

Asp Thr Val Lys Gly Arg Phe Thr Ile Ser Arg Asp Asn Ala Lys Asn
465                 470                 475                 480

Thr Leu Phe Leu Gln Met Thr Ser Leu Arg Ser Glu Asp Thr Ala Met
                485                 490                 495

Tyr Tyr Cys Ala Arg Arg Gly Leu Leu Leu Asp Tyr Trp Gly Gln Gly
            500                 505                 510

Thr Thr Leu Thr Val Ser Ser Leu Glu Gln Lys Leu Ile Ser Glu Glu
            515                 520                 525

Asp Leu Asn Ser Ala Val Asp His His His His His His
530                 535                 540
```

<210> SEQ ID NO 22
<211> LENGTH: 249
<212> TYPE: PRT
<213> ORGANISM: Artificial Sequence
<220> FEATURE:
<223> OTHER INFORMATION: synthetic polypeptide

<400> SEQUENCE: 22

```
Asp Ile Val Leu Thr Gln Ser Pro Ala Thr Leu Ser Val Thr Pro Gly
1               5                   10                  15

Asp Arg Val Ser Leu Ser Cys Arg Ala Ser Gln Ser Ile Ser Asn Tyr
            20                  25                  30

Leu His Trp Tyr Gln Gln Lys Ser His Glu Ser Pro Arg Leu Leu Ile
        35                  40                  45

Lys Tyr Ala Ser Gln Ser Ile Ser Gly Ile Pro Ser Arg Phe Ser Gly
50                  55                  60

Ser Gly Ser Gly Thr Asp Phe Thr Leu Ser Ile Ser Val Glu Thr
65              70                  75                  80

Glu Asp Phe Gly Met Tyr Phe Cys Gln Gln Ser Asn Ser Trp Pro Leu
                85                  90                  95

Thr Phe Gly Ala Gly Thr Lys Leu Glu Leu Lys Ala Asp Ala Ala Pro
            100                 105                 110

Gly Gly Gly Gly Ser Gly Gly Gly Ser Gly Gly Gly Ser Glu
            115                 120                 125

Val Gln Leu Gln Gln Ser Gly Pro Glu Leu Val Lys Pro Gly Ala Ser
        130                 135                 140

Val Lys Met Ser Cys Lys Ala Ser Gly Tyr Thr Phe Thr Asp Tyr Tyr
145                 150                 155                 160

Met Asn Trp Val Lys Gln Ser His Gly Lys Ser Leu Glu Trp Ile Gly
                165                 170                 175

Arg Val Asn Pro Ser Asn Gly Ile Ser Tyr Asn Gln Lys Phe Lys
            180                 185                 190

Gly Lys Ala Thr Leu Thr Val Asp Lys Ser Leu Ser Thr Ala Tyr Met
        195                 200                 205

Gln Leu Asn Ser Leu Thr Ser Glu Asp Ser Ala Val Tyr Tyr Cys Ala
```

```
                210                 215                 220
Arg Gly Pro Tyr Thr Met Tyr Tyr Trp Gly Gln Gly Thr Ser Val Thr
225                 230                 235                 240

Val Ser Ser His His His His His His
                245
```

<210> SEQ ID NO 23
<211> LENGTH: 268
<212> TYPE: PRT
<213> ORGANISM: Artificial Sequence
<220> FEATURE:
<223> OTHER INFORMATION: synthetic polypeptide

<400> SEQUENCE: 23

```
Met Gly Trp Ser Cys Ile Ile Leu Phe Leu Val Ala Thr Ala Thr Gly
1               5                   10                  15

Val His Ser Asp Ile Val Leu Thr Gln Ser Pro Ala Thr Leu Ser Val
                20                  25                  30

Thr Pro Gly Asp Arg Val Ser Leu Ser Cys Arg Ala Ser Gln Ser Ile
            35                  40                  45

Ser Asn Tyr Leu His Trp Tyr Gln Gln Lys Ser His Glu Ser Pro Arg
    50                  55                  60

Leu Leu Ile Lys Tyr Ala Ser Gln Ser Ile Ser Gly Ile Pro Ser Arg
65                  70                  75                  80

Phe Ser Gly Ser Gly Ser Gly Thr Asp Phe Thr Leu Ser Ile Ile Ser
                85                  90                  95

Val Glu Thr Glu Asp Phe Gly Met Tyr Phe Cys Gln Gln Ser Asn Ser
                100                 105                 110

Trp Pro Leu Thr Phe Gly Ala Gly Thr Lys Leu Glu Leu Lys Ala Asp
            115                 120                 125

Ala Ala Pro Gly Gly Gly Gly Ser Gly Gly Gly Ser Gly Gly Gly Gly
    130                 135                 140

Gly Ser Glu Val Gln Leu Gln Gln Ser Gly Pro Glu Leu Val Lys Pro
145                 150                 155                 160

Gly Ala Ser Val Lys Met Ser Cys Lys Ala Ser Gly Tyr Thr Phe Thr
                165                 170                 175

Asp Tyr Tyr Met Asn Trp Val Lys Gln Ser His Gly Lys Ser Leu Glu
                180                 185                 190

Trp Ile Gly Arg Val Asn Pro Ser Asn Gly Gly Ile Ser Tyr Asn Gln
            195                 200                 205

Lys Phe Lys Gly Lys Ala Thr Leu Thr Val Asp Lys Ser Leu Ser Thr
    210                 215                 220

Ala Tyr Met Gln Leu Asn Ser Leu Thr Ser Glu Asp Ser Ala Val Tyr
225                 230                 235                 240

Tyr Cys Ala Arg Gly Pro Tyr Thr Met Tyr Tyr Trp Gly Gln Gly Thr
                245                 250                 255

Ser Val Thr Val Ser Ser His His His His His His
                260                 265
```

<210> SEQ ID NO 24
<211> LENGTH: 831
<212> TYPE: DNA
<213> ORGANISM: Artificial Sequence
<220> FEATURE:
<223> OTHER INFORMATION: synthetic polynucleotide

<400> SEQUENCE: 24

```
gaattcccgc cgccaccatg ggctggtcct gcatcattct gtttctggtg gccacagcca        60
ccggcgtgca ctctgatatt gtgctgacac agagccccgc cacactgtct gttacccctg       120
gcgatagagt gtccctgagc tgtagagcca gccagagcat cagcaactac ctgcactggt       180
atcagcagaa gtcccacgag agccccagac tgctgattaa gtacgccagc cagtctatca       240
gcggcatccc cagcagattt tctggcagcg gctctggcac cgacttcacc ctgtctatca       300
tcagcgtgga aaccgaggac ttcgggatgt acttctgcca gcagtccaac agctggcccc       360
tgacatttgg cgccggaaca aagctggaac tgaaggccga tgctgctcct ggtggcggag       420
gatctggcgg aggtggaagc ggcggaggcg gatctgaagt tcagctgcag caaagcggac       480
ccgagctggt taagcctggc gcctctgtga agatgagctg caaggccagc ggctacacct       540
tcaccgacta ctacatgaac tgggtcaagc agagccacgg caagagcctg aatggatcg        600 gcagagtgaa ccccagcaat ggcggcatca gctacaacca gaagttcaag ggcaaagcca       660
cactgaccgt ggataagagc ctgagcaccg cctacatgca gctcaacagc ctgaccagcg       720
aggacagcgc cgtgtactat tgtgccgaga gaccctacac catgtactac tggggccagg       780
gcacaagcgt gaccgtgtct agccaccacc accatcacca ctgataagct t                831
```

ANTI-GUANOSINE ANTIBODY AS A MOLECULAR DELIVERY VEHICLE

CROSS-REFERENCE TO RELATED APPLICATIONS

This application is a National Phase application under 35 U.S.C. 371 of PCT/US2017/037753, filed Jun. 15, 2017, which claims the benefit of and priority to U.S. Ser. No. 62/350,419 filed Jun. 15, 2016 and which are incorporated by reference in their entirety.

REFERENCE TO SEQUENCE LISTING

The Sequence Listing submitted as a text file named "YU_7041_PCT_ST25.txt," created on Jun. 15, 2017, and having a size of 16,136 bytes is hereby incorporated by reference pursuant to 37 C.F.R § 1.52(e)(5).

FIELD OF THE INVENTION

The field of the invention is generally in the field of drug delivery, particularly to sites of extracellular guanosine and DNA such as those found in and near tumors, sites of injuries and damage, ischemic tissue, and sites of infection. The field of the invention also relates to the delivery of relevant cargos to the cytoplasmic compartment inside of cells.

BACKGROUND OF THE INVENTION

The first nanodrug, Doxil®, which is a formulation of doxorubicin (DOX) in liposomal nanocarriers, was approved by the FDA for treatment of human patients with AIDS-related Kaposi's sarcoma in 1995 (Barenholz, et al., *Journal of Controlled Release: Official Journal of the Controlled Release Society*, 160(2):117-134 (2012)). Since then, development of nanocarriers for delivery of chemotherapeutic drugs has emerged as a promising approach to cancer drug development. Compared to free drugs, employment of nanocarriers has many advantages. For example, nanocarriers allow for delivery of hydrophobic or toxic drugs that otherwise are unable to be directly administered. They also provide protection to drugs that by themselves would be degraded or eliminated by ATP-binding cassette (ABC) transporters in the circulation. Moreover, due to the enhanced permeability and retention (EPR) effect resulting from the size difference between interendothelial junctions in tumors (40-80 nm) and healthy tissue (<8 nm) and defective lymphatic drainage in tumors (Jain, *Cancer Metastasis Rev,* 6(4):559-593 (1987)), employment of nanocarriers alters the bio-distribution of chemotherapeutic drugs and results in preferential drug accumulation in tumors. However, this passive targeting approach based on the EPR effect may not be sufficient to yield meaningful gains in cancer therapy (Chauhan, et al., *Nat Mater,* 12(11):958-962 (2013)).

To further enhance targeting efficiency, nanocarriers can be engineered through conjugation to ligands that have high affinities for molecules overexpressed in cancer cells or the tumor neovasculature or tumor microenvironment. For example, S, S-2-[3-[5-amino-1-carboxypentyl]-ureido]-pentanedioic acid (ACUPA) targets prostate-specific membrane antigen (PSMA) (Hrkach, et al., *Sci Transl Med,* 4(128): 128ra139 (2012)); iRGD targets αv integrins in the tumor neovasculature (Sugahara, et al, *Cancer Cell,* 16(6):510-520 (2009), Zhou, et al., *Biomaterials,* 33(2):583-591 (2012)); and chlorotoxin (CTX) targets matrix metalloproteinase-2 (MMP2) (Han, et al., *ACS Nano,* 10(4):4209-4218 (2016)). ACUPA-conjugated nanomedicine and iRGD-conjugated nanomedicine have successfully advanced to clinical trials and demonstrated improved efficacy (Chow, et al., *Sci Transl Med,* 5(216):216rv214 (2013), Service, et al., *Science,* 330 (6002):314-315 (2010)). Nonetheless, these traditional targeting approaches suffer from a significant limitation: with the delivery of chemotherapeutic agents which kill tumor cells and neovasculature, the amount of molecules available for targeted delivery decreases with time; consequently, the efficiency of nanoparticle accumulation in tumors is reduced. Over the past several years, many attempts have been made to overcome this limitation, including efforts to employ separate nanoparticle formulations that communicate in vivo via induction of a coagulation cascade (von Maltzahn, et al., *Nat Mater,* 10(7):545-552 (2011)). However, the complexity of such systems may limit the ability to apply this technique in the clinic. Alternate strategies to target nanocarriers to tumors are needed in order to help translate nanomedicine approaches into clinical meaningful therapies.

In addition to nanomedicine, techniques are needed for delivery of relevant cargoes to cell cytoplasmic compartments. The cell membrane presents a formidable barrier to most protein based therapeutics.

Thus it is an object of the invention to provide compositions and methods of use thereof for targeting nanocarriers to guanosine.

It is another object of the invention to provide autocatalytic treatment regimens.

It is another object of the invention to provide a method for delivery of relevant cargoes to the inside of cells using an antiguanosine antibody as a cytoplasmic delivery vehicle.

SUMMARY OF THE INVENTION

Guanosine-targeted nanocarriers for encapsulating an active agent and delivering it to sites of release of extracellular guanosine and DNA are provided. The nanocarriers, for example, polymeric particles, liposomes, and multilamellar vesicles have targeting moiety that targets guanosine attached, linked, or conjugated thereto. The targeting moiety that targets guanosine is typically an antibody, or variant, fragment, or fusion protein derived therefrom that binds to guanosine or components thereof.

Anti-guanosine antibodies that penetrate into the cytoplasm of living cells are also provided as a means for delivering relevant cargoes into the inside of cells.

The targeting or delivery moiety can be a circulating autoantibody that binds guanosine such as those found in patients with SLE. In some embodiments, the targeting or delivery moiety is antibody 4H2, or a variant, fragment, or fusion protein derived therefrom. For example, the targeting or delivery moiety can be a Fab, (Fab')2, minibody, $V_L$, $V_H$, scFv-Fc, diabody, triabody, tetrabody, or other component or derivative of antibody 4H2 or a variant thereof. The targeting or delivery moiety can be a mono-, di-, or tri-valent single chain variable fragment (scFV) of antibody 4H2, or a variant thereof.

The targeting moiety or delivery vehicle can, for example, include (i) a heavy chain comprising the three complementrarity-determining regions (CDR) of SEQ ID NO:5 or a humanized for thereof, and light chain comprising the three CDR of SEQ ID NO:1 or a humanized form thereof; or (ii) a heavy chain including the amino acid sequence from SEQ ID NO: 5 or a humanized form thereof, or a variant therefore comprising at least 70% sequence identity to SEQ ID NO:5, and a light chain comprising the amino acid sequence of SEQ ID NO:1 or a humanized form thereof, or a variant therefore including at least 70% sequence identity to SEQ ID NO:1; or (iii) the scFv of SEQ ID NO:22, or a humanized form thereof, or a variant therefore including at least 70% sequence identity to SEQ ID NO:22.

In some embodiments, the targeting or delivery moiety can be released at the target site and serve as an active agent. For example, the targeting or delivery moiety can be linked to the nanocarrier with a disulfide bond that can be cleaved in the presence of glutathione such as can be found in a tumor's microenvironment.

In some embodiments, the nanocarriers are polymeric nanoparticles. The polymeric nanoparticles can be formed of one or more biodegradable polyesters or polyanhydrides, for example, poly(lactic acid), poly(glycolic acid), or poly(lactic-co-glycolic acid). In a particular embodiment, the polymeric nanoparticles are formed of PLGA-poly(ε-carbobenzoxyl-L-lysine) (PLL).

Typically, the nanocarriers have one or more active agents encapsulated therein. Pharmaceutical compositions including an effective amount of nanocarrier and a pharmaceutically acceptable carrier for administration to a subject in need thereof are also provided. Methods of treating a subject in need thereof by administering the subject an effective amount of nanocarrier, typically in a pharmaceutical composition, are also disclosed. In some embodiments, the subject has cancer, ischemia, or an injury, or an infection, or a genetic or autoimmune disease.

The active agents can selected based on the intended therapeutic, diagnostic, or prophylactic use. For example, when treating cancer, the active agent(s) may be anti-angiogenic agent, anti-proliferative, chemotherapeutic agent, cytotoxic agent, radiosensitizer or a combination thereof. For treating ischemia, the active agent(s) may increase blood flow, reduce coagulation, induce arterial dilation, induce or increase thrombolysis, protect and prolong survival of cells in the area of ischemia, or a combination thereof. For treating injury the active agent(s) may be an analgesic, anesthetic, anti-inflammatory, anti-infective, cytokine, chemokine, immunomodulator, an agent that promotes wound healing, an agent that protects and prolongs survival of cells in the area of injury, or a combination thereof. For treating infection the active agent(s) may be an antimicrobial agent, antiviral agent, antibacterial agent, antibiotic, antibody or fragment of variant thereof, analgesic, anesthetic, anti-inflammatory, anti-infective, cytokine, chemokine, immunomodulator, an agent that promotes wound healing, an agent that protects and prolongs survival of cells in the area of infection, or a combination thereof.

For the cytoplasmic delivery approach, typically the cargoes are attached to 4H2 by chemical conjugation or recombinant fusion. Pharmaceutical compositions including an effective amount of cargo linked to 4H2 and a pharmaceutically acceptable carrier for administration to a subject in need thereof are also provided. Methods of treating a subject in need thereof by administering the subject an effective amount of cargo linked to 4H2, typically in a pharmaceutical composition, are also disclosed. In some embodiments, the subject has cancer, ischemia, or an injury, or an infection, or a genetic or autoimmune disease. The active cargo can selected based on the intended therapeutic, diagnostic, or prophylactic use. For example, when treating cancer, the active agent(s) may be anti-angiogenic agent, anti-proliferative, chemotherapeutic agent, cytotoxic agent, radiosensitizer or a combination thereof. For treating ischemia, the active agent(s) may increase blood flow, reduce coagulation, induce arterial dilation, induce or increase thrombolysis, protect and prolong survival of cells in the area of ischemia, or a combination thereof. For treating injury the active agent(s) may be an analgesic, anesthetic, anti-inflammatory, anti-infective, cytokine, chemokine, immunomodulator, an agent that promotes wound healing, an agent that protects and prolongs survival of cells in the area of injury, or a combination thereof. For treating infection the active agent(s) may be an antimicrobial agent, antiviral agent, antibacterial agent, antibiotic, antibody or fragment of variant thereof, analgesic, anesthetic, anti-inflammatory, anti-infective, cytokine, chemokine, immunomodulator, an agent that promotes wound healing, an agent that protects and prolongs survival of cells in the area of infection, or a combination thereof.

Dosage regimens are also provided. In some embodiments, the composition is administered to the subject two or more times in intervals of hours, days, or weeks. The Examples below demonstrate that when the active agent is a chemotherapeutic agent delivered in the context of cancer, the effectiveness of the treatment improves with subsequent administrations as the active agent induce more cell death and thus more extracellular guanosine and DNA at the target site. In a particular embodiment, a dosage regimen includes two, three, four, five, or more administrations of a pharmaceutical composition including nanocarriers at least one day apart.

Methods of detecting a site or sites of cancer, tissue damage, injury, or ischemia are also provided. The methods typically include administering to a subject in need thereof an effective amount a targeted-nanocarrier in a pharmaceutically acceptable carrier. The nanocarriers are typically loaded with an agent detectable using diagnostic imaging or nuclear medicine techniques, for example, by PET-CT, bone scan, MRI, CT, echocardiography, ultrasound, or x-ray.

DETAILED DESCRIPTION OF THE INVENTION

I. Definitions

Figure 1A:
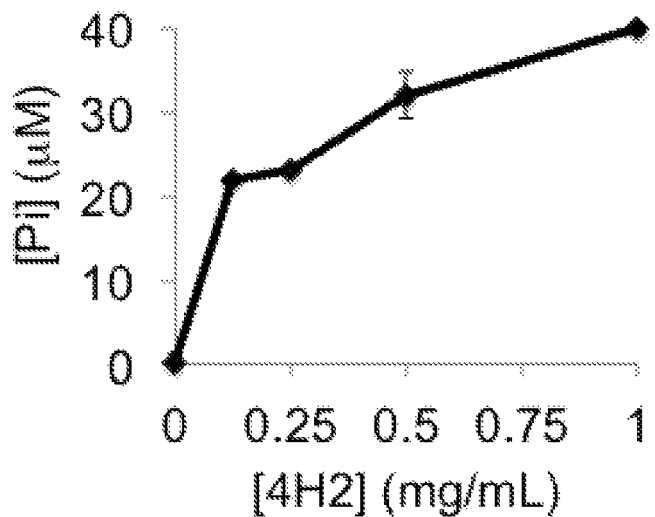
FIG. 1A is a line graph showing the effect of 4H2 on release Pi from GTP as measured by colorimetric assay (N=2).

As used herein, the term "4H2" refers to a monoclonal antibody produced by a hybridoma from MRL/lpr and the sequence of the VL and VH and CDRs is provided in SEQ IDS NOS 1-8.

As used herein, the term "scFv" as used herein means a single chain variable fragment that includes a light chain variable region ($V_L$) and a heavy chain variable region ($V_H$) joined by a linker. The $V_L$ and $V_H$ regions may be derived from the parent antibody or may be chemically or recombinantly synthesized.

As used herein, the term "variable region" is intended to distinguish such domain of the immunoglobulin from domains that are broadly shared by antibodies (such as an antibody Fc domain). The variable region comprises a "hypervariable region" whose residues are responsible for antigen binding. The hypervariable region comprises amino acid residues from a "Complementarity Determining Region" or "CDR" (i.e., typically at approximately residues 24-34 (L1), 50-56 (L2) and 89-97 (L3) in the light chain variable domain and at approximately residues 27-35 (H1), 50-65 (H2) and 95-102 (H3) in the heavy chain variable domain; Kabat et al., *Sequences of Proteins of Immunological Interest,* 5th Ed. Public Health Service, National Institutes of Health, Bethesda, MD (1991)) and/or those residues from a "hypervariable loop" (i.e., residues 26-32 (L1), 50-52 (L2) and 91-96 (L3) in the light chain variable domain and 26-32 (H1), 53-55 (H2) and 96-101 (H3) in the heavy chain variable domain; Chothia and Lesk, 1987, *J. Mol. Biol.* 196:901-917).

As used herein, the term "Framework Region" or "FR" residues are those variable domain residues other than the hypervariable region residues as herein defined.

As used herein, the term "antibody" refers to natural or synthetic antibodies that bind a target antigen. The term includes polyclonal and monoclonal antibodies. In addition to intact immunoglobulin molecules, also included in the term "antibodies" are fragments or polymers of those immunoglobulin molecules, and human or humanized versions of immunoglobulin molecules that bind the target antigen.

As used herein, the term "cell-penetrating anti-guanosine antibody" refers to an antibody, or antigen binding fragment or molecule thereof that is transported into the nucleus of living mammalian cells and binds DNA (e.g., single-stranded and/or double-stranded DNA). In some embodiments, the antibody is transported into the cytoplasm of the cells without the aid of a carrier or conjugate. In other embodiments, the antibody is conjugated to a cell-penetrating moiety, such as a cell penetrating peptide.

As used herein, the term "specifically binds" refers to the binding of an antibody to its cognate antigen (for example guanosine or DNA) while not significantly binding to other antigens. Preferably, an antibody "specifically binds" to an antigen with an affinity constant (Ka) greater than about $10^5$ mol$^{-1}$ (e.g., $10^6$ mol$^{-1}$, $10^7$ mol$^{-1}$, $10^8$ mol$^{-1}$, $10^9$ mol$^{-1}$, $10^{10}$ mol$^{-1}$, $10^{11}$ mol$^{-1}$, and $10^{12}$ mol$^{-1}$ or more) with that second molecule.

As used herein, the term "monoclonal antibody" or "MAb" refers to an antibody obtained from a substantially homogeneous population of antibodies, i.e., the individual antibodies within the population are identical except for possible naturally occurring mutations that may be present in a small subset of the antibody molecules.

As used herein, the term "chemosensitivity" refers to the relative susceptibility of cancer cells to the effects of anticancer drugs. The more chemosensitive a cancer cell is, the less anticancer drug is required to kill that cell.

As used herein, the term "radiosensitivity" refers to the relative susceptibility of cells to the harmful effect of ionizing radiation. The more radiosensitive a cell is, the less radiation that is required to kill that cell. In general, it has been found that cell radiosensitivity is directly proportional to the rate of cell division and inversely proportional to the cell's capacity for DNA repair.

As used herein, the term "radioresistant" refers to a cell that does not die when exposed to clinically suitable dosages of radiation.

As used herein, the term "neoplastic cell" refers to a cell undergoing abnormal cell proliferation ("neoplasia"). The growth of neoplastic cells exceeds and is not coordinated with that of the normal tissues around it. The growth typically persists in the same excessive manner even after cessation of the stimuli, and typically causes formation of a tumor.

As used herein, the term "tumor" or "neoplasm" refers to an abnormal mass of tissue containing neoplastic cells. Neoplasms and tumors may be benign, premalignant, or malignant.

As used herein, the term "cancer" or "malignant neoplasm" refers to a cell that displays uncontrolled growth and division, invasion of adjacent tissues, and often metastasizes to other locations of the body.

As used herein, the term "antineoplastic" refers to a composition, such as a drug or biologic, that can inhibit or prevent cancer growth, invasion, and/or metastasis.

As used herein, the term "anti-cancer moiety" refers to any agent, such as a peptide, protein, nucleic acid, or small molecule, which can be combined with the disclosed anti-DNA antibodies to enhance the anti-cancer properties of the antibodies. The term includes antineoplastic drugs, antibodies that bind and inhibit other therapeutic targets in cancer cells, and substances having an affinity for cancer cells for directed targeting of cancer cells.

As used herein, the term "virally transformed cell" refers to a cell that has been infected with a virus or that has incorporated viral DNA or RNA into its genome. The virus can be an acutely-transforming or slowly-transforming oncogenic virus. In acutely transforming viruses, the viral particles carry a gene that encodes for an overactive oncogene called viral-oncogene (v-onc), and the infected cell is transformed as soon as v-onc is expressed. In contrast, in slowly-transforming viruses, the virus genome is inserted near a proto-oncogene in the host genome. Exemplary oncoviruses include Human papillomaviruses (HPV), Hepatitis B (HBV), Hepatitis C (HCV), Human T-lymphotropic virus (HTLV), Kaposi's sarcoma-associated herpesvirus (HHV-8), Merkel cell polyomavirus, Epstein-Barr virus (EBV), Human immunodeficiency virus (HIV), and Human cytomegalovirus (CMV).

As used herein, the "virally infected cell" refers to a cell that has been exposed to or infected with a virus or carries viral genetic material, either RNA or DNA. The virus can be an oncogenic virus or a lytic virus or a latent virus and can cause cancer, immunodeficiency, hepatitis, encephalitis, pneumonitis, respiratory illness, or other disease condition. It has previously been shown that retorviruses, specifically HIV, rely in part upon the base excision repair (BER) pathway for integration into host DNA.

As used herein, the term "inhibit" means to decrease an activity, response, condition, disease, or other biological parameter. This can include, but is not limited to, the complete ablation of the activity, response, condition, or disease. This may also include, for example, a 10% reduction in the activity, response, condition, or disease as compared to the native or control level. Thus, the reduction can be a 10, 20, 30, 40, 50, 60, 70, 80, 90, 100%, or any amount of reduction in between as compared to native or control levels.

As used herein, the term "fusion protein" refers to a polypeptide formed by the joining of two or more polypeptides through a peptide bond formed between the amino terminus of one polypeptide and the carboxyl terminus of another polypeptide or through linking of one polypeptide to another through reactions between amino acid side chains (for example disulfide bonds between cysteine residues on each polypeptide). The fusion protein can be formed by the chemical coupling of the constituent polypeptides or it can be expressed as a single polypeptide from a nucleic acid sequence encoding the single contiguous fusion protein. Fusion proteins can be prepared using conventional techniques in molecular biology to join the two genes in frame into a single nucleic acid sequence, and then expressing the nucleic acid in an appropriate host cell under conditions in which the fusion protein is produced.

As used herein, the term "variant" refers to a polypeptide or polynucleotide that differs from a reference polypeptide or polynucleotide, but retains essential properties. A typical variant of a polypeptide differs in amino acid sequence from another, reference polypeptide. Generally, differences are limited so that the sequences of the reference polypeptide and the variant are closely similar overall and, in many regions, identical. A variant and reference polypeptide may differ in amino acid sequence by one or more modifications (e.g., substitutions, additions, and/or deletions). A substituted or inserted amino acid residue may or may not be one encoded by the genetic code. A variant of a polypeptide may be naturally occurring such as an allelic variant, or it may be a variant that is not known to occur naturally.

Modifications and changes can be made in the structure of the polypeptides of in disclosure and still obtain a molecule having similar characteristics as the polypeptide (e.g., a conservative amino acid substitution). For example, certain amino acids can be substituted for other amino acids in a sequence without appreciable loss of activity. Because it is the interactive capacity and nature of a polypeptide that defines that polypeptide's biological functional activity, certain amino acid sequence substitutions can be made in a polypeptide sequence and nevertheless obtain a polypeptide with like properties.

In making such changes, the hydropathic index of amino acids can be considered. The importance of the hydropathic amino acid index in conferring interactive biologic function on a polypeptide is generally understood in the art. It is known that certain amino acids can be substituted for other amino acids having a similar hydropathic index or score and still result in a polypeptide with similar biological activity. Each amino acid has been assigned a hydropathic index on the basis of its hydrophobicity and charge characteristics. Those indices are: isoleucine (+4.5); valine (+4.2); leucine (+3.8); phenylalanine (+2.8); cysteine/cystine (+2.5); methionine (+1.9); alanine (+1.8); glycine (−0.4); threonine (−0.7); serine (−0.8); tryptophan (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5).

It is believed that the relative hydropathic character of the amino acid determines the secondary structure of the resultant polypeptide, which in turn defines the interaction of the polypeptide with other molecules, such as enzymes, substrates, receptors, antibodies, antigens, and cofactors. It is known in the art that an amino acid can be substituted by another amino acid having a similar hydropathic index and still obtain a functionally equivalent polypeptide. In such changes, the substitution of amino acids whose hydropathic indices are within +2 is preferred, those within +1 are particularly preferred, and those within +0.5 are even more particularly preferred.

Substitution of like amino acids can also be made on the basis of hydrophilicity, particularly where the biological functional equivalent polypeptide or peptide thereby created is intended for use in immunological embodiments. The following hydrophilicity values have been assigned to amino acid residues: arginine (+3.0); lysine (+3.0); aspartate (+3.0±1); glutamate (+3.0±1); serine (+0.3); asparagine (+0.2); glutamnine (+0.2); glycine (0); proline (−0.5±1); threonine (−0.4); alanine (−0.5); histidine (−0.5); cysteine (−1.0); methionine (−1.3); valine (−1.5); leucine (−1.8); isoleucine (−1.8); tyrosine (−2.3); phenylalanine (−2.5); tryptophan (−3.4). It is understood that an amino acid can be substituted for another having a similar hydrophilicity value and still obtain a biologically equivalent, and in particular, an immunologically equivalent polypeptide. In such changes, the substitution of amino acids whose hydrophilicity values are within +2 is preferred, those within +1 are particularly preferred, and those within +0.5 are even more particularly preferred.

As outlined above, amino acid substitutions are generally based on the relative similarity of the amino acid side-chain substituents, for example, their hydrophobicity, hydrophilicity, charge, size, and the like. Exemplary substitutions that take various of the foregoing characteristics into consideration are well known to those of skill in the art and include (original residue: exemplary substitution): (Ala: Gly, Ser), (Arg: Lys), (Asn: Gln, His), (Asp: Glu, Cys, Ser), (Gln: Asn), (Glu: Asp), (Gly: Ala), (His: Asn, Gln), (Ile: Leu, Val), (Leu: Ile, Val), (Lys: Arg), (Met: Leu, Tyr), (Ser: Thr), (Thr: Ser), (Tip: Tyr), (Tyr: Trp, Phe), and (Val: Ile, Leu). Embodiments of this disclosure thus contemplate functional or biological equivalents of a polypeptide as set forth above. In particular, embodiments of the polypeptides can include variants having about 50%, 60%, 70%, 80%, 90%, 95%, 96%, 97%, 98%, 99%, or more sequence identity to the polypeptide of interest.

As used herein, the term "percent (%) sequence identity" is defined as the percentage of nucleotides or amino acids in a candidate sequence that are identical with the nucleotides or amino acids in a reference nucleic acid sequence, after aligning the sequences and introducing gaps, if necessary, to achieve the maximum percent sequence identity. Alignment for purposes of determining percent sequence identity can be achieved in various ways that are within the skill in the art, for instance, using publicly available computer software such as BLAST, BLAST-2, ALIGN, ALIGN-2 or Megalign (DNASTAR) software. Appropriate parameters for measuring alignment, including any algorithms needed to achieve maximal alignment over the full-length of the sequences being compared can be determined by known methods.

For purposes herein, the % sequence identity of a given nucleotides or amino acids sequence C to, with, or against a given nucleic acid sequence D (which can alternatively be phrased as a given sequence C that has or comprises a certain % sequence identity to, with, or against a given sequence D) is calculated as follows:

100 times the fraction W/Z, where W is the number of nucleotides or amino acids scored as identical matches by the sequence alignment program in that program's alignment of C and D, and where Z is the total number of nucleotides or amino acids in D. It will be appreciated that where the length of sequence C is not equal to the length of sequence D, the % sequence identity of C to D will not equal the % sequence identity of D to C.

As used herein, the term "biocompatible" as used herein refers to one or more materials that are neither themselves toxic to the host (e.g., an animal or human), nor degrade (if the material degrades) at a rate that produces monomeric or oligomeric subunits or other byproducts at toxic concentrations in the host.

As used herein, the term "biodegradable" means that the materials degrades or breaks down into its component subunits, or digestion, e.g., by a biochemical process, of the material into smaller (e.g., non-polymeric) subunits.

As used herein, the term "sustained release" refers to release of a substance over an extended period of time in contrast to a bolus type administration in which the entire amount of the substance is made biologically available at one time.

As used herein, the term "particle" refers to any particle formed of, having attached thereon or thereto, or incorporating a therapeutic, diagnostic or prophylactic agent.

As used herein, the term "nanoparticle" generally refers to a particle having a diameter from about 10 nm up to, but not including, about 1 micron, or from 100 nm to about 1 micron. The particles can have any shape. Nanoparticles having a spherical shape are generally referred to as "nanospheres".

As used herein, the term "microspheres" is art-recognized, and includes substantially spherical colloidal structures formed from biocompatible polymers having a size ranging from about one or greater up to about 1000 microns. In general, "microcapsules," also an art-recognized term, may be distinguished from microspheres, as formed of a core and shell. The term "microparticles" is also art-recognized, and includes microspheres and microcapsules, as well as structures that may not be readily placed into either of the above two categories, all with dimensions on average of less than about 1000 microns. If the structures are less than about one micron in diameter, then the corresponding art-recognized terms "nanosphere," "nanocapsule," and "nanoparticle" may be utilized. In certain embodiments, the nanospheres, nanocapsules and nanoparticles have an average diameter of about 500 nm, 200 nm, 100 nm, 50 nm, 10 nm, or 1 nm.

A composition containing microparticles or nanoparticles may include particles of a range of particle sizes. In certain embodiments, the particle size distribution may be uniform, e.g., within less than about a 20% standard deviation of the mean volume diameter, and in other embodiments, still more uniform, e.g., within about 10% of the median volume diameter.

As used herein, the phrase "mean particle size" generally refers to the statistical mean particle size (diameter) of the particles in a population of particles. The diameter of an essentially spherical particle may refer to the physical or hydrodynamic diameter. The diameter of a non-spherical particle may refer preferentially to the hydrodynamic diameter. As used herein, the diameter of a non-spherical particle may refer to the largest linear distance between two points on the surface of the particle. Mean particle size can be measured using methods known in the art, such as dynamic light scattering.

As used herein, the phrases "monodisperse" and "homogeneous size distribution" are used interchangeably and describe a population of nanoparticles or microparticles where all of the particles are the same or nearly the same size. As used herein, a monodisperse distribution refers to particle distributions in which 90% of the distribution lies within 15% of the median particle size, or within 10% of the median particle size, or within 5% of the median particle size.

As used herein, "molecular weight" generally refers to the relative average chain length of the bulk polymer, unless otherwise specified. In practice, molecular weight can be estimated or characterized using various methods including gel permeation chromatography (GPC) or capillary viscometry. GPC molecular weights are reported as the weight-average molecular weight (Mw) as opposed to the number-average molecular weight (Mn). Capillary viscometry provides estimates of molecular weight as the inherent viscosity determined from a dilute polymer solution using a particular set of concentration, temperature, and solvent conditions.

As used herein, the term "targeting moiety" refers to a moiety that localizes to or away from a specific locale. The moiety may be, for example, a protein, nucleic acid, nucleic acid analog, carbohydrate, or small molecule.

Said entity may be, for example, a therapeutic compound such as a small molecule, or a diagnostic entity such as a detectable label. Said locale may be a tissue, a particular cell type, or a subcellular compartment. In one embodiment, the targeting moiety directs the localization of an active entity. The active entity may be a small molecule, protein, polymer, or metal. The active entity may be useful for therapeutic, prophylactic, or diagnostic purposes.

As used herein, the phrase "pharmaceutically acceptable" refers to compositions, polymers and other materials and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

As used herein, the phrase "pharmaceutically acceptable carrier" refers to pharmaceutically acceptable materials, compositions or vehicles, such as a liquid or solid filler, diluent, solvent or encapsulating material involved in carrying or transporting any subject composition, from one organ, or portion of the body, to another organ, or portion of the body. Each carrier must be "acceptable" in the sense of being compatible with the other ingredients of a subject composition and not injurious to the patient.

As used herein, the phrase "pharmaceutically acceptable salts" is art-recognized, and includes relatively non-toxic, inorganic and organic acid addition salts of compounds. Examples of pharmaceutically acceptable salts include those derived from mineral acids, such as hydrochloric acid and sulfuric acid, and those derived from organic acids, such as ethanesulfonic acid, benzenesulfonic acid, and p-toluenesulfonic acid. Examples of suitable inorganic bases for the formation of salts include the hydroxides, carbonates, and bicarbonates of ammonia, sodium, lithium, potassium, calcium, magnesium, aluminum, and zinc. Salts may also be formed with suitable organic bases, including those that are non-toxic and strong enough to form such salts.

As used herein, the term "individual," "host," "subject," and "patient" are used interchangeably to refer to any individual who is the target of administration or treatment. The subject can be a vertebrate, for example, a mammal. Thus, the subject can be a human or veterinary patient.

As used herein, the term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder.

As used herein, the term "therapeutically effective amount" refers to an amount of the therapeutic agent that, when incorporated into and/or onto particles described herein, produces some desired effect at a reasonable benefit/risk ratio applicable to any medical treatment. The effective amount may vary depending on such factors as the disease or condition being treated, the particular targeted constructs being administered, the size of the subject, or the severity of the disease or condition. One of ordinary skill in the art may empirically determine the effective amount of a particular compound without necessitating undue experimentation. In some embodiments, the term "effective amount" refers to an amount of a therapeutic agent or prophylactic agent to reduce or diminish the symptoms of one or more diseases or disorders of the brain, such as reducing tumor size (e.g., tumor volume) or reducing or diminishing one or more symptoms of a neurological disorder, such as memory or learning deficit, tremors or shakes, etc. In still other embodiments, an "effective amount" refers to the amount of a therapeutic agent necessary to repair damaged neurons and/or induce regeneration of neurons.

As used herein, the terms "incorporated" and "encapsulated" refers to incorporating, formulating, or otherwise including an active agent into and/or onto a composition that allows for release, such as sustained release, of such agent in the desired application. The terms contemplate any manner by which a therapeutic agent or other material is incorporated into a polymer matrix, including for example: attached to a monomer of such polymer (by covalent, ionic, or other binding interaction), physical admixture, enveloping the agent in a coating layer of polymer, and having such monomer be part of the polymerization to give a polymeric formulation, distributed throughout the polymeric matrix, appended to the surface of the polymeric matrix (by covalent or other binding interactions), encapsulated inside the polymeric matrix, etc. The term "co-incorporation" or "co-encapsulation" refers to-the incorporation of a therapeutic agent or other material and at least one other therapeutic agent or other material in a subject composition.

More specifically, the physical form in which any therapeutic agent or other material is encapsulated in polymers may vary with the particular embodiment. For example, a therapeutic agent or other material may be first encapsulated in a microsphere and then combined with the polymer in such a way that at least a portion of the microsphere structure is maintained. Alternatively, a therapeutic agent or other material may be sufficiently immiscible in the polymer that it is dispersed as small droplets, rather than being dissolved, in the polymer.

As used herein, "active agent" refers to a physiologically or pharmacologically active substance that acts locally and/or systemically in the body. An active agent is a substance that is administered to a patient for the treatment (e.g., therapeutic agent), prevention (e.g., prophylactic agent), or diagnosis (e.g., diagnostic agent) of a disease or disorder.

II. Compositions

It has been discovered that nanoparticles including an anti-guanosine antibody can be used to delivery therapeutic agents to site of exogenous guanosine and DNA in vivo including, for example, tumors, regions of ischemia such as ischemic brain. Thus the disclosed compositions generally include a nanocarrier with an anti-guanosine antibody, or functional fragment, variant, or fusion protein derived therefrom conjugated thereto. In addition, the disclosed compositions generally include an anti-guanosine antibody, or functional fragment, variant, or fusion protein derived therefrom conjugated to relevant therapeutic cargo molecules for delivery into the cytoplasm of cells.

Nanocarrier compositions including one or more active agents each loaded into, attached to the surface of, and/or enclosed within a delivery vehicle, are provided.

The nanocarrier delivery vehicles can be, for example, polymeric particles, inorganic particles, silica particles, liposomes, micelles, multilamellar vesicles, or microbubbles.

In some embodiments, the delivery vehicles are nanoscale compositions, for example, 10 nm up to, but not including, about 1 micron.

However, it will be appreciated that in some embodiments, and for some uses, the particles can be smaller, or larger (e.g., microparticles, etc.).

Although many of the compositions disclosed herein are referred to as nanoparticle or nanacarrier compositions, it will be appreciated that in some embodiments and for some uses the carrier can be somewhat larger than nanoparticles. For example, carrier compositions can be between about 1 micron to about 1000 microns. Such compositions can be referred to as microparticulate compositions. For example, a nanocarriers according to the present disclosure may be a microparticle. Microparticles can a diameter between, for example, 0.1 and 100 m in size. In another example, the nanocarriers may be a supraparticle. Supraparticles are particles having a diameter above about 100 m in size. For example, supraparticle may have a diameter of about 100 m to about 1,000 m in size.

Microbubbles are bubbles smaller than one millimetre in diameter, but larger than one micrometer with widespread application in industry, life science, and medicine. The composition of the bubble shell and filling material determine empart characteristics such as buoyancy, crush strength, thermal conductivity, and acoustic properties. In medicine they have applications in diagnostics such as imaging and therapeutics such as drug delivery.

In some embodiments for treating cancer it is desirable that the particle be of a size suitable to access the tumor microenvironment. In particular embodiments, the particle is of a size suitable to access the tumor microenvironment and/or the tumor cells by enhanced permeability and retention (EPR) effect. EPR refers to the property by which certain sizes of molecules tend to accumulate in tumor tissue much more than they do in normal tissues. Therefore, in an exemplary treatment of cancer, the delivery vehicle can be in the range of about 25 nm to about 500 nm inclusive, or in the range of about 50 nm to about 300 nm inclusive. In another example, the delivery vehicle can be in the range of about 80 nm to about 120 nm inclusive. In another example, the delivery vehicle can be in the range of about 85 nm to about 110 nm inclusive.

The polymeric nanoparticles are typically formed using an emulsion process, single or double, using an aqueous and a non-aqueous solvent. Typically, the nanoparticles contain a minimal amount of the non-aqueous solvent after solvent removal. Exemplary methods of preparing nanoparticles are described in the examples.

In one embodiment, nanoparticles are prepared using emulsion solvent evaporation method. A polymeric material is dissolved in a water immiscible organic solvent and mixed with a drug solution or a combination of drug solutions. The water immiscible organic solvent can be a GRAS ingredient such as chloroform, dichloromethane, and acyl acetate. The drug can be dissolved in, but is not limited to, one or a plurality of the following: acetone, ethanol, methanol, isopropyl alcohol, acetonitrile and Dimethyl sulfoxide (DMSO). An aqueous solution is then added into the resulting mixture solution to yield emulsion solution by emulsification. The emulsification technique can be, but not limited to, probe sonication or homogenization through a homogenizer.

In another embodiment, nanoparticles are prepared using nanoprecipitation methods or microfluidic devices. A polymeric material is mixed with a drug or drug combinations in a water miscible organic solvent.

The water miscible organic solvent can be one or more of the following: acetone, ethanol, methanol, isopropyl alcohol, acetonitrile and Dimethyl sulfoxide (DMSO). The resulting mixture solution is then added to an aqueous solution to yield nanoparticle solution. The agents may be associated with the surface of, encapsulated within, surrounded by, and/or distributed throughout the polymeric matrix of the particles.

In another embodiment, nanoparticles are prepared by the self-assembly of the amphiphilic polymers, optionally including hydrophilic and/or hydrophobic polymers, using emulsion solvent evaporation, a single-step nanoprecipitation method, or microfluidic devices.

Other exemplary methods of producing nanoparticles encompassed by the present disclosure are described in Zhou, et al., *Biomaterials,* 33(2):583-591 (2012) and Han, et al., *Nanomedicine* (2016).

Two methods to incorporate targeting moieties into the nanoparticles include: i) conjugation of targeting ligands to the hydrophilic region (e.g. PEG) of polymers prior to nanoparticle preparation; and ii) incorporation of targeting molecules onto nanoparticles where the PEG layer on the nanoparticle surface can be cleaved in the presence of a chemical or enzyme at tissues of interest to expose the targeting molecules.

Particles may be microparticles or nanoparticles. Nanoparticles are often utilized for intertissue application, penetration of cells, and certain routes of administration. The nanoparticles may have any desired size for the intended use. The nanoparticles may have any diameter from 10 nm up to about 1,000 nm. The nanoparticle can have a diameter from 10 nm to 900 nm, from 10 nm to 800 nm, from 10 nm to 700 nm, from 10 nm to 600 nm, from 10 nm to 500 nm, from 20 nm from 500 nm, from 30 nm to 500 nm, from 40 nm to 500 nm, from 50 nm to 500 nm, from 50 nm to 400 nm, from 50 nm to 350 nm, from 50 nm to 300 nm, or from 50 nm to 200 nm. In some embodiments the nanoparticles can have a diameter less than 400 nm, less than 300 nm, or less than 200 nm. The range can be between 50 nm and 300 nm.

The average diameters of the nanoparticles are typically between about 50 nm and about 500 nm, or between about 50 nm and about 350 nm. In some embodiments, the average diameters of the nanoparticles are about 100 nm. The zeta potential of the nanoparticles is typically between about −50 mV and about +50 mV, or between about −25 mV and +25 mV, or between about −10 mV and about +10 my.

In some embodiments, the particles are brain-penetrating polymeric nanoparticles that can be loaded with drugs and optimized for intracranial convection-enhanced delivery (CED) such as those discussed in WO 2013/166487 and U.S. Published Application No. 2015/0118311. For example, the particles can be formed by emulsifying a polymer-drug solution, then removing solvent and centrifuging at a first force to remove the larger particles, then collecting the smaller particles using a second higher force to sediment the smaller particles having a diameter of less than 100 nm, or in the range of 25-75 nanometers average diameter, able to penetrate brain interstitial spaces.

Partially water-miscible organic solvents, such as benzyl alcohol, butyl lactate, and ethyl acetate (EA), allow nanoparticle formulation through an emulsion-diffusion mechanism and are able to produce smaller nanoparticles than water-immiscible solvents such as diclouromethane (DCM). Using partially water-miscible organic solvents improves the yield of brain-penetrating nanoparticles. Representative solvents that can be used include DCM, benzyl alcohol, butyl lactate, and ethyl acetate (EA), acetone. EA is particularly attractive because of its low toxicity.

To reduce aggregation, a sugar such as the FDA-approved disaccharide trehalose can added to the composition. Other sugars include glucose, sucrose and lactose. Typically, the weight ratio of sugar to nanoparticles is between 10-50%.

In some embodiments, an anti-guanosine antibody is chemically or recombinantly-linked to a therapeutic cargo molecule other than a nanoparticle, such as a protein, another antibody, DNA, RNA, siRNA, or other therapeutic molecule for delivery into the cytoplasm of cells. Thus, the antibodies, fragments, variants, and fusion proteins can be conjugated to a biological molecule of interest to form an antibody conjugate that is capable of being transported into the cell absent a nanocarrier. Antibody conjugates can be used in the same manner as the other delivery systems disclosed herein where an antibody targeting moiety is linked to a nanocarrier to target delivery of an active agent to desired cells or microenvironment environment. Antibody conjugates can be utilized to transport a wide variety of biologically active materials such as those discussed as active agent herein (e.g., pharmacologically active molecules including inorganic and organic molecules, pharmaceutical agents, drugs, peptides, proteins, genetic material, imaging agents, etc.).

In an example, nanocarriers and compositions having the same can be used in the manufacture of a medicament for the treatment of a condition. In another example, the present disclosure relates to a nanocarrier or compositions having the same for use in the treatment of a condition. Examples of conditions to be treated are discussed below.

In some embodiments, nanocarriers refers to agglomerated particles having a network of pores. The network of pores provides nanocarriers with a large pore volume and surface area for carrying a payload such as one or more of the exemplary actives discussed below. A large pore volume and surface area is advantageous as it can enhance the amount of payload that can be carried by the nanocarriers.

In some embodiments, the nanocarriers are not agglomerated particles including a network of pores.

The following are exemplary materials and methods of making polymeric NPs.

A. Exemplary Nanocarriers

1. Polymers

The nanocarrier can be a particle containing one or more hydrophilic polymers. Hydrophilic polymers include cellulosic polymers such as starch and polysaccharides; hydrophilic polypeptides; poly(amino acids) such as poly-L-glutamic acid (PGS), gamma-polyglutamic acid, poly-L-aspartic acid, poly-L-serine, or poly-L-lysine; polyalkylene glycols and polyalkylene oxides such as polyethylene glycol (PEG), polypropylene glycol (PPG), and poly(ethylene oxide) (PEO); poly(oxyethylated polyol); poly(olefinic alcohol); polyvinylpyrrolidone; poly(hydroxyalkylmethacrylamide); poly(hydroxyalkylmethacrylate); poly(saccharides); poly(hydroxy acids); poly(vinyl alcohol), and copolymers thereof.

The nanoparticle can contain one or more hydrophobic polymers. Examples of suitable hydrophobic polymers include polyhydroxyacids such as poly(lactic acid), poly(glycolic acid), and poly(lactic acid-co-glycolic acids); polyhydroxyalkanoates such as poly3-hydroxybutyrate or poly4-hydroxybutyrate; polycaprolactones; poly(orthoesters); polyanhydrides; poly(phosphazenes); poly(lactide-co-caprolactones); polycarbonates such as tyrosine polycarbonates; polyamides (including synthetic and natural polyamides), polypeptides, and poly(amino acids); polyesteramides; polyesters; poly(dioxanones); poly(alkylene alkylates); hydrophobic polyethers; polyurethanes; polyetheresters; polyacetals; polycyanoacrylates; polyacrylates; polymethylmethacrylates; polysiloxanes; poly(oxyethylene)/poly(oxypropylene) copolymers; polyketals; polyphosphates; polyhydroxyvalerates; polyalkylene oxalates; polyalkylene succinates; poly(maleic acids), as well as copolymers thereof.

In certain embodiments, the hydrophobic polymer is an aliphatic polyester. In embodiments, the hydrophobic polymer is poly(lactic acid), poly(glycolic acid), or poly(lactic acid-co-glycolic acid).

The nanoparticle can contain one or more biodegradable polymers. Biodegradable polymers can include polymers that are insoluble or sparingly soluble in water that are converted chemically or enzymatically in the body into water-soluble materials. Biodegradable polymers can include soluble polymers crosslinked by hydolyzable cross-linking groups to render the crosslinked polymer insoluble or sparingly soluble in water.

Biodegradable polymers in the nanoparticle can include polyamides, polycarbonates, polyalkylenes, polyalkylene glycols, polyalkylene oxides, polyalkylene terepthalates, polyvinyl alcohols, polyvinyl ethers, polyvinyl esters, polyvinyl halides, polyvinylpyrrolidone, polyglycolides, polysiloxanes, polyurethanes and copolymers thereof, alkyl cellulose, hydroxyalkyl celluloses, cellulose ethers, cellulose esters, nitro celluloses, polymers of acrylic and methacrylic esters, methyl cellulose, ethyl cellulose, hydroxypropyl cellulose, hydroxy-propyl methyl cellulose, hydroxybutyl methyl cellulose, cellulose acetate, cellulose propionate, cellulose acetate butyrate, cellulose acetate phthalate, carboxylethyl cellulose, cellulose triacetate, cellulose sulphate sodium salt, poly (methyl methacrylate), poly(ethylmethacrylate), poly(butylmethacrylate), poly(isobutylmethacrylate), poly(hexlmethacrylate), poly(isodecylmethacrylate), poly(lauryl methacrylate), poly (phenyl methacrylate), poly (methyl acrylate), poly(isopropyl acrylate), poly(isobutyl acrylate), poly(octadecyl acrylate), polyethylene, polypropylene poly(ethylene glycol), poly(ethylene oxide), poly (ethylene terephthalate), poly(vinyl alcohols), poly(vinyl acetate, poly vinyl chloride polystyrene and polyvinylpyrrolidone, derivatives thereof, linear and branched copolymers and block copolymers thereof, and blends thereof. Exemplary biodegradable polymers include polyesters, poly (ortho esters), poly(ethylene imines), poly(caprolactones), poly(hydroxybutyrates), poly(hydroxyvalerates), polyanhydrides, poly(acrylic acids), polyglycolides, poly(urethanes), polycarbonates, polyphosphate esters, polyphosphazenes, derivatives thereof, linear and branched copolymers and block copolymers thereof, and blends thereof.

The nanoparticles can contain one or more amphiphilic polymers. Amphiphilic polymers can be polymers containing a hydrophobic polymer block and a hydrophilic polymer block. The hydrophobic polymer block can contain one or more of the hydrophobic polymers above or a derivative or copolymer thereof. The hydrophilic polymer block can contain one or more of the hydrophilic polymers above or a derivative or copolymer thereof. In some embodiments the amphiphilic polymer is a di-block polymer containing a hydrophobic end formed from a hydrophobic polymer and a hydrophilic end formed of a hydrophilic polymer. In some embodiments, a moiety can be attached to the hydrophobic end, to the hydrophilic end, or both.

In some embodiments the nanoparticles contain a first amphiphilic polymer having a hydrophobic polymer block, a hydrophilic polymer block, and targeting moiety conjugated to the hydrophilic polymer block; and a second amphiphilic polymer having a hydrophobic polymer block and a hydrophilic polymer block but without the targeting moiety. The hydrophobic polymer block of the first amphiphilic polymer and the hydrophobic polymer block of the second amphiphilic polymer may be the same or different. Likewise, the hydrophilic polymer block of the first amphiphilic polymer and the hydrophilic polymer block of the second amphiphilic polymer may be the same or different.

In some embodiments the nanoparticle contains biodegradable polyesters or polyanhydrides such as poly(lactic acid), poly(glycolic acid), and poly(lactic-co-glycolic acid).

The nanoparticles can contain one more of the following polyesters: homopolymers including glycolic acid units, referred to herein as "PGA", and lactic acid units, such as poly-L-lactic acid, poly-D-lactic acid, poly-D,L-lactic acid, poly-L-lactide, poly-D-lactide, and poly-D,L-lactide, collectively referred to herein as "PLA", and caprolactone units, such as poly(ε-caprolactone), collectively referred to herein as "PCL"; and copolymers including lactic acid and glycolic acid units, such as various forms of poly(lactic acid-co-glycolic acid) and poly(lactide-co-glycolide) characterized by the ratio of lactic acid:glycolic acid, collectively referred to herein as "PLGA"; and polyacrylates, and derivatives thereof. Exemplary polymers also include copolymers of polyethylene glycol (PEG) and the aforementioned polyesters, such as various forms of PLGA-PEG or PLA-PEG copolymers, collectively referred to herein as "PEGylated polymers". In certain embodiments, the PEG region can be covalently associated with polymer to yield "PEGylated polymers" by a cleavable linker. Other polymers include PLGA-poly(ε-carbobenzoxyl-L-lysine) (PLL) (i.e., PLGA-PLL).

The nanoparticles can also contain one or more polymer conjugates containing end-to-end linkages between the polymer and a targeting moiety or a detectable label. For example, a modified polymer can be a PLGA-PEG-peptide block polymer.

The nanoparticles can contain one or a mixture of two or more polymers. The nanoparticles may contain other entities such as stabilizers, surfactants, or lipids. The nanoparticles may contain a first polymer having a targeting moiety and a second polymer not having the targeting moiety. By adjusting the ratio of the targeted and non-targeted polymers, the density of the targeting moiety on the exterior of the particle can be adjusted.

The nanoparticles can contain an amphiphilic polymer having a hydrophobic end, a hydrophilic end, and a targeting moiety attached to the hydrophilic end. In some embodiments the amphiphilic macromolecule is a block copolymer having a hydrophobic polymer block, a hydrophilic polymer block covalently coupled to the hydrophobic polymer block, and a targeting moiety covalently coupled to the hydrophilic polymer block. For example, the amphiphilic polymer can have a conjugate having the structure A-B-X where A is a hydrophobic molecule or hydrophobic polymer, B is a hydrophilic molecule or hydrophilic polymer, and X is a targeting moiety. Exemplary amphiphilic polymers include those where A is a hydrophobic biodegradable polymer, B is PEG, and X is a targeting moiety that targets, binds.

In some embodiments the nanoparticle contains a first amphiphilic polymer having the structure A-B-X as described above and a second amphiphilic polymer having the structure A-B, where A and B in the second amphiphilic macromolecule are chosen independently from the A and B in the first amphiphilic macromolecule, although they may be the same.

2. Liposomes and Micelles

In some embodiments, the nanocarrier is a liposome or micelle. Liposomes are spherical vesicles composed of concentric phospholipid bilayers separated by aqueous compartments. Liposomes can adhere to and form a molecular film on cellular surfaces. Structurally, liposomes are lipid vesicles composed of concentric phospholipid bilayers which enclose an aqueous interior (Gregoriadis, et al., *Int. J. Pharm.*, 300, 125-30 2005; Gregoriadis and Ryman, *Biochem. J.*, 124, 58P (1971)). Hydrophobic compounds associate with the lipid phase, while hydrophilic compounds associate with the aqueous phase.

Liposomes have the ability to form a molecular film on cell and tissue surfaces. Clinical studies have proven the efficacy of liposomes as a topical healing agent (Dausch, et al., *Klin Monatsbl Augenheilkd* 223, 974-83 (2006); Lee, et al., *Klin Monatsbl Augenheilkd* 221, 825-36 (2004)). Liposomes have also been used in ophthalmology to ameliorate keratitis, corneal transplant rejection, uveitis, endophthalmitis, and proliferative vitreoretinopathy (Ebrahim, et al., 2005; Li, et al., 2007).

Liposomes have been widely studied as drug carriers for a variety of chemotherapeutic agents (approximately 25,000 scientific articles have been published on the subject) (Gregoriadis, *N Engl J Med* 295, 765-70 (1976); Gregoriadis, et al., *Int. J. Pharm.* 300, 125-30 (2005)). Water-soluble anticancer substances such as doxorubicin can be protected inside the aqueous compartment(s) of liposomes delimited by the phospholipid bilayer(s), whereas fat-soluble substances such as amphotericin and capsaicin can be integrated into the phospholipid bilayer (Aboul-Fadl, *Curr Med Chem* 12, 2193-214 (2005); Tyagi, et al., *J Urol* 171, 483-9 (2004)). Topical and vitreous delivery of cyclosporine was drastically improved with liposomes (Lallemand, et al., *Eur J Pharm Biopharm* 56, 307-18 2003). Delivery of chemotherapeutic agents lead to improved pharmacokinetics and reduced toxicity profile (Gregoriadis, *Trends Biotechnol* 13, 527-37 (1995); Gregoriadis and Allison, FEBS Lett 45, 71-4 1974; Sapra, et al., *Curr Drug Deliv* 2, 369-81 (2005)). More than ten liposomal and lipid-based formulations have been approved by regulatory authorities and many liposomal drugs are in preclinical development or in clinical trials (Barnes, *Expert Opin Pharmacother* 7, 607-15 (2006); Minko, et al., *Anticancer Agents Med Chem* 6, 537-52 (2006)). The safety data with respect to acute, subchronic, and chronic toxicity of liposomes has been assimilated from the vast clinical experience of using liposomes in the clinic for thousands of patients.

Nanocarriers such as liposomes and micelles can be formed from one or more lipids, which can be neutral, anionic, or cationic at physiologic pH. Suitable neutral and anionic lipids include, but are not limited to, sterols and lipids such as cholesterol, phospholipids, lysolipids, lysophospholipids, sphingolipids or pegylated lipids. Neutral and anionic lipids include, but are not limited to, phosphatidylcholine (PC) (such as egg PC, soy PC), including, but limited to, 1,2-diacyl-glycero-3-phosphocholines; phosphatidylserine (PS), phosphatidylglycerol, phosphatidylinositol (PI); glycolipids; sphingophospholipids such as sphingomyelin and sphingoglycolipids (also known as 1-ceramidyl glucosides) such as ceramide galactopyranoside, gangliosides and cerebrosides; fatty acids, sterols, containing a carboxylic acid group for example, cholesterol; 1,2-diacyl-sn-glycero-3-phosphoethanolamine, including, but not limited to, 1,2-dioleylphosphoethanolamine (DOPE), 1,2-dihexadecylphosphoethanolamine (DHPE), 1,2-distearoylphosphatidylcholine (DSPC), 1,2-dipalmitoyl phosphatidylcholine (DPPC), and 1,2-dimyristoylphosphatidylcholine (DMPC). The lipids can also include various natural (e.g., tissue derived L-α-phosphatidyl: egg yolk, heart, brain, liver, soybean) and/or synthetic (e.g., saturated and unsaturated 1,2-diacyl-sn-glycero-3-phosphocholines, 1-acyl-2-acyl-sn-glycero-3-phosphocholines, 1,2-diheptanoyl-SN-glycero-3-phosphocholine) derivatives of the lipids. In some embodiments, the liposomes contain a phosphaditylcholine (PC) head group, and optionally sphingomyelin. In another embodiment, the liposomes contain DPPC. In a further embodiment, the liposomes contain a neutral lipid, such as 1,2-dioleoylphosphatidylcholine (DOPC).

In certain embodiments, the liposomes are generated from a single type of phospholipid. In some embodiments, the phospholipid has a phosphaditylcholine head group, and, can be, for example, sphingomyelin. The liposomes may include a sphingomyelin metabolite. Sphingomyelin metabolites used to formulate the liposomes include, without limitation, ceramide, sphingosine, or sphingosine 1-phosphate. The concentration of the sphingomyelin metabolites included in the lipids used to formulate the liposomes can range from about 0.1 mol % to about 10 mol %, or from about 2.0 mol % to about 5.0 mol %, or can be in a concentration of about 1.0 mol %.

Suitable cationic lipids in the liposomes include, but are not limited to, N-[1-(2,3-dioleoyloxy)propyl]-N,N,N-trimethyl ammonium salts, also references as TAP lipids, for example methylsulfate salt. Suitable TAP lipids include, but are not limited to, DOTAP (dioleoyl-), DMTAP (dimyristoyl-), DPTAP (dipalmitoyl-), and DSTAP (distearoyl-). Suitable cationic lipids in the liposomes include, but are not limited to, dimethyldioctadecyl ammonium bromide (DDAB), 1,2-diacyloxy-3-trimethylammonium propanes, N-[1-(2,3-dioloyloxy)propyl]-N,N-dimethyl amine (DODAP), 1,2-diacyloxy-3-dimethylammonium propanes, N-[1-(2,3-dioleyloxy)propyl]-N,N,N-trimethylammonium chloride (DOTMA), 1,2-dialkyloxy-3-dimethylammonium propanes, dioctadecylamidoglycylspermine (DOGS), 3-[N—(N',N'-dimethylamino-ethane)carbamoyl]cholesterol (DC-Chol); 2,3-dioleoyloxy-N-(2-(sperminecarboxamido)-ethyl)-N,N-dimethyl-1-propanaminium trifluoro-acetate (DOSPA), β-alanyl cholesterol, cetyl trimethyl ammonium bromide (CTAB), diC$_{14}$-amidine, N-ferf-butyl-N'-tetradecyl-3-tetradecylamino-propionamidine, N-(alpha-trimethylammonioacetyl)didodecyl-D-glutamate chloride (TMAG), ditetradecanoyl-N-(trimethylammonio-acetyl)diethanolamine chloride, 1,3-dioleoyloxy-2-(6-carboxy-spermyl)-propylamide (DOSPER), and N, N, N', N'-tetramethyl-, N'-bis(2-hydroxyethyl)-2,3-dioleoyloxy-1,4-butanediammonium iodide. In one embodiment, the cationic lipids can be 1-[2-(acyloxy)ethyl]2-alkyl(alkenyl)-3-(2-hydroxyethyl)-imidazolinium chloride derivatives, for example, 1-[2-(9(Z)-octadecenoyloxy)ethyl]-2-(8(Z)-heptadecenyl-3-(2-hydroxyethyl)imidazolinium chloride (DOTIM), and 1-[2-(hexadecanoyloxy)ethyl]-2-pentadecyl-3-(2-hydroxyethyl)imidazolinium chloride (DPTIM). In one embodiment, the cationic lipids can be 2,3-dialkyloxypropyl quaternary ammonium compound derivatives containing a hydroxyalkyl moiety on the quaternary amine, for example, 1,2-dioleoyl-3-dimethyl-hydroxyethyl ammonium bromide (DORI), 1,2-dioleyloxypropyl-3-dimethyl-hydroxyethyl ammonium bromide (DORIE), 1,2-dioleyloxypropyl-3-dimetyl-hydroxypropyl ammonium bromide (DORIE-HP), 1,2-dioleyl-oxy-propyl-3-dimethyl-hydroxybutyl ammonium bromide (DORIE-HB), 1,2-dioleyloxypropyl-3-dimethyl-hydroxypentyl ammonium bromide (DORIE-Hpe), 1,2-dimyristyloxypropyl-3-dimethyl-hydroxylethyl ammonium bromide (DMRIE), 1,2-dipalmityloxypropyl-3-dimethyl-hydroxyethyl ammonium bromide (DPRIE), and 1,2-disteryloxypropyl-3-dimethyl-hydroxyethyl ammonium bromide (DSRIE).

The lipids may be formed from a combination of more than one lipid, for example, a charged lipid may be combined with a lipid that is non-ionic or uncharged at physiological pH. Non-ionic lipids include, but are not limited to, cholesterol and DOPE (1,2-dioleolylglyceryl phosphatidylethanolamine). The molar ratio of a first phospholipid, such as sphingomyelin, to second lipid can range from about 5:1 to about 1:1 or 3:1 to about 1:1, or from about 1.5:1 to about 1:1, or the molar ratio is about 1:1.

In some embodiments, liposomes or micelles include phospholipids, cholesterols and nitrogen-containing lipids. Examples include phospholipids, including natural phospholipids such as phosphatidylcholine, phosphatidylserine, phosphatidylglycerol, phosphatidylinositol, phosphatidylethanolamine, phosphatidic acid, cardiolipin, sphingomyelin, egg yolk lecithin, soybean lecithin, and lysolecithin, as well as hydrogenated products thereof obtained in a standard manner. It is also possible to use synthetic phospholipids such as dicetyl phosphate, distearoylphosphatidylcholine, dipalmitoylphosphatidylcholine, dipalmitoylphosphatidylethanolamine, dipalmitoylphosphatidylserine, eleostearoylphosphatidylcholine, eleostearoylphosphatidylethanolamine as well as homo-poly {N'—[N-(2-aminoethyl)-2-aminoethyl]aspartamide}P[Asp(DET)] and block-catiomer poly(ethyleneglycol) (PEG)-b-P[Asp(DET)].

In some embodiments, the liposomes are long circulating liposomes or stealth liposomes such as those reviewed in Immordino, et al, *Int J Nanomedicine,* 1(3):297-315 (2006)), which is specifically incorporated by reference herein in its entirety. For example, liposomes have been developed with surfaces modified with a variety of molecules including glycolipids and sialic acid. Long-circulating liposomes can include, for example, synthetic polymer poly-(ethylene glycol) (PEG) in liposome composition. The PEG on the surface of the liposomal carrier can extend blood-circulation time while reducing mononuclear phagocyte system uptake (stealth liposomes) and serve as an anchor for the targeting moiety.

Antibodies and antibody fragments are widely employed for targeting moieties for liposomes due to the high specificity for their target antigens. Referred to immunoliposomes, methods of generated targeted liposomes by coupling of antibodies to the liposomal surface are known in the art. Such techniques include, but are not limited to, conventional coupling and maleimide based techniques. See, for example, (Paszko and Senge, Curr Med Chem., 19(31): 5239-77 (2012), Kelly, et al., *Journal of Drug Delivery,* Volume 2011 (2011), Article ID 727241, 11 pages).

The micelles can be polymer micelles, for example, those composed of amphiphilic di- or tri-block copolymers made of solvophilic and solvophobic blocks (see, e.g., Croy and Kwon, *Curr Pharm Des.,* 12(36):4669-84 (2006)).

3. Microbubbles

In some embodiments the nanocarrier is a microbubbles.

In some embodiments, microbubbles are dispersed in solution with active agents or dispersed in suspension with liposomes or particles encapsulating active agents. During ultrasonic exposure, microbubbles vary in size in response to oscillation of acoustic waves and eventually burst to create shock waves to transiently open the tight junctions in nearby biological tissue. Meanwhile, active agents in the solution or released from liposomes or particles diffuse rapidly across the transiently opened junctions and permeate in tissues otherwise difficult to penetrate.

In some embodiments, microbubbles are coated or filled with active agent, where ultrasonic shock waves activate the coating and cause mini explosions to release the medicine.

In some embodiments, the microbubbles have a gas core stabilized by a shell composed of proteins, lipids or polymers. They are filled with an insoluble perfluorocarbon gas, such as perfluoromethane, perfluoroethane, perfluoropropane, perfluorobutane, or perfluoropentane. In one embodiment, the microbubbles are about 1 to about 15 microns in diameter.

The microbubbles may have a protein shell formed with albumin, lysozyme, and other amphipathic proteins which are highly surface active. Albumin-coated microbubbles can be formed by sonication of a heated solution (e.g., 5% (w/v)) of human serum albumin in the presence of air. During sonication, microbubbles of air are formed which become encapsulated within a nanometer-thick shell of aggregated albumin. Heating is needed to denature the albumin prior to sonication and facilitate encapsulation, and the albumin shell is held together through disulfide bonds between cysteine residues formed during cavitation.

Microbubbles may have a surfactant shell formed with mixtures of synthetic surfactants, such as SPAN-40® and TWEEN-40®. The SPAN®/TWEEN® mixture solution is sonicated in the presence of air to form stable microbubbles.

In preferred embodiments, the microbubbles have a lipid shell.

Commercially available lipid-coated microbubble formulations may be used herein, including DEFINITY® (Lantheus Medical Imaging) and SONOVUE®® (Bracco Diagnostics). Phospholipids spontaneously self-assemble into a highly oriented monolayer at the air-water interface, such that their hydrophobic acyl chains face the gas and their hydrophilic headgroups face the water. The lipid molecules are held together by 'weak' physical forces, without chain entanglement, which makes the shell compliant to area expansion and compression during ultrasound insonification. Exemplary lipid molecules suitable for forming microbubbles are described above in the production of liposomes.

In other embodiments, microbubbles have a polymeric shell formed from cross-linked or entangled polymeric species, or polyelectrolyte multilayer shells. Exemplary polymeric-shelled microbubbles are described by Sirsi S and Borden M in *Bubble Sci Eng Technol,* 1(1-2):3-17 (2009).

B. Moieties that Target Guanosine

The disclosed nanocarriers generally include moiety that targets guanosine or a component thereof. The moiety can be conjugated to a polymer that forms the nanocarrier. Typically the binding moiety is displayed on the outer shell of the nanocarrier. As introduced above, the targeting moiety that targets guanosine or a component thereof can also be linked to an active agent and used to deliver the active agent into the cytoplasm of cells absent a nanocarrier.

In some embodiments, the targeting moiety is an antibody or variant or functional fragment or fusion protein derived therefrom that can bind to extracellular guanosine. Anti-DNA/anti-nucleosome antibodies are known in the art (see, e.g., Shuster A. M. et. al., *Science,* v. 256, 1992, pp. 665-667, Isenberg, et al., *Rheumatology,* 46 (7):1052-1056 (2007))). For example, autoantibodies to single or double stranded deoxyribonucleic acid (DNA) are frequently identified in the serum of patients with systemic lupus erythematosus (SLE) and are often implicated in disease pathogenesis. The presence of circulating autoantibodies reactive against DNA (anti-DNA antibodies) is a hallmark laboratory finding in patients with systemic lupus erythematosus (SLE). Although the precise role of anti-DNA antibodies in SLE is unclear, results indicate that the antibodies play an active role in SLE pathophysiology. Select lupus anti-DNA autoantibodies can penetrate into live cell nuclei and inhibit DNA repair or directly damage DNA, and efforts to use these antibodies against tumors that are sensitive to DNA damage are underway (Hansen, et al., *Sci Transl Med,* 4(157):157ra142 (2012), Noble, et al., *Cancer Research,* 2015; 75(11):2285-2291, Noble, et al., *Sci Rep-Uk,* 4 (2014), Noble, et al., *Nat Rev Rheumatol* (2016)). Therefore, in some embodiments, anti-guanosine antibodies can be derived or isolated from patients with SLE. In some embodiments, the anti-guanosine antibodies are monoclonal antibodies, or fragments or variants thereof.

Antibodies can, for example, be naturally occurring in SLE patients, or obtained by screening of antibody libraries. The antibodies may be prepared by fusing spleen cells from a host having elevated serum levels of anti-DNA antibodies (e.g., MRL/lpr mice) with myeloma cells in accordance with known techniques or by transforming the spleen cells with an appropriate transforming vector to immortalize the cells. The cells may be cultured in a selective medium and screened to select antibodies that bind DNA.

In some embodiments, the antibody, variant, functional fragment or fusion protein derived therefrom can hydrolyze DNA, but this activity is not required. In some embodiments, the antibody, variant, functional fragment or fusion protein derived therefrom is cell penetrating, nuclear membrane penetrating, or both, however, these activities are not necessary. In some embodiments, the antibody, variant, functional fragment or fusion protein derived therefrom, when conjugated to a nanocarrier, (1) is cell penetrating, (2) is cell penetrating, but does not penetrate the nuclear membrane, (3) is cell penetrating and nuclear penetrating, or (4) is not cell penetrating and is not nuclear membrane penetrating. Thus in some embodiments, the nanocarrier primarily remains in the extracellular space, for example, in the tumor microenvironment. In some embodiments, the targeting moiety facilitates delivery of the nanocarrier across the cellular member into the cell. Thus, in some embodiments, the targeted particles are delivered into cells more efficiently or at a higher frequency than untargeted particles of the same character. In some embodiments, the targeting moiety also facilitate delivery of the nanocarrier across the nuclear membrane.

Antibodies that can be used include whole immunoglobulin (i.e., an intact antibody) of any class, fragments thereof, and synthetic proteins containing at least the antigen binding variable domain of an antibody. The variable domains differ in sequence among antibodies and are used in the binding and specificity of each particular antibody for its particular antigen. However, the variability is not usually evenly distributed through the variable domains of antibodies. It is typically concentrated in three segments called complementarity determining regions (CDRs) or hypervariable regions both in the light chain and the heavy chain variable domains. The more highly conserved portions of the variable domains are called the framework (FR). The variable domains of native heavy and light chains each comprise four FR regions, largely adopting a beta-sheet configuration, connected by three CDRs, which form loops connecting, and in some cases forming part of, the beta-sheet structure. The CDRs in each chain are held together in close proximity by the FR regions and, with the CDRs from the other chain, contribute to the formation of the antigen binding site of antibodies. Therefore, the antibodies can contain the components of the CDRs necessary to penetrate cells, maintain DNA binding and/or interfere with DNA repair.

Also disclosed are variants and fragments of antibodies which have bioactivity. The fragments, whether attached to other sequences or not, include insertions, deletions, substitutions, or other selected modifications of particular regions or specific amino acids residues, provided the activity of the fragment is not significantly altered or impaired compared to the nonmodified antibody or antibody fragment.

Techniques can also be adapted for the production of single-chain antibodies specific to an antigenic protein. Methods for the production of single-chain antibodies are well known to those of skill in the art. A single chain antibody can be created by fusing together the variable domains of the heavy and light chains using a short peptide linker, thereby reconstituting an antigen binding site on a single molecule. Single-chain antibody variable fragments (scFvs) in which the C-terminus of one variable domain is tethered to the N-terminus of the other variable domain via a 15 to 25 amino acid peptide or linker have been developed without significantly disrupting antigen binding or specificity of the binding. The linker is chosen to permit the heavy chain and light chain to bind together in their proper conformational orientation.

The targeting moieties can be modified to improve their therapeutic potential. For example, in some embodiments, the targeting moiety is conjugated to another antibody specific for a second therapeutic target, for example, on or near a cancer cell or in a tumor microenvironment. For example, the antibody can be a fusion protein containing single chain variable fragment that binds DNA or nucleosomes and a single chain variable fragment of a monoclonal antibody that specifically binds the second therapeutic target. In other embodiments, the antibody is a bispecific antibody having a first heavy chain and a first light chain from an anti-guanosine antibody and a second heavy chain and a second light chain from a monoclonal antibody that specifically binds the second therapeutic target.

Divalent single-chain variable fragments (di-scFvs) can be engineered by linking two scFvs. This can be done by producing a single peptide chain with two VH and two VL regions, yielding tandem scFvs. ScFvs can also be designed with linker peptides that are too short for the two variable regions to fold together (about five amino acids), forcing scFvs to dimerize. This type is known as diabodies. Diabodies have been shown to have dissociation constants up to 40-fold lower than corresponding scFvs, meaning that they have a much higher affinity to their target. Still shorter linkers (one or two amino acids) lead to the formation of trimers (triabodies or tribodies). Tetrabodies have also been produced. They exhibit an even higher affinity to their targets than diabodies.

The antibody can be a humanized or chimeric antibody, or a fragment, variant, or fusion protein thereof. Methods for humanizing non-human antibodies are well known in the art. Generally, a humanized antibody has one or more amino acid residues introduced into it from a source that is non-human. These non-human amino acid residues are often referred to as "import" residues, which are typically taken from an "import" variable domain. Antibody humanization techniques generally involve the use of recombinant DNA technology to manipulate the DNA sequence encoding one or more polypeptide chains of an antibody molecule.

In some embodiments, the antibody is modified to alter its half-life. In some embodiments, it is desirable to increase the half-life of the antibody so that it is present in the circulation or at the site of treatment for longer periods of time. In other embodiments, the half-life of the antibody is decreased to reduce potential side effects. Antibody fragments are expected to have a shorter half-life than full size antibodies. Other methods of altering half-life are known and can be used in the described methods. For example, antibodies can be engineered with Fc variants that extend half-life, e.g., using Xtend™ antibody half-life prolongation technology (Xencor, Monrovia, CA).

In some embodiments, the targeting moiety or the nanocarrier itself is conjugated to a cell-penetrating moiety, such as a cell penetrating peptide, to facilitate entry into the cell and transport to the nucleus. Examples of cell-penetrating peptides include, but are not limited to, Polyarginine (e.g., $R_9$), Antennapedia sequences, TAT, HIV-Tat, Penetratin, Antp-3A (Antp mutant), Buforin II, Transportan, MAP (model amphipathic peptide), K-FGF, Ku70, Prion, pVEC, Pep-1, SynB1, Pep-7, HN-1, BGSC (Bis-Guanidinium-Spermidine-Cholesterol, and BGTC (Bis-Guanidinium-Tren-Cholesterol). In other embodiments, the antibody is modified using TransMabs™ technology (InNexus Biotech., Inc., Vancouver, BC).

In some embodiments, the anti-guanosine antibody is 4H2, or a variant, functional fragment, or fusion protein derived therefrom.

The number of targeting molecule conjugated to the surface of each nanoparticle can generally range from about 1 to about 10,000, or about 5 to about 1,000.

1. Exemplary Antibodies

A 4H2 hybridoma was previously generated from the MRLmpj/lpr lupus mouse model. Thus in some embodiments, the targeting moiety is 4H2 antibody or a variant, fragment, and fusion protein thereof. Each can be attached, alone or in combination, to the surface of nanocarriers encapsulating an active and target nanocarriers to sites of extracellular DNA, including but not limited to the microenvironments of apoptotic and necrotic cells and tissues. The Examples below show that 4H2 does not localize to lysosomes or endosomes, where cargo molecules often get destroyed in the case of other delivery vehicles like TAT peptide.

When covalently conjugated to the surface of the nanocarriers, in some cases 4H2 may not penetrate into cell cytoplasm to exert its biological functions. Thus when the anti-guanosine antibody is covalently conjugated to the surface of the nanocarrier, an active agent is typically also loaded or encapsulated within the nanocarrier. However, in some embodiments, the targeting moiety is conjugated to the surface of the nanocarriers by cleavable linker or bond that releases the targeting moiety when delivered to the target site. In specific embodiments, the linker or bond is a disulfide bond. With this approach, the targeting moiety can be released from nanocarriers once it encounters the reducing tumor microenvironment due to elevated levels of glutathione (Shao, et al., *Ther Deliv,* 3(12):1409-1427 (2012)). Released antibody or fragment or fusion protein derived therefrom, then becomes an active agent that can penetrate cells as discussed above. Other cleavable linkers can be peptides which are substrates to enzymes in tumor microenvironment, such as PLGLAG (SEQ ID NO: 19) (see, e.g., Aguilera, et al., *Integr Biol (Camb),* 1(5-6): 371-381 (2009)). and RLQLKL (SEQ ID NO:20) (see, e.g., Whitney, et al., *J. Biol. Chem.,* 285(29):22532-41 (2010)).

Alternatively or in addition to having antibody conjugated to the surface of the nanocarriers, an antibody, such as 4H2, or a variant or a fragment or fusion protein derived therefrom or any combination thereof, may be encapsulated into nanocarriers alone or in combination with one or more additional active agents. Once released from the nanocarriers either by breakage of disulfide bonds or by release of encapsulated antibody, the free antibody would then be able to penetrate target cell cytoplasm.

Thus, in some embodiments, the loaded or encapsulated active agent(s) does not include 4H2 or a fragment or fusion protein derived therefrom. In other embodiments, the loaded or encapsulated active agent(s) does include 4H2 or a fragment or fusion protein derived therefrom as either a free antibody, an antibody conjugated to a second active agent, or a combination thereof. Any of the embodiments can include one or more additional active agents.

4H2 is a cell-penetrating lupus anti-guanosine antibody that can reduce phosphorylation of ERK and Akt in cells, is toxic to cancer cells harboring a range of mutations in the small GTPase K-Ras and is not significantly toxic to cells with WT K-Ras. 4H2 penetrates cells and inhibits phosphorylation of ERK and Akt, and cells with preexisting activating mutations in K-Ras are more sensitive to this inhibition than cells with WT K-Ras. A wide range of human malignancies harbor deficiencies in the small GTPase K-Ras (Adjei, *J Natl Cancer Inst* 93 (14): 1062-1074 (2001)), and this therapeutic strategy therefore has potential for applications in the selective treatment of numerous tumors. See published International Application WO 2015/134607.

2. Fragments and Fusion Proteins

In some embodiments, the targeting or delivery moiety and/or active agent is composed of one or more antigen binding antibody fragments and/or antigen binding fusion proteins of the antibody 4H2, or a variant thereof. The antigen binding molecules typically bind to the epitope of 4H2, and can, for example, maintain a function or activity of the full antibody.

Exemplary fragments and fusions include, but are not limited to, single chain antibodies, single chain variable fragments (scFv), disulfide-linked Fvs (sdFv), Fab', F(ab')$_2$, Fv, and single domain antibody fragments (sdAb).

In some embodiments, the molecule includes two or more scFv. Each scFv can include one, two, or all three complementarity determining regions (CDRs) of the heavy chain variable region ($V_L$) of 4H2, or a variant thereof. The scFv can include one, two, or all three CDRs of the light chain variable region ($V_L$) of 4H2, or a variant thereof. The molecule can include the heavy chain variable region and/or light chain variable region of 4H2, or a variant thereof.

A single chain variable fragment can be created by fusing together the variable domains of the heavy and light chains using a short peptide linker, thereby reconstituting an antigen binding site on a single molecule. Single-chain antibody variable fragments (scFvs) in which the C-terminus of one variable domain is tethered to the N-terminus of the other variable domain via a linker have been developed without significantly disrupting antigen binding or specificity of the binding. The linker is chosen to permit the heavy chain and light chain to bind together in their proper conformational orientation. The linker is usually rich in glycine for flexibility, and typically also includes serine or threonine for solubility. The linker can link, for example, the N-terminus of the $V_H$ with the C-terminus of the $V_L$, or vice versa. scFv can also be created directly from subcloned heavy and light chains derived from a hybridoma. The scFv can retain, or improve or increase the specificity of the original immunoglobulin, while removing of the constant regions and introducing the linker.

Exemplary molecules that include two or more single chain variable fragments (scFv) including the light chain variable region ($V_L$) of 4H2, or a variant thereof, and the heavy chain variable region ($V_H$) of 4H2, or a variant thereof of the antibody 4H2 include, but are not limited to, divalent-scFv (di-scFv), trivalent-scFv (tri-scFv), multivalent-scFv (multi-scFv), diabodies, triabodies, tetrabodies, etc., of scFvs.

Divalent single chain variable fragments can be engineered by linking two scFvs. This can be done by producing a single peptide chain with two $V_H$ and two $V_L$ regions, yielding a di-scFvs referred to as a tandem di-scFv. ScFvs can also be designed with linker peptides that are too short for the two variable regions to fold together (about five amino acids), forcing scFvs to dimerize and form a divalent single chain variable fragment referred to as a diabody. Diabodies have been shown to have dissociation constants up to 40-fold lower than corresponding scFvs, indicating that they have a much higher affinity to their target. Even shorter linkers (one or two amino acids) lead to the formation of trimers (triabodies or tribodies). Tetrabodies have also been produced and have been shown to exhibit an even higher affinity to their targets than diabodies.

The disclosed targeting moieties include antigen binding antibody fragments and fusion proteins of 4H2 and variants thereof that typically bind to the same epitope as the parent antibody 4H2. In some embodiments, the antigen binding molecule is a di-, tri-, or multivalent scFv. Although the antigen binding antibody fragment or fusion protein of the antigen binding molecule can include additional antibody domains (e.g., constant domains, hinge domains, etc.,), in some embodiments it does not.

a. Single Chain Variable Fragments

The single chain variable fragments disclosed herein can include antigen binding fragments of 4H2, or a variant thereof. 4H2 is described in International Application WO 2015/134607.

The variable domains differ in sequence among antibodies and are used in the binding and specificity of each particular antibody for its particular antigen. However, the variability is not usually evenly distributed through the variable domains of antibodies. It is typically concentrated in three segments called complementarity determining regions (CDRs) or hypervariable regions both in the light chain and the heavy chain variable domains. The more highly conserved portions of the variable domains are called the framework (FR). The variable domains of native heavy and light chains each comprise four FR regions, largely adopting a beta-sheet configuration, connected by three CDRs, which form loops connecting, and in some cases forming part of, the beta-sheet structure. The CDRs in each chain are held together in close proximity by the FR regions and, with the CDRs from the other chain, contribute to the formation of the antigen binding site of antibodies.

The fragments and fusions of antibodies disclosed herein can have bioactivity. For example, the fragments and fusions, whether attached to other sequences or not, can include insertions, deletions, substitutions, or other selected modifications of particular regions or specific amino acids residues. In some embodiments, the activity of the fragment or fusion is not significantly reduced or impaired compared to the nonmodified antibody or antibody fragment.

b. Antibody Sequences i. 4H2 Light Chain Variable Region

An amino acid sequence for the kappa light chain variable region (VL) of mAb 4H2 is:

(SEQ ID NO: 1)
DIVLTQSPATLSVTPGDRVSLSC<u>RASQSISNYLH</u>WYQQKSHESPRLLI

-continued
KYASQSISGIPSRFSGSGSGTDFTLSIISVETEDFGMYFCQQSNSWPL

TFGAGTKLELK.

The complementarity determining regions (CDRs) are shown with underlining, including CDR L1:RASQSIS-NYLH (SEQ ID NO:2); CDR L2: YASQSIS (SEQ ID NO:3); CDR L3: QQSNSWPLT (SEQ ID NO:4).

ii. 4H2 Heavy Chain Variable Region

An amino acid sequence for the heavy chain variable region (VH) of mAb 4H2 is:

(SEQ ID NO: 5)
EVQLQQSGPELVKPGASVKMSCKASGYTFTDYYMNWVKQSHGKSLEWI

GRVNPSNGGISYNQKFKGKATLTVDKSLSTAYMQLNSLTSEDSAVYYC

ARGPYTMYYWGQGTSVTVSS.

The complementarity determining regions (CDRs) are shown with underlining, including CDR H1: DYYMN (SEQ ID NO:6); CDR H2:

(SEQ ID NO: 7)
RVNPSNGGISYNQKFKG;

(SEQ ID NO: 8)
CDR H3:GPYTMYY.

c. Linkers

The term "linker" as used herein includes, without limitation, peptide linkers. The peptide linker can be any size provided it does not interfere with the binding of the epitope by the variable regions. In some embodiments, the linker includes one or more glycine and/or serine amino acid residues. Monovalent single-chain antibody variable fragments (scFvs) in which the C-terminus of one variable domain are typically tethered to the N-terminus of the other variable domain via a 15 to 25 amino acid peptide or linker. The linker is chosen to permit the heavy chain and light chain to bind together in their proper conformational orientation. Linkers in diabodies, triabodies, etc., typically include a shorter linker than that of a monovalent scFv as discussed above. Di-, tri-, and other multivalent scFvs typically include three or more linkers. The linkers can be the same, or different, in length and/or amino acid composition. Therefore, the number of linkers, composition of the linker(s), and length of the linker(s) can be determined based on the desired valency of the scFv as is known in the art. The linker(s) can allow for or drives formation of a di-, tri-, and other multivalent scFv.

For example, a linker can include 4-8 amino acids. In a particular embodiment, a linker includes the amino acid sequence GQSSRSS (SEQ ID NO:9). In another embodiment, a linker includes 15-20 amino acids, for example 18 amino acids. In a particular embodiment, the linker includes the amino acid sequence GQSSRSSSGGGSSGGGS (SEQ ID NO:10). Other flexible linkers include, but are not limited to, the amino acid sequences Gly-Ser, Gly-Ser-Gly-Ser (SEQ ID NO: 11), Ala-Ser, Gly-Gly-Gly-Ser (SEQ ID NO:12), (Gly$_4$-Ser)$_2$ (SEQ ID NO:13) and (Gly$_4$-Ser)$_4$ (SEQ ID NO:14), and (Gly-Gly-Gly-Gly-Ser)$_3$ (SEQ ID NO: 15).

d. Variants

The scFv can be composed of an antibody fragment or fusion protein including an amino acid sequence of a variable heavy chain and/or variable light chain that is at least 45%, at least 50%, at least 55%, at least 60%, at least 65%, at least 70%, at least 75%, at least 80%, at least 85%, at least 90%, at least 95%, or at least 99% identical to the amino acid sequence of the variable heavy chain and/or light chain of 4H2 (e.g., SEQ ID NO:5 and/or 1, respectively), and which binds to the epitope of 4H2. The scFv can be composed of an antibody fragment or fusion protein that includes a CDR that is at least 45%, at least 50%, at least 55%, at least 60%, at least 65%, at least 70%, at least 75%, at least 80%, at least 85%, at least 90%, at least 95%, or at least 99% identical to the amino acid sequence of a CDR of the variable heavy chain and/or light chain of 4H2 (e.g., SEQ ID NO: 6, 7, 8 or 2, 3, 4, respectively), and which binds to the epitope of 4H2, or a combination thereof. The determination of percent identity of two amino acid sequences can be determined by BLAST protein comparison. In some embodiments, scFv includes one, two, three, four, five, or all six of the CDRs of the above-described preferred variable domains and which binds to the epitope of 4H2, or a combination thereof.

Predicted complementarity determining regions (CDRs) of the light chain variable sequence for 4H2 are provided above.

e. Single-Chain Variable Fragments

WO 2016/033321 and Noble, et al., *Cancer Research*, 75(11):2285-2291 (2015), show that di-scFv and tri-scFv of antibody 3E10 have improved and additional activities compared to their monovalent counterpart. One of skill in the art will appreciate that the exemplary fusion proteins, or domains thereof, can be utilized to construct fusion proteins discussed in more detail above. For example, in some embodiments, the di-scFv includes a first scFv including a Vk variable region (SEQ ID NO: 1, or a functional variant or fragment thereof), linked to a VH variable domain (e.g., SEQ ID NO:5, or a functional variant or fragment thereof), linked to a second scFv including a Vk variable region (e.g., SEQ ID NO: 1, or a functional variant or fragment thereof), linked to a VH variable domain (e.g., SEQ ID NO:5, or a functional variant or fragment thereof). In some embodiments, a tri-scFv includes a di-scFv linked to a third scFv domain including a Vk variable region (e.g., SEQ ID NO:1, or a functional variant or fragment thereof), linked to a VH variable domain (e.g., SEQ ID NO:5, or a functional variant or fragment thereof).

The Vk variable regions can be linked to VH variable domains by, for example, a linker (e.g., (GGGGS)$_3$ (SEQ ID NO: 15) alone or in combination with a (6 aa) of light chain CH1 (e.g., RADAAP (SEQ ID NO: 16)). Other suitable linkers are discussed above and known in the art. scFv can be linked by a linker (e.g., human IgG CH1 initial 13 amino acids (e.g., ASTKGPSVFPLAP (SEQ ID NO: 17)) alone or in combination with a swivel sequence (e.g., LESSGS (SEQ ID NO: 18)). Other suitable linkers are discussed above and known in the art.

In some embodiments, the fusion proteins include additional domains. For example, in some embodiments, the fusion proteins include sequences that enhance solubility. In some embodiments that fusion proteins include one or more domains that enhance purification, isolation, capture, identification, separation, etc., of the fusion protein. Exemplary domains include, for example, Myc tag and/or a His tag. Other substitutable domains and additional domains are discussed in more detail above.

Exemplary scFv molecules are also provided.

(SEQ ID NO: 22)
DIVLTQSPATLSVTPGDRVSLSCRASQSISNYLHWYQQKSHESPRLLI

-continued

KYASQSISGIPSRFSGSGSGTDFTLSIISVETEDFGMYFCQQSNSWPLTF

GAGTKLELKADAAPGGGGSGGGGSGGGGSEVQLQQSGPELVKPGAS

VKMSCKASGYTFTDYYMNWVKQSHGKSLEWIGRVNPSNGGISYNQ

KFKGKATLTVDKSLSTAYMQLNSLTSEDSAVYYCARGPYTMYYV

GQGTSVTVSSHHHHHH

Single underlining: 4H2 VL sequence
Double underlining: linker sequence
Dashed underlining: 4H2 VH sequence
Wavy underlining: His$_6$ tag The scFv can include, for example, the C-terminus of the 4H2 VL sequence of SEQ ID NO:22 linked to the N-terminal sequence of the 4H2 VH of SEQ ID NO:22, or the C-terminus of the 4H2 VH sequence of SEQ ID NO:22 linked to the N-terminal sequence of the 4H2 VL of SEQ ID NO:22. The linker of SEQ ID NO:22 can be substituted with an alternative linker including, but not limited to, the alternative linkers disclosed herein. Typically, the linker is about 10 to about 25 amino acids and is typically includes glycines. The His$_6$ tag of SEQ ID NO:22 can be replaced with another tag, moved to the N-terminus of the scFv, or deleted completely. In some embodiments, the 4H2 VL, the 4H2 VH, or a combination thereof are variants or humanized forms of the 4H2 VL and/or 4H2 VH of SEQ ID NO:22. In some embodiments, the 4H2 VL and/or 4H2 VH domains are truncated at the N-terminal end, the C-terminal end of both compared to the 4H2 VL and/or 4H2 VH of SEQ ID NO:22. Typically the scFv includes the 3 CDR of the 4H2 VL and/or 4H2 VH of SEQ ID NO:22, or humanized forms thereof. In some embodiments the antibody, or fragment, or fusion thereof has at least 50, 60, 70, 75, 80, 85, 90, 95, 96, 97, 98, or 99 percent sequence identity to SEQ ID NO:22. In some embodiments, the antibody, or fragment, or fusion thereof has a VL domain at least 50, 60, 70, 75, 80, 85, 90, 95, 96, 97, 98, or 99 percent sequence identity to the 4H2 VL domain of SEQ ID NO:22. In some embodiments, the antibody, or fragment, or fusion thereof has a VH domain at least 50, 60, 70, 75, 80, 85, 90, 95, 96, 97, 98, or 99 percent sequence identity to the 4H2 VH domain of SEQ ID NO:22.

The SEQ ID NO:22 and humanized form and variants thereof can be used in any of the compositions and methods disclosed herein. In some embodiments, SEQ ID NO:22, or a humanized form or variant thereof is used in a therapeutic method, such as the methods disclosed herein, without being conjugated to a nanocarrier or therapeutic agent. Thus, in some embodiments, SEQ ID NO:22, or a humanized form or variant thereof is only therapeutic agent. In some embodiments, SEQ ID NO:22, or a humanized form or variant thereof is not a therapeutic agent (e.g., only a targeting moiety), or is one of two or more therapeutic agents.

C. Additional Moieties
1. Additional Targeting Moieties

The nanocarriers can include one or more additional binding moieties or targeting moieties that specifically bind to the target of interest. Representative targeting moieties include, but are not limited to, antibodies and antigen binding fragments thereof, aptamers, peptides, and small molecules. The binding moiety can be conjugated to a polymer that forms the nanocarrier. Typically the binding moiety is displayed on the outer shell of the nanocarrier. The outer shell can serves as a shield to prevent the nanocarrier from being recognized by a subject's immune system thereby increasing the half-life of the nanocarrier in the subject. The nanoparticles can contain a hydrophobic core. In the case of liposaomal nanoparticles the core can also be hydrophilic. In some embodiments, the hydrophobic core is made of a biodegradable polymeric material. The inner core carries therapeutic payloads and releases the therapeutic payloads at a sustained rate after systemic, intraperitoneal, oral, pulmonary, or topical administration. The nanocarrier also optionally include a detectable label, for example a fluorophore or NMR contrast agent that allows visualization of nanocarriers.

The targeting moiety of the nanocarrier can be an antibody or antigen binding fragment thereof. The targeting moieties should have an affinity for a cell-surface receptor or cell-surface antigen on the target cells. The targeting moieties may result in internalization of the nanocarrier within the target cell.

The targeting moiety can specifically recognize and bind to a target molecule specific for a cell type, a tissue type, or an organ. The target molecule can be a cell surface polypeptide, lipid, or glycolipid. The target molecule can be a receptor that is selectively expressed on a specific cell surface, a tissue or an organ. Cell specific markers can be for specific types of cells including, but not limited to stem cells, skin cells, blood cells, immune cells, muscle cells, nerve cells, cancer cells, virally infected cells, bacterial cells, fungal cells, and organ specific cells. The cell markers can be specific for endothelial, ectodermal, or mesenchymal cells. Representative cell specific markers include, but are not limited to cancer specific markers.

The targeting moiety can be a peptide. The targeting peptides can be covalently associated with the polymer and the covalent association can be mediated by a linker.

The targeting moiety can be an antibody or an antigen-binding fragment thereof. The antibody can be any type of immunoglobulin that is known in the art. For instance, the antibody can be of any isotype, e.g., IgA, IgD, IgE, IgG, IgM, etc. The antibody can be monoclonal or polyclonal. The antibody can be a naturally-occurring antibody, e.g., an antibody isolated and/or purified from a mammal, e.g., mouse, rabbit, goat, horse, chicken, hamster, human, etc. Alternatively, the antibody can be a genetically-engineered antibody, e.g., a humanized antibody or a chimeric antibody. The antibody can be in monomeric or polymeric form. The antigen binding portion of the antibody can be any portion that has at least one antigen binding site, such as Fab, F(ab')$_2$, dsFv, sFv, diabodies, and triabodies. In certain embodiments, the antibody is a single chain antibody.

Aptamers are oligonucleotide or peptide sequences with the capacity to recognize virtually any class of target molecules with high affinity and specificity. Aptamers bind to targets such as small organics, peptides, proteins, cells, and tissues. Unlike antibodies, some aptamers exhibit stereoselectivity. The aptamers can be designed to bind to specific targets expressed on cells, tissues or organs.

2. Additional Moieties

The nanocarriers can contain one or more polymer conjugates containing end-to-end linkages between the polymer and a moiety. The moiety can be a targeting moiety, a detectable label, or a therapeutic, prophylactic, or diagnostic agent. For example, a polymer conjugate can be a PLGA-PEG-phosphonate. The additional targeting elements may refer to elements that bind to or otherwise localize the nanocarriers to a specific locale. The locale may be a tissue, a particular cell type, or a subcellular compartment. The targeting element of the nanocarrier can be an antibody or antigen binding fragment thereof, an aptamer, or a small molecule (less than 500 Daltons). The additional targeting elements may have an affinity for a cell-surface receptor or cell-surface antigen on a target cell and result in internalization of the nanocarrier within the target cell.

D. Active Agents

Agents to be delivered include therapeutic, nutritional, diagnostic, and prophylactic compounds. Proteins, peptides, carbohydrates, polysaccharides, nucleic acid molecules, and organic molecules, as well as diagnostic agents, can be delivered. The materials to be incorporated include drugs and imaging agents. Therapeutic agents include antibiotics, antivirals, anti-parasites (helminths, protozoans), anti-cancer (referred to herein as "chemotherapeutics", including cytotoxic drugs such as doxorubicin, cyclosporine, mitomycin C, cisplatin and carboplatin, BCNU, 5FU, methotrexate, adriamycin, camptothecin, epothilones A-F, and taxol), antibodies and bioactive fragments thereof (including humanized, single chain, and chimeric antibodies), antigen and vaccine formulations, peptide drugs, anti-inflammatories, nutraceuticals such as vitamins, and oligonucleotide drugs (including DNA, RNAs including mRNAs, antisense, siRNA, miRNA, anti-miRNA, piRNA, aptamers, ribozymes, external guide sequences for ribonuclease P, and triplex forming agents such as tcPNAs). In some embodiments, the active agent is a vector, plasmid, or other polynucleotide encoding an oligonucleotide such as those discussed above.

Exemplary drugs to be delivered include anti-angiogenic agents, antiproliferative and chemotherapeutic agents such as rampamycin.

Representative classes of diagnostic materials include paramagnetic molecules, fluorescent compounds, magnetic molecules, and radionuclides. Exemplary materials include, but are not limited to, metal oxides, such as iron oxide, metallic particles, such as gold particles, etc. Biomarkers can also be conjugated to the surface for diagnostic applications.

One or more active agents may be formulated alone or with excipients or encapsulated on, in or incorporated into the nanocarriers. Active agents include therapeutic, prophylactic, neutraceutical and diagnostic agents. Any suitable agent may be used. These include organic compounds, inorganic compounds, proteins, polysaccharides, nucleic acids or other materials that can be incorporated using standard techniques.

Active agents include synthetic and natural proteins (including enzymes, peptide-hormones, receptors, growth factors, antibodies, signaling molecules), and synthetic and natural nucleic acids (including RNA, DNA, anti-sense RNA, triplex DNA, inhibitory RNA (RNAi), and oligonucleotides), and biologically active portions thereof. Suitable active agents have a size greater than about 1,000 Da for small peptides and polypeptides, more typically at least about 5,000 Da and often 10,000 Da or more for proteins. Nucleic acids are more typically listed in terms of base pairs or bases (collectively "bp"). Nucleic acids with lengths above about 10 bp are typically used in the present method. More typically, useful lengths of nucleic acids for probing or therapeutic use will be in the range from about 20 bp (probes; inhibitory RNAs, etc.) to tens of thousands of bp for genes and vectors. The active agents may also be hydrophilic molecules, optionally having a low molecular weight.

Alternatively, the biodegradable polymers may encapsulate cellular materials, such as for example, cellular materials to be delivered to antigen presenting cells as described below to induce immunological responses.

Prophylactics can include compounds alleviating swelling, reducing radiation damage, and anti-inflammatories.

For imaging, radioactive materials such as Technetium99 ($^{99m}$Tc) or magnetic materials such as $Fe_2O_3$ could be used. Examples of other materials include gases or gas emitting compounds, which are radioopaque. The most common imaging agents for brain tumors include iron oxide and gadolinium. Diagnostic agents can be radioactive, magnetic, or x-ray or ultrasound-detectable. Other detectable labels include, for example, a radioisotope, a fluorophore (e.g., fluorescein isothiocyanate (FITC), phycoerythrin (PE)), an enzyme (e.g., alkaline phosphatase, horseradish peroxidase), element particles (e.g., gold particles) or a contrast agent. These may be encapsulated within, dispersed within, or conjugated to the polymer.

For example, a fluorescent label can be chemically conjugated to a polymer of the nanocarrier to yield a fluorescently labeled polymer. In other embodiments the label is a contrast agent. A contrast agent refers to a substance used to enhance the contrast of structures or fluids within the body in medical imaging. Contrast agents are known in the art and include, but are not limited to agents that work based on X-ray attenuation and magnetic resonance signal enhancement. Suitable contrast agents include iodine and barium.

Active agents can be selected based on the type of treatment being employed. Exemplary active agents for treating cancer, ischemia, and injury are discussed in more detail below.

The Examples below show that DOX was encapsulated with 6.0% by weight in nanoparticles. Active agent loading depends on factors including the chemical nature of active agent and composition of the nanocarrier, however, in generally, or about 1% to about 50% of active agent by weight is loaded into the nanocarrier. Loading can be 5% to 25%.

III. Methods of Making

A. Conjugates

Methods of polymer synthesis are described, for instance, in Braun et al. (2005) Polymer Synthesis: Theory and Practice. New York, NY: Springer. The polymers may be synthesized via step-growth polymerization, chain-growth polymerization, or plasma polymerization.

In some embodiments an amphiphilic polymer is synthesized starting from a hydrophobic polymer terminated with a first reactive coupling group and a hydrophilic polymer terminated with a second reactive coupling group capable of reacting with the first reactive coupling group to form a covalent bond. One of either the first reactive coupling group or the second reactive coupling group can be a primary amine, where the other reactive coupling group can be an amine-reactive linking group such as isothiocyanates, isocyanates, acyl azides, NHS esters, sulfonyl chlorides, aldehydes, glyoxals, epoxides, oxiranes, carbonates, aryl halides, imidoesters, carbodiimides, anhydrides, and fluorophenyl esters. One of either the first reactive coupling group or the second reactive coupling group can be an aldehyde, where the other reactive coupling group can be an aldehyde reactive linking group such as hydrazides, alkoxyamines, and primary amines. One of either the first reactive coupling group or the second reactive coupling group can be a thiol, where the other reactive coupling group can be a sulfhydryl reactive group such as maleimides, haloacetyls, and pyridyl disulfides.

In some embodiments a hydrophobic polymer terminated with an amine or an amine-reactive linking group is coupled to a hydrophilic polymer terminated with complimentary reactive linking group. For example, an NHS ester activated PLGA can be formed by reacting PLGA-CO(OH) with NHS and a coupling reagent such as dicyclohexylcarbodiimide (DCC) or ethyl(dimethylaminopropyl) carbodiimide (EDC). The NHS ester activated PLGA can be reacted with a hydrophilic polymer terminated with a primary amine, such as a PEG-NH$_2$ to form an amphiphilic PLGA-b-PEG block copolymer.

In some embodiments a conjugate of an amphiphilic polymer with a targeting moiety is formed using the same or similar coupling reactions. In some embodiments the conjugate is made starting from a hydrophilic polymer terminated on one end with a first reactive coupling group and terminated on a second end with a protective group. The hydrophilic polymer is reacted with a targeting moiety having a reactive group that is complimentary to the first reactive group to form a covalent bond between the hydrophilic polymer and the targeting moiety. The protective group can then be removed to provide a second reactive coupling group, for example to allow coupling of a hydrophobic polymer block to the conjugate of the hydrophilic polymer with the targeting moiety. A hydrophobic polymer terminated with a reactive coupling group complimentary to the second reactive coupling group can then be covalently coupled to form the conjugate. Of course, the steps could also be performed in reverse order, i.e. a conjugate of a hydrophobic polymer and a hydrophilic polymer could be formed first followed by deprotection and coupling of the targeting moiety to the hydrophilic polymer block.

In some embodiments a conjugate is formed having a moiety conjugated to both ends of the amphiphilic polymer. For example, an amphiphilic polymer having a hydrophobic polymer block and a hydrophilic polymer block may have targeting moiety conjugated to the hydrophilic polymer block and an additional moiety conjugated to the hydrophobic polymer block. In some embodiments the additional moiety can be a detectable label. In some embodiments the additional moiety is a therapeutic, prophylactic, or diagnostic agent. For example, the additional moiety could be a moiety used for radiotherapy. The conjugate can be prepared starting from a hydrophobic polymer having on one end a first reactive coupling group and a another end first protective group and a hydrophilic polymer having on one end a second reactive coupling group and on another end a second protective group. The hydrophobic polymer can be reacted with the additional moiety having a reactive coupling group complimentary to the first reactive coupling group, thereby forming a conjugate of the hydrophobic polymer to the additional moiety. The hydrophilic polymer can be reacted with a targeting moiety having a reactive coupling group complimentary to the second reactive coupling group, thereby forming a conjugate of the hydrophilic polymer to the targeting moiety. The first protective group and the second protective group can be removed to yield a pair of complimentary reactive coupling groups that can be reacted to covalently link the hydrophobic polymer block to the hydrophilic polymer block.

B. Nanocarrier Formation

1. Emulsion Methods

In some embodiments, a nanoparticle is prepared using an emulsion solvent evaporation method. For example, a polymeric material is dissolved in a water immiscible organic solvent and mixed with a drug solution or a combination of drug solutions. In some embodiments a solution of a therapeutic, prophylactic, or diagnostic agent to be encapsulated is mixed with the polymer solution. The polymer can be, but is not limited to, one or more of the following: PLA, PGA, PCL, their copolymers, polyacrylates, the aforementioned PEGylated polymers, the aforementioned Polymer-drug conjugates, the aforementioned polymer-peptide conjugates, or the aforementioned fluorescently labeled polymers, or various forms of their combinations. The drug molecules can be, but are not limited to, one or more of the following: PPARgamma activators (e.g. Rosiglitazone, (RS)-5-[4-(2-[methyl(pyridin-2-yl)amino]ethoxy)benzyl]thiazolidine-2,4-dione, Pioglitazone, (RS)-5-(4-[2-(5-ethylpyridin-2-yl)ethoxy]benzyl)thiazolidine-2,4-dione, Troglitazone, (RS)-5-(4-[(6-hydroxy-2,5,7,8-tetramethylchroman-2-yl)methoxy]benzyl)thiazolidine-2,4-dione etc.), prostagladin E2 analog (PGE2, (5Z,11α, 13E,15S)-7-[3-hydroxy-2-(3-hydroxyoct-1-enyl)-5-oxo-cyclopentyl] hept-5-enoic acid etc.), beta3 adrenoceptor agonist (CL 316243, Disodium 5-[(2R)-2-[[(2R)-2-(3-Chlorophenyl)-2-hydroxyethyl]amino]propyl]-1,3-benzodioxole-2,2-dicarboxylate hydrate, etc.), Fibroblast Growth Factor 21 (FGF-21), Irisin, RNA, DNA, chemotherapeutic compounds, nuclear magnetic resonance (NMR) contrast agents, or combinations thereof. The water immiscible organic solvent, can be, but is not limited to, one or more of the following: chloroform, dichloromethane, and acyl acetate. The drug can be dissolved in, but is not limited to, one or more of the following: acetone, ethanol, methanol, isopropyl alcohol, acetonitrile and Dimethyl sulfoxide (DMSO).

In some embodiments the polymer solution contains one or more polymer conjugates as described above. The polymer solution can contain a first amphiphilic polymer conjugate having a hydrophobic polymer block, a hydrophilic polymer block, and a targeting moiety conjugated to the hydrophilic end. In some embodiments the polymer solution contains one or more additional polymers or amphiphilic polymer conjugates. For example the polymer solution may contain, in addition to the first amphiphilic polymer conjugate, one or more hydrophobic polymers, hydrophilic polymers, lipids, amphiphilic polymers, polymer-drug conjugates, or conjugates containing other targeting moieties. By controlling the ratio of the first amphiphilic polymer to the additional polymers or amphiphilic polymer conjugates, the density of the targeting moieties can be controlled. The first amphiphilic polymer may be present from 1% to 100% by weight of the polymers in the polymer solution. For example, the first amphiphilic polymer can be present at 10%, 20%, 30%, 40%, 50%, or 60% by weight of the polymers in the polymer solution.

An aqueous solution is then added into the resulting mixture solution to yield emulsion solution by emulsification. The emulsification technique can be, but not limited to, probe sonication or homogenization through a homogenizer. The plaque-targeted peptides or fluorophores or drugs may be associated with the surface of, encapsulated within, surrounded by, and/or distributed throughout the polymeric matrix of this inventive particle.

2. Nanoprecipitation Method

In another embodiment, a multimodal nanoparticle is prepared using nanoprecipitation methods or microfluidic devices. A polymeric material is mixed with a drug or drug combinations in a water miscible organic solvent. The polymer can be, but is not limited to, one or more of the following: PLA, PGA, PCL, their copolymers, polyacrylates, the aforementioned PEGylated polymers, the aforementioned Polymer-drug conjugates, the aforementioned polymer-peptide conjugates, or the aforementioned fluorescently labeled polymers, or various forms of their combinations. The drug molecules can be, but are not limited to, one or more of the following: PPARgamma activators (e.g. Rosiglitazone, (RS)-5-[4-(2-[methyl(pyridin-2-yl)amino]ethoxy)benzyl]thiazolidine-2,4-dione, Pioglitazone, (RS)-5-

(4-[2-(5-ethylpyridin-2-yl)ethoxy]benzyl)thiazolidine-2,4-dione, Troglitazone, (RS)-5-(4-[(6-hydroxy-2,5,7,8-tetramethylchroman-2-yl)methoxy]benzyl)thiazolidine-2,4-dione etc.), prostagladin E2 analog (PGE2, (5Z,11α, 13E, 15S)-7-[3-hydroxy-2-(3-hydroxyoct-1-enyl)-5-oxo-cyclopentyl] hept-5-enoic acid etc.), beta3 adrenoceptor agonist (CL 316243, Disodium 5-[(2R)-2-[[(2R)-2-(3-Chlorophenyl)-2-hydroxyethyl]amino]propyl]-1,3-benzodioxole-2,2-dicarboxylate hydrate, etc.), RNA, DNA, chemotherapeutic compounds, nuclear magnetic resonance (NMR) contrast agents, or combinations thereof. The water miscible organic solvent, can be, but is not limited to, one or more of the following: acetone, ethanol, methanol, isopropyl alcohol, acetonitrile and Dimethyl sulfoxide (DMSO). The resulting mixture solution is then added to a polymer non-solvent, such as an aqueous solution, to yield nanoparticle solution. The plaque-targeted peptides or fluorophores or drugs may be associated with the surface of, encapsulated within, surrounded by, and/or distributed throughout the polymeric matrix of this inventive particle.

3. Microfluidics

Methods of making nanoparticles using microfluidics are known in the art. Suitable methods include those described in U.S. Patent Application Publication No. 2010/0022680 A1 by Kamik et al. In general, the microfluidic device comprises at least two channels that converge into a mixing apparatus. The channels are typically formed by lithography, etching, embossing, or molding of a polymeric surface. A source of fluid is attached to each channel, and the application of pressure to the source causes the flow of the fluid in the channel. The pressure may be applied by a syringe, a pump, and/or gravity. The inlet streams of solutions with polymer, targeting moieties, lipids, drug, payload, etc. converge and mix, and the resulting mixture is combined with a polymer non-solvent solution to form the nanoparticles having the desired size and density of moieties on the surface. By varying the pressure and flow rate in the inlet channels and the nature and composition of the fluid sources nanoparticles can be produced having reproducible size and structure.

4. Other Methodologies

Solvent Evaporation. In this method the polymer is dissolved in a volatile organic solvent, such as methylene chloride. The drug (either soluble or dispersed as fine particles) is added to the solution, and the mixture is suspended in an aqueous solution that contains a surface active agent such as poly(vinyl alcohol). The resulting emulsion is stirred until most of the organic solvent evaporated, leaving solid microparticles. The resulting microparticles are washed with water and dried overnight in a lyophilizer. Microparticles with different sizes (0.5-1000 microns) and morphologies can be obtained by this method. This method is useful for relatively stable polymers like polyesters and polystyrene.

However, labile polymers, such as polyanhydrides, may degrade during the fabrication process due to the presence of water. For these polymers, the following two methods, which are performed in completely anhydrous organic solvents, are more useful.

Hot Melt Microencapsulation. In this method, the polymer is first melted and then mixed with the solid particles. The mixture is suspended in a non-miscible solvent (like silicon oil), and, with continuous stirring, heated to 5° C. above the melting point of the polymer. Once the emulsion is stabilized, it is cooled until the polymer particles solidify. The resulting microparticles are washed by decantation with petroleum ether to give a free-flowing powder. Microparticles with sizes between 0.5 to 1000 microns are obtained with this method. The external surfaces of spheres prepared with this technique are usually smooth and dense. This procedure is used to prepare microparticles made of polyesters and polyanhydrides. However, this method is limited to polymers with molecular weights between 1,000-50,000 daltons.

Solvent Removal. This technique is primarily designed for polyanhydrides. In this method, the drug is dispersed or dissolved in a solution of the selected polymer in a volatile organic solvent like methylene chloride. This mixture is suspended by stirring in an organic oil (such as silicon oil) to form an emulsion. Unlike solvent evaporation, this method can be used to make microparticles from polymers with high melting points and different molecular weights. Microparticles that range between 1-300 microns can be obtained by this procedure. The external morphology of spheres produced with this technique is highly dependent on the type of polymer used.

Spray-Drying In this method, the polymer is dissolved in organic solvent. A known amount of the active drug is suspended (insoluble drugs) or co-dissolved (soluble drugs) in the polymer solution. The solution or the dispersion is then spray-dried. Typical process parameters for a mini-spray drier (Buchi) are as follows: polymer concentration=0.04 g/mL, inlet temperature=-24° C., outlet temperature=13-15° C., aspirator setting=15, pump setting=10 mL/minute, spray flow=600 Nl/hr, and nozzle diameter=0.5 mm. Microparticles ranging between 1-10 microns are obtained with a morphology which depends on the type of polymer used.

Hydrogel Microparticles. Microparticles made of gel-type polymers, such as alginate, are produced through traditional ionic gelation techniques. The polymers are first dissolved in an aqueous solution, mixed with barium sulfate or some bioactive agent, and then extruded through a microdroplet forming device, which in some instances employs a flow of nitrogen gas to break off the droplet. A slowly stirred (approximately 100-170 RPM) ionic hardening bath is positioned below the extruding device to catch the forming microdroplets. The microparticles are left to incubate in the bath for twenty to thirty minutes in order to allow sufficient time for gelation to occur. Microparticle particle size is controlled by using various size extruders or varying either the nitrogen gas or polymer solution flow rates. Chitosan microparticles can be prepared by dissolving the polymer in acidic solution and crosslinking it with tripolyphosphate. Carboxymethyl cellulose (CMC) microparticles can be prepared by dissolving the polymer in acid solution and precipitating the microparticle with lead ions. In the case of negatively charged polymers (e.g., alginate, CMC), positively charged ligands (e.g., polylysine, polyethyleneimine) of different molecular weights can be ionically attached.

5. Liposome and Micelle Formation

Liposomes typically have an aqueous core. The aqueous core can contain water or a mixture of water and alcohol. Suitable alcohols include, but are not limited to, methanol, ethanol, propanol, (such as isopropanol), butanol (such as n-butanol, isobutene, sec-butanol, tart-butanol, pentane (such as amyl alcohol, isobutyl carbinol), hexanol (such as 1-hexanol, 2-hexanol, 3-hexanol), heptanol (such as 1-heptanol, 2-heptanol, 3-heptanol and 4-heptanol) or octanol (such as 1-octanol) or a combination thereof.

Liposomes include, for example, small unilamellar vesicles (SUVs) formed by a single lipid bilayer, large unilamellar vesicles (LANs), which are vesicles with relatively large particles formed by a single lipid bilayer, and multi-lamellar vesicles (MLVs), which are formed by multiple membrane layers. Thus, the liposomes can have either one or several aqueous compartments delineated by either one (unilamellar) or several (multilamellar) phospholipid bilayers (Sapra, et al., *Curr. Drug Deliv.*, 2, 369-81 (2005)). Multilamellar liposomes have more lipid bilayers for hydrophobic therapeutic agents to associate with. Thus, potentially greater amounts of therapeutic agent are available within the liposome to reach the target cell.

Liposomes can be of any particle size, for example the mean particle diameter can be about 10 to about 2000 nm. In one embodiment of the invention, the mean particle diameter is about 10, 20, 25, 30, 40, 50, 100, 200, 300, 400, 500, 600, 700, 800, 900, 1,000, 1,250, 1,500, 1,750, 2,000 nm (or any range between about 10 and about 2,000 nm) or more. In one embodiment of the invention, the mean particle diameter is about 2,000, 1,750, 1,500, 1,250, 1,000, 900, 800, 700, 600, 500, 400, 300, 200, 100, 50, 40, 30, 25, 20, 10 rim (or any range between about 2,000 and 10 nm) or less. The mean particle diameter may be about 20 to about 1,000 nm, about 100 to about 1,500 nm, about 100 to about 1,000 nm, about 100 to about 700 nm, about 200 to about 2,000 nm, about 1,000 to about 2,000 nm, or about 750 to about 1,500 nm. Particle diameter refers to the diameter of a particle measured by dynamic light scattering.

The liposomal formulations can contain large liposomes ranging from 1 to 100% of the liposome population in the formulation. In some embodiments, large liposomes represent greater than approximately 50% of the liposome population in the formulation.

Methods of manufacturing liposomes are known in the art and can include, for example, drying down of the lipids from organic solvents, dispersion of the lipids in aqueous media, purification of the resultant liposomes, and analysis of the final product. Some methods of liposome manufacture include, for example, extrusion methods, the Mozafari method, the polyol dilution method, the bubble method, and the heating method.

The micelles may be prepared in a conventional manner, for example, by reversed-phase evaporation, ether injection, surfactant-based techniques, etc. Polymer micelle formulations utilizing a block copolymer having a hydrophilic segment and a hydrophobic segment have been disclosed, e.g., in U.S. Application No. 20160114058, WO 2009/142326 A1 and WO 2010/013836 A1.

C. Methods of Encapsulating or Attaching Molecules to the Surface of the Particles There are two principle groups of molecules to be encapsulated or attached to the polymer, either directly or via a coupling molecule: targeting molecules, attachment molecules and therapeutic, nutritional, diagnostic or prophylactic agents. These can be coupled using standard techniques. The targeting molecule or therapeutic molecule to be delivered can be coupled directly to the polymer or to a material such as a fatty acid which is incorporated into the polymer.

Functionality refers to conjugation of a ligand to the surface of the particle via a functional chemical group (carboxylic acids, aldehydes, amines, sulfhydryls and hydroxyls) present on the surface of the particle and present on the ligand to be attached. Functionality may be introduced into the particles in two ways.

The first is during the preparation of the particles, for example during the emulsion preparation of particles by incorporation of stabilizers with functional chemical groups.

A second is post-particle preparation, by direct crosslinking particles and ligands with homo- or heterobifunctional crosslinkers. This second procedure may use a suitable chemistry and a class of crosslinkers (CDI, EDAC, glutaraldehydes, etc. as discussed in more detail below) or any other crosslinker that couples ligands to the particle surface via chemical modification of the particle surface after preparation. This second class also includes a process whereby amphiphilic molecules such as fatty acids, lipids or functional stabilizers may be passively adsorbed and adhered to the particle surface, thereby introducing functional end groups for tethering to ligands.

D. Methods of Linking Active Agent to Antibody

As discussed above, in some embodiments, the 4H2 antibody, or a fragment, variant, or fusion protein thereof is linked to an active agent cargo and used to deliver the active agent without a nanocarrier delivery system. In addition to conjugating the antibody to the biologically active molecule, the latter can be attached to or associated with the 4H2 antibody, or a fragment, variant, or fusion protein thereof by any method known in the art. For example an fragment can be expressed in a host cell as a fusion protein additionally containing a biologically active polypeptide. A monoclonal antibody, or active fragment thereof, can be chemically linked to a polypeptide by a peptide bond or by a chemical or peptide linker molecule of the type well known in the art. Methods for attaching a drug or other small molecule pharmaceutical to an antibody fragment are well known and can include used of bifunctional chemical linkers such as N-succinimidyl (4-iodoacetyl)-aminobenzoate; sulfosuccinimidyl(4-iodoacetyl)-aminobenzoate; 4-succinimidyl-oxycarbonyl-.A-inverted.-(2-pyridyldithio) toluene; sulfosuccinimidyl-6-[.alpha.-methyl-.A-inverted.-(pyridyldithiol)-toluami-do] hexanoate; N-succinimidyl-3-(-2-pyridyldithio)-proprionate; succinimidyl-6-[3(–(-2-pyridyldithio)-proprionamido] hexanoate; sulfosuccinimidyl-6-[3(–(-2-pyridyldithio)-propionamido] hexanoate; 3-(2-pyridyldithio)-propionyl hydrazide, Ellman's reagent, dichlorotriazinic acid, S-(2-thiopyridyl)-L-cysteine, and the like. Further bifunctional linking molecules are discussed in, for example, U.S. Pat. Nos. 5,349,066, 5,618,528, 4,569,789, 4,952,394, and 5,137,877.

The linker can cleavable or noncleavable. Highly stable linkers can reduce the amount of payload that falls off in circulation, thus improving the safety profile, and ensuring that more of the payload arrives at the target cell. Linkers can be based on chemical motifs including disulfides, hydrazones or peptides (cleavable), or thioethers (noncleavable) and control the distribution and delivery of the active agent to the target cell. Cleavable and noncleavable types of linkers have been proven to be safe in preclinical and clinical trials (see, e.g., Brentuximab vedotin which includes an enzyme-sensitive linker cleavable by cathepsin; and Trastuzumab emtansine, which includes a stable, non-cleavable linker). In particular embodiments, the linker is a peptide linker cleavable by Edman degredation (Bachor, et al., *Molecular diversity*, 17 (3): 605-11 (2013)).

A non-cleavable linker can keep the active agent within the cell or the target microenvironment. As a result, the entire antibody, linker and active agent enter the targeted cell where the antibody is degraded to the level of an amino acid. The resulting complex between the amino acid of the antibody, the linker and the active agent becomes the active drug. In contrast, cleavable linkers are catalyzed by enzymes in the target cell or microenvironment where it releases the active agent. Once cleaved, the payload can escape from the targeted cell and attack neighboring cells (also referred to as "bystander killing"). In the case of the 4H2, cleavage of the linker can lead to two active agents, the antibody itself and its payload, which can have different mechanisms of action in the target cell or microenivornment.

In some embodiments, there is one or more additional molecules, between the active agent and the cleavage site. Other considerations include site-specific conjugation (TDCs) (Axup, *Proceedings of the National Academy of Sciences*, 109 (40): 16101-6 (2012) and conjugation techniques such as those described in Lyon, et al., *Bioconjugate Chem.*, 32 (10): 1059-1062 (2014), and Kolodych, et al., *Bioconjugate Chem.*, 26 (2): 197-200 (2015) which can improve stability and therapeutic index, and a emitting immunoconjugates (Wulbrand, et al., Multhoff, Gabriele, ed., *PLoS ONE*. 8 (5): e64730 (2013)).

The composition can be referred to as an antibody drug conjugate (ADC). The active agent can be, for example, a chemotherapeutic drug. By combining the targeting of the antibody with the cancer-killing ability of cytotoxic drugs, ADCs allow sensitive discrimination between healthy and diseased tissue.

Various other methods of producing a nanocarriers encapsulating an active agent are known in the art. For example, methods of loading nanoporous structures are reviewed in Wang et al. (2009) *J. Mater. Chem.* 19, 6451. In one example, nanocarriers may be loaded by contacting the nanocarrier with an aqueous solution of an active followed by a period of incubation. The active solution can contain an excess of the amount of active to be loaded onto the supraparticle and incubation can occur at room temperature. Agitation of the solution containing the supraparticle and the payload may be used to enhance loading of the payload.

IV. Pharmaceutical Compositions

The disclosed compositions can be formulated with appropriate pharmaceutically acceptable carriers into pharmaceutical compositions for administration to an individual in need thereof. The formulations can be administered enterally (e.g., oral) or parenterally (e.g., by injection or infusion).

The disclosed compositions can be formulated for parenteral administration. "Parenteral administration", as used herein, means administration by any method other than through the digestive tract or non-invasive topical or regional routes. For example, parenteral administration may include administration to a patient intravenously, intradermally, intraarterially, intraperitoneally, intralesionally, intracranially, intraarticularly, intraprostatically, intrapleurally, intratracheally, intravitreally, intratumorally, intramuscularly, subcutaneously, subconjunctivally, intravesicularly, intrapericardially, intraumbilically, by injection, and by infusion.

In some embodiments, the disclosed compositions are administered systemically by, for example, injection or infusion. In some embodiments, the compositions are administered locally by injection or infusion. In more specific embodiments, the compositions are administered to the central nervous system, particularly the brain, by convection enhanced delivery (CED).

Parenteral formulations can be prepared as aqueous compositions using techniques known in the art. Typically, such compositions can be prepared as injectable formulations, for example, solutions or suspensions; solid forms suitable for using to prepare solutions or suspensions upon the addition of a reconstitution medium prior to injection; emulsions, such as water-in-oil (w/o) emulsions, oil-in-water (o/w) emulsions, and microemulsions thereof, liposomes, or emulsomes.

The carrier can be a solvent or dispersion medium containing, for example, water, ethanol, one or more polyols (e.g., glycerol, propylene glycol, and liquid polyethylene glycol), oils, such as vegetable oils (e.g., peanut oil, corn oil, sesame oil, etc.), and combinations thereof. The proper fluidity can be maintained, for example, by the use of a coating, such as lecithin, by the maintenance of the required nanocarrier size in the case of dispersion and/or by the use of surfactants. In many cases, isotonic agents, for example, sugars or sodium chloride are included Solutions and dispersions of the active compounds as the free acid or base or pharmacologically acceptable salts thereof can be prepared in water or another solvent or dispersing medium suitably mixed with one or more pharmaceutically acceptable excipients including, but not limited to, surfactants, dispersants, emulsifiers, pH modifying agents, viscosity modifying agents, and combination thereof.

Suitable surfactants may be anionic, cationic, amphoteric or nonionic surface active agents. Suitable anionic surfactants include, but are not limited to, those containing carboxylate, sulfonate and sulfate ions. Examples of anionic surfactants include sodium, potassium, ammonium of long chain alkyl sulfonates and alkyl aryl sulfonates such as sodium dodecylbenzene sulfonate; dialkyl sodium sulfosuccinates, such as sodium dodecylbenzene sulfonate; dialkyl sodium sulfosuccinates, such as sodium bis-(2-ethylthioxyl)-sulfosuccinate; and alkyl sulfates such as sodium lauryl sulfate. Cationic surfactants include, but are not limited to, quaternary ammonium compounds such as benzalkonium chloride, benzethonium chloride, cetrimonium bromide, stearyl dimethylbenzyl ammonium chloride, polyoxyethylene and coconut amine. Examples of nonionic surfactants include ethylene glycol monostearate, propylene glycol myristate, glyceryl monostearate, glyceryl stearate, polyglyceryl-4-oleate, sorbitan acylate, sucrose acylate, PEG-150 laurate, PEG-400 monolaurate, polyoxyethylene monolaurate, polysorbates, polyoxyethylene octylphenylether, PEG-1000 cetyl ether, polyoxyethylene tridecyl ether, polypropylene glycol butyl ether, Poloxamer® 401, stearoyl monoisopropanolamide, and polyoxyethylene hydrogenated tallow amide. Examples of amphoteric surfactants include sodium N-dodecyl-.beta.-alanine, sodium N-lauryl-β-iminodipropionate, myristoamphoacetate, lauryl betaine and lauryl sulfobetaine.

The formulation can contain a preservative to prevent the growth of microorganisms. Suitable preservatives include, but are not limited to, parabens, chlorobutanol, phenol, sorbic acid, and thimerosal. The formulation may also contain an antioxidant to prevent degradation of the active agent(s).

The formulation is typically buffered to a pH of 3-8 for parenteral administration upon reconstitution. Suitable buffers include, but are not limited to, phosphate buffers, acetate buffers, and citrate buffers.

Water soluble polymers are often used in formulations for parenteral administration. Suitable water-soluble polymers include, but are not limited to, polyvinylpyrrolidone, dextran, carboxymethylcellulose, and polyethylene glycol.

Sterile injectable solutions can be prepared by incorporating the active compounds in the required amount in the appropriate solvent or dispersion medium with one or more of the excipients listed above, as required, followed by filtered sterilization. Generally, dispersions are prepared by incorporating the various sterilized active ingredients into a sterile vehicle which contains the basic dispersion medium and the required other ingredients from those listed above. In the case of sterile powders for the preparation of sterile injectable solutions, exemplary methods of preparation include vacuum-drying and freeze-drying techniques which yield a powder of the active ingredient plus any additional desired ingredient from a previously sterile-filtered solution thereof. The powders can be prepared in such a manner that the nanocarriers are porous in nature, which can increase dissolution of the nanocarriers. Methods for making porous nanocarriers are well known in the art.

Enteral formulations are prepared using pharmaceutically acceptable carriers. As generally used herein "carrier" includes, but is not limited to, diluents, preservatives, binders, lubricants, disintegrators, swelling agents, fillers, stabilizers, and combinations thereof. Polymers used in the dosage form include hydrophobic or hydrophilic polymers and pH dependent or independent polymers. Exemplary hydrophobic and hydrophilic polymers include, but are not limited to, hydroxypropyl methylcellulose, hydroxypropyl cellulose, hydroxyethyl cellulose, carboxy methylcellulose, polyethylene glycol, ethylcellulose, microcrystalline cellulose, polyvinyl pyrrolidone, polyvinyl alcohol, polyvinyl acetate, and ion exchange resins.

Carrier also includes all components of the coating composition, which may include plasticizers, pigments, colorants, stabilizing agents, and glidants. Formulations can be prepared using one or more pharmaceutically acceptable excipients, including diluents, preservatives, binders, lubricants, disintegrators, swelling agents, fillers, stabilizers, and combinations thereof.

Controlled release dosage formulations can be prepared as described in standard references such as "Pharmaceutical dosage form tablets", eds. Liberman et. al. (New York, Marcel Dekker, Inc., 1989), "Remington—The science and practice of pharmacy", 20th ed., Lippincott Williams & Wilkins, Baltimore, MD, 2000, and "Pharmaceutical dosage forms and drug delivery systems", 6th Edition, Ansel et al., (Media, PA: Williams and Wilkins, 1995). These references provide information on excipients, materials, equipment and process for preparing tablets and capsules and delayed release dosage forms of tablets, capsules, and granules. These references provide information on carriers, materials, equipment and process for preparing tablets and capsules and delayed release dosage forms of tablets, capsules, and granules.

Stabilizers are used to inhibit or retard drug decomposition reactions which include, by way of example, oxidative reactions. Suitable stabilizers include, but are not limited to, antioxidants, butylated hydroxytoluene (BHT); ascorbic acid, its salts and esters; Vitamin E, tocopherol and its salts; sulfites such as sodium metabisulphite; cysteine and its derivatives; citric acid; propyl gallate, and butylated hydroxyanisole (BHA).

V. Methods of Use

A. Methods of Treatment

The disclosed compositions can be used to deliver active agents to sites extracellular guanosine and DNA in vivo. Typically an effective amount of active agent-load nanocarriers with an anti-guanosine targeting moiety, such as 4H2 or a fragment or fusion protein derived therefrom are administered to a subject in need thereof. Additionally or alternatively an effective amount of active agent-cargo other than nanoparticles linked to an anti-guanosine targeting moiety, such as 4H2 or a fragment or fusion protein derived therefrom, can be administered to a subject in need thereof. As used herein, the term "effective amount" or "therapeutically effective amount" means a dosage sufficient to treat, inhibit, or alleviate one or more symptoms of the disorder being treated or to otherwise provide a desired pharmacologic and/or physiologic effect. The precise dosage will vary according to the selected active agent and a variety of factors such as subject-dependent variables (e.g., age, immune system health, etc.), the disease, and the treatment being effected. As discussed in more detail below, in some embodiments, the subject has cancer, ischemia, or an injury. The compositions can be more efficient, less toxic, or a combination thereof when compared to a control. In some embodiments, the control is cells, tissue, or a subject treated with free active agent, or active agent encapsulated in an untargeted nanocarrier.

Methods of detecting a site or sites of cancer, tissue damage, injury, or ischemia are also provided. The methods typically include administering to a subject in need thereof an effective amount a targeted-nanocarrier or antibody-agent conjugate in a pharmaceutically acceptable carrier. The nanocarriers are typically loaded with, or the antibody-conjugate attached to, an agent detectable using diagnostic imaging or nuclear medicine techniques, for example, by PET-CT, bone scan, MRI, CT, echocardiography, ultrasound, or x-ray.

Although the methods herein are most typically directed to use of targeted-nanocarriers, all of the provided methods are also disclosed utilizing an antibody-conjugate as introduced above, which can be used alone or in combination with the disclosed nanocarriers. For example, in some embodiments, 4H2, or a fragment, variant or fusion protein thereof is linked to an active agent cargo and contacted with cells or administered to a subject in need thereof, and can be used without being linked to nanocarrier. Thus in some embodiments, the pharmaceutical composition includes an antibody-active agent conjugate in the absence of a nanocarrier. Upon entry into the cell, the antibody conjugate localizes in cytoplasm.

B. Dosage Regimens

A key feature that distinguishes the microenvironment within tumors from that of healthy tissue is the presence of a comparatively larger amount of extracellular DNA (exDNA), which includes a guanosine component (Weisbart, et al., *Sci Rep.*, 5:12022 (2015), Stroun, et al., *Clin Chim Acta*, 313(1-2):139-142 (2001), Sueoka-Aragane, et al., *PloS One*, 9(12) (2014), Wen, et al., *Cancer Research*, 73(14):4256-4266 (2013)), which originates from actively dividing, apoptotic or necrotic tumor cells and neutrophil extracellular traps (Wen, et al., *Cancer Research*, 73(14): 4256-4266 (2013), Hawes, et al., *Cancer Research*, 75(20): 4260-4264 (2015), Demers, et al., *Proc Natl Acad Sci USA*, 109(32):13076-13081 (2012)). Importantly, the amount of exDNA in the region of tumors further increases during treatment with cytotoxic agents, such as DOX, that cause tumor cell death and release of DNA (Swystun, et al., *J Thromb Haemost*, 9(11):2313-2321 (2011), Hansen, et al., *Sci Transl Med*, 4(157):157ra142 (2012)). The greater concentration of exDNA in the tumor environment compared to normal tissues offers an opportunity to develop a novel tumor targeting approach using an agent that has a high affinity with DNA.

When the nanocarriers are loaded with an active agent that induces cell death at the target site, localization of the antibody-nanocarriers can become more and more efficient at targeting extracellular DNA as time goes by and more treatments are delivered, because as that happens the dead or dying cells release more and more DNA and attract more and more of the targeted nanocarriers to the site of extracellular DNA. This approach can be referred to as "autocatalytic,"

meaning it creates its own positive feedback loop to stimulate better and better localization of the nanocarriers to the target site. Although this approach is particularly effective for treating cancer, and other diseases, disorders, and conditions in which increased cell death is desired, dosage regimens include two or more administrations can be utilized for any method of treatment.

In general, by way of example only, dosage forms useful in the disclosed methods can include doses in the range of 1 mg to 1,000 mg, 10 mg to 750 mg, 15 mg to 500 mg, or 20 mg to 250 mg, or 25 mg to 200 mg, or 30 mg to 150 mg, or 35 mg to 125 mg, or 40 mg to 100 mg, or 45 mg to 90 mg, or 50 mg to 80 mg of nanocarrier or conjugate.

Dosage range depends on drug to be delivered, the delivery vehicle, and the method of delivery. In the Examples below, mice were administered 1 mg/mouse of nanoparticles.

In some embodiments, the composition is administered to a subject in need thereof once every 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or 31 days. In some embodiments the composition is administered to a subject one, twice, or three times weekly. In some embodiments, the composition is administered to a subject one, twice, or three times monthly.

In particular embodiments, the dose is about 1 mg/kg to about 1,500 mg/kg administered weekly administered in one or more administrations. For example, in specific embodiments, a subject is administered about 10 mg/kg, 20, mg/kg, 30 mg/kg, 40 mg/kg, 50 mg/kg, 60 mg/kg, 70 mg/kg, 80 mg/kg, 90 mg/kg or 100 mg/kg once, twice, or three times weekly. In some embodiments, a single dose is sufficient to improve one or more symptoms of a disease. In some embodiments, the improvement after the second dose is greater than the first dose.

C. Diseases to be Treated

1. Cancer a. Cancers to be Treated

The disclosed compositions and methods can be used to identify, assist in the diagnosis of, and treat cancer in a subject in need thereof. In a mature animal, a balance usually is maintained between cell renewal and cell death in most organs and tissues. The various types of mature cells in the body have a given life span; as these cells die, new cells are generated by the proliferation and differentiation of various types of stem cells. Under normal circumstances, the production of new cells is so regulated that the numbers of any particular type of cell remain constant. Occasionally, though, cells arise that are no longer responsive to normal growth-control mechanisms. These cells give rise to clones of cells that can expand to a considerable size, producing a tumor or neoplasm. A tumor that is not capable of indefinite growth and does not invade the healthy surrounding tissue extensively is benign. A tumor that continues to grow and becomes progressively invasive is malignant. The term cancer refers specifically to a malignant tumor. In addition to uncontrolled growth, malignant tumors exhibit metastasis. In this process, small clusters of cancerous cells dislodge from a tumor, invade the blood or lymphatic vessels, and are carried to other tissues, where they continue to proliferate. In this way a primary tumor at one site can give rise to a secondary tumor at another site.

The compositions and methods described herein are useful for treating subjects having benign or malignant tumors by delaying or inhibiting the growth of a tumor in a subject, reducing the growth or size of the tumor, inhibiting or reducing metastasis of the tumor, and/or inhibiting or reducing symptoms associated with tumor development or growth. The Examples below indicate that the compositions and methods disclosed herein are useful for treating cancer in vivo.

Malignant tumors that may be treated are classified herein according to the embryonic origin of the tissue from which the tumor is derived. Carcinomas are tumors arising from endodermal or ectodermal tissues such as skin or the epithelial lining of internal organs and glands. The disclosed compositions are particularly effective in treating carcinomas. Sarcomas, which arise less frequently, are derived from mesodermal connective tissues such as bone, fat, and cartilage. The leukemias and lymphomas are malignant tumors of hematopoietic cells of the bone marrow. Leukemias proliferate as single cells, whereas lymphomas tend to grow as tumor masses. Malignant tumors may show up at numerous organs or tissues of the body to establish a cancer.

The types of cancer that can be treated with the provided compositions and methods include, but are not limited to, cancers, such as vascular cancer such as multiple myeloma; adenocarcinomas and sarcomas of bone, bladder, brain, breast, cervical, colo-rectal, esophageal, kidney, liver, lung, nasopharangeal, pancreatic, prostate, skin, stomach, and uterine. In some embodiments, the disclosed compositions are used to treat multiple cancer types concurrently. The compositions can also be used to treat metastases or tumors at multiple locations.

The disclosed compositions can be used to treat cells undergoing unregulated growth, invasion, or metastasis.

Tumor cell hypoxia is now recognized as a problem in cancer therapy because it makes cancer cells resistant to treatment with radiation and some chemotherapeutics. Hypoxia is also known to cause impaired DNA repair in cancer cells. Accordingly, in some embodiments, the disclosed compositions are used as targeted agents for hypoxic tumor cells.

As discussed above, in some embodiments, 4H2 antibody or a fragment or fusion protein derived therefrom, in addition to serving as a targeting moiety or delivery moiety, is also an active agent.

In some embodiments, the compositions are lethal to cells with impaired DNA repair. The cells can be defective in the expression of a gene or in the function of a protein involved in DNA repair, DNA synthesis, or homologous recombination. Exemplary genes and associated products include XRCC1, ADPRT (PARP-1), ADPRTL2, (PARP-2), POLYMERASE BETA, CTPS, MLH1, MSH2, FANCD2, PMS2, p53, p21, PTEN, RPA, RPA1, RPA2, RPA3, XPD, ERCC1, XPF, MMS19, RAD51, RAD51B, RAD51C, RAD51D, DMC1, XRCCR, XRCC3, BRCA1, BRCA2, PALB2, RAD52, RAD54, RAD50, MREll, NB51, WRN, BLAM KU70, KU80, ATM, ATR CHK1, CHK2, FANC family of genes, FANCA, FANCB, FANCC, FANCD1, FANCD2, FANCE, FANCF, FANCG, FANCL, FANCM, RAD1, and RAD9.

In some embodiments, the defective gene is a tumor suppressor gene. In some embodiments, the gene is associated with maintenance of chromosomal integrity and/or protection from genotoxic stress. In some embodiments, the cells are deficient in single and/or double strand break repair.

In some embodiments, the cells have one or more mutations in BRCA1, BRCA2, and/or PTEN. Gene mutations, such as BRCA1, BRCA2, PTEN mutations, can be identified using standard PCR, hybridization, or sequencing techniques.

In particular embodiments, the cancer cell is defective in DNA damage repair due to hypoxia.

Therefore, in some embodiments, the compositions can be used to treat cancers arising from DNA repair deficient familial syndromes, such as breast, ovarian, and pancreatic cancers. The compositions can be used to treat cancers that are linked to mutations in BRCA1, BRCA2, PALB2, or RAD51B, RAD51C, RAD51D, or related genes. The compositions can also be used to treat colon cancers, endometrial tumors, or brain tumors linked to mutations in genes associated with DNA mismatch repair, such as MSH2, MLH1, PMS2, and related genes. The compositions can also be used to treat cancers with silenced DNA repair genes, such as BRCA1, MLH1, OR RAD51B, RAD51C, or RAD51D. The compositions can also be used to treat cancers associated with chromosomal maintenance or genotoxic stress, for example, cancers in which PTEN is mutated or silences. PTEN is frequently inactivated in many cancers including breast, prostate, glioma, melanoma, and lung cancers. In these some embodiments, the ability of the compositions to inhibit DNA repair combined with the inherent repair deficiencies or other susceptibilities of these cancers can be sufficient to induce cell death.

A representative but non-limiting list of cancers that can be treating using the disclosed compositions include cancers of the blood and lymphatic system (including leukemias, Hodgkin's lymphomas, non-Hodgkin's lymphomas, solitary plasmacytoma, multiple myeloma), cancers of the genitourinary system (including prostate cancer, bladder cancer, renal cancer, urethral cancer, penile cancer, testicular cancer,), cancers of the nervous system (including mengiomas, gliomas, glioblastomas, ependymomas) cancers of the head and neck (including squamous cell carcinomas of the oral cavity, nasal cavity, nasopharyngeal cavity, oropharyngeal cavity, larynx, and paranasal sinuses), lung cancers (including small cell and non-small cell lung cancer), gynecologic cancers (including cervical cancer, endometrial cancer, vaginal cancer, vulvar cancer ovarian and fallopian tube cancer), gastrointestinal cancers (including gastric, small bowel, colorectal, liver, hepatobiliary, and pancreatic cancers), skin cancers (including melanoma, squamous cell carcinomas, and basal cell carcinomas), breast cancer (including ductal and lobular cancer and triple negative breast cancers), and pediatric cancers (including neuroblastoma, Ewing's sarcoma, Wilms tumor, medulloblastoma).

In some embodiments, the cancer is a neoplasm or tumor that demonstrates some resistance to radiotherapy or chemotherapy. In particular embodiments, the cancer cell is resistant to radiation or chemotherapy due to hypoxia. In some embodiments, the antibodies for fragments, variants, or fusion proteins thereof can be effective without radiotherapy or chemotherapy.

Cancers that are resistant to radiotherapy using standard methods include, but are not limited to, sarcomas, renal cell cancer, melanoma, lymphomas, leukemias, carcinomas, blastomas, and germ cell tumors.

Cancerous cells can develop as a result of somatic, gain-of-function mutations in Ras genes, resulting in activating mutations in small GTPase Ras enzymes. Oncogenic mutations of the H-Ras, N-Ras, or K-Ras genes are most frequently associated with malignancies in humans. In certain embodiments, the cells express a mutant form of the small GTPase Ras family, such as K-Ras. In certain embodiments the cells do not express the wild type Ras genes.

Oncogenic mutations have also been identified in other upstream or downstream components of the Ras intracellular signaling pathways, including cytosolic kinases and membrane RTKs (Ras/MAPK pathways).

Oncogenic mutations in the K-Ras gene can result in constitutive activation of the out-coming Ras proteins. Exemplary mutations include mutations in codons 12, 13, and/or 61 that result in any changes in the amino acids occurring at positions 12, 13, or 61 of the K-ras protein. This includes for example but is not limited to K-ras amino acid 12 (changing glycine to aspartic acid, cysteine, serine, threonine, arginine, or valine,) and amino acid 13 and 61 (changing glutamine to lysine, arginine, leucine, or aspartic acid). Another way of describing these K-Ras mutations that are exemplary in this context is G12A, G12C, G12D, G12S, G12I, G12R, G12V, G13C, G13D, G13S, Q61L, Q61R. Again, any change in amino acid content at positions 12, 13, 61 are considered exemplary mutations.

Thus the compositions can be used for treating a cancer characterized by deregulation of Ras-dependent signaling. In some embodiments the cancer is characterized by the mutation of one or more Ras genes or mutation of genes encoding other components of Ras/MAPK signaling pathways. The antibodies can be used to treat cells undergoing unregulated growth, invasion, or metastasis including, but not limited to, pancreatic ductal adenocarcinoma, colorectal carcinoma, non-small cell lung carcinoma (NSCLCS), malignant melanoma, urinary bladder carcinoma, thyroid carcinomas, hematopoietic malignancies, breast cancer, hepatocellular carcinomas, prostate cancer, biliary tract adenocarcinomas, angiosarcomas, malignant fibrous histiocytoma, neuroblastomas, cervix adenocarcinomas, or stomach cancers and neck and head cancer, bowel cancer.

In some embodiments, the compositions are used for treating a cancer characterized by the proliferation of cells having gain-of-function mutations in the K-Ras gene. The antibodies can be used to treat cells undergoing unregulated growth, invasion, or metastasis including, but not limited to, breast cancer, ovarian cancer and prostate cancer.

b. Exemplary Active Agents and Cargoes for Cancer Treatment

In addition or alternative to 4H2 antibody or a fragment or fusion protein derived therefrom, the nanocarriers can be loaded with, or targeting moiety can be conjugated to, proteins, peptides, carbohydrates, polysaccharides, nucleic acid molecules, organic molecules, diagnostic active agents, or combinations thereof for treating or diagnosing cancer.

In some embodiments, the active agent is a therapeutic drug. The majority of chemotherapeutic drugs can be divided into alkylating agents, antimetabolites, anthracyclines, plant alkaloids, topoisomerase inhibitors, monoclonal antibodies, and other antitumour agents.

Non-limiting examples of antineoplastic drugs that damage DNA or inhibit DNA repair include carboplatin, carmustine, chlorambucil, cisplatin, cyclophosphamide, dacarbazine, daunorubicin, doxorubicin, epirubicin, idarubicin, ifosfamide, lomustine, mechlorethamine, mitoxantrone, oxaliplatin, procarbazine, temozolomide, and valrubicin. In some embodiments, the antineoplastic drug is temozolomide, which is a DNA damaging alkylating agent commonly used against glioblastomas. In some embodiments, the antineoplastic drug is a PARP inhibitor, which inhibits a step in base excision repair of DNA damage. For example, the PARP inhibitor can be Olaparib ($C_{24}H_{23}FN_4O_3$).

In some embodiments, the antineoplastic drug is a histone deacetylase inhibitor, which suppresses DNA repair at the transcriptional level and disrupt chromatin structure. In some embodiments, the antineoplastic drug is a proteasome inhibitor, which suppresses DNA repair by disruption of ubiquitin metabolism in the cell. Ubiquitin is a signaling molecule that regulates DNA repair. In some embodiments, the antineoplastic drug is a kinase inhibitor, which suppresses DNA repair by altering DNA damage response signaling pathways.

Additional antineoplastic drugs include, but are not limited to, alkylating agents (such as temozolomide, cisplatin, carboplatin, oxaliplatin, mechlorethamine, cyclophosphamide, chlorambucil, dacarbazine, lomustine, carmustine, procarbazine, chlorambucil and ifosfamide), antimetabolites (such as fluorouracil, gemcitabine, methotrexate, cytosine arabinoside, fludarabine, and floxuridine), some antimitotics, and *vinca* alkaloids such as vincristine, vinblastine, vinorelbine, and vindesine), anthracyclines (including doxorubicin, daunorubicin, valrubicin, idarubicin, and epirubicin, as well as actinomycins such as actinomycin D), cytotoxic antibiotics (including mitomycin, plicamycin, and bleomycin), and topoisomerase inhibitors (including camptothecins such as irinotecan and topotecan and derivatives of epipodophyllotoxins such as amsacrine, etoposide, etoposide phosphate, and teniposide) and cytoskeletal targeting drugs such as paclitaxel.

In some embodiments the active agent is a radiosensitizer. Examples of known radiosensitizers include cisplatin, gemcitabine, 5-fluorouracil, pentoxifylline, vinorelbine, PARP inhibitors, histone deacetylase inhibitors, and proteasome inhibitors.

In some embodiments, the active agent(s) is paclitaxel, camptothecin and or a derivatives In some embodiments, the dose of active agent can be reduced by 10%, 15%, 20%, 25%, 30%, 35%, 40%, 45%, 50%, 60%, 70, 80% or more when administered in the disclosed conjugates or nanocarriers relative to free drug.

c. Combination Therapy

The disclosed compositions can be used in combination with standard chemotherapy, radiation therapy, and other anti-cancer treatments. Radiation therapy (a.k.a. radiotherapy) is the medical use of ionizing radiation as part of cancer treatment to control malignant cells. Radiotherapy also has several applications in non-malignant conditions, such as the treatment of trigeminal neuralgia, severe thyroid eye disease, pterygium, pigmented villonodular synovitis, prevention of keloid scar growth, and prevention of heterotopic ossification. In some embodiments, the disclosed antigen binding molecules are used to increase radiosensitivity for a non-malignant condition.

Radiation therapy works by damaging the DNA of dividing cells, e.g., cancer cells. This DNA damage is caused by one of two types of energy, photon or charged particle. This damage is either direct or indirect. Indirect ionization happens as a result of the ionization of water, forming free radicals, notably hydroxyl radicals, which then damage the DNA. For example, most of the radiation effect caused by photon therapy is through free radicals. One of the major limitations of photon radiotherapy is that the cells of solid tumors become deficient in oxygen, and tumor cells in a hypoxic environment may be as much as 2 to 3 times more resistant to radiation damage than those in a normal oxygen environment.

Direct damage to cancer cell DNA occurs through high-LET (linear energy transfer) charged particles such as proton, boron, carbon or neon ions. This damage is independent of tumor oxygen supply because these particles act mostly via direct energy transfer usually causing double-stranded DNA breaks. Due to their relatively large mass, protons and other charged particles have little lateral side scatter in the tissue; the beam does not broaden much, stays focused on the tumor shape and delivers small dose side-effects to surrounding tissue. The amount of radiation used in photon radiation therapy is measured in Gray (Gy), and varies depending on the type and stage of cancer being treated. For curative cases, the typical dose for a solid epithelial tumor ranges from 60 to 70 Gy, while lymphomas are treated with lower doses. Post-operative (adjuvant) doses are typically around 45-60 Gy in 1.8-2 Gy fractions (for breast, head, and neck cancers). Many other factors are considered by radiation oncologists when selecting a dose, including whether the patient is receiving chemotherapy, patient co-morbidities, whether radiation therapy is being administered before or after surgery, and the degree of success of surgery.

The response of a cancer to radiation is described by its radiosensitivity. Highly radiosensitive cancer cells are rapidly killed by modest doses of radiation. These include leukemias, most lymphomas and germ cell tumors. The majority of epithelial cancers are only moderately radiosensitive, and require a significantly higher dose of radiation (60-70 Gy) to achieve a radical cure. Some types of cancer are notably radioresistant, that is, much higher doses are required to produce a radical cure than may be safe in clinical practice. Renal cell cancer and melanoma are generally considered to be radioresistant.

The response of a tumor to radiotherapy is also related to its size. For complex reasons, very large tumors respond less well to radiation than smaller tumors or microscopic disease. Various strategies are used to overcome this effect. The most common technique is surgical resection prior to radiotherapy. This is most commonly seen in the treatment of breast cancer with wide local excision or mastectomy followed by adjuvant radiotherapy. Another method is to shrink the tumor with neoadjuvant chemotherapy prior to radical radiotherapy. A third technique is to enhance the radiosensitivity of the cancer by giving certain drugs during a course of radiotherapy. In some embodiments, the disclosed compositions can accomplish techniques two, three, or a combination thereof.

2. Ischemia

The compositions and methods can be used to identify, assist in the diagnosis of, and treat ischemia. In some embodiments, the compositions are used to target therapeutic agents to sites of ischemia. Ischemia is a vascular condition involving an interruption in the arterial blood supply to a tissue, organ, or extremity that, if untreated, can lead to tissue death. Thus ischemia can induce necrosis that leads to the accumulation of extracellular DNA. It can be caused by embolism, thrombosis of an atherosclerosis artery, or trauma. Venous problems like venous outflow obstruction and low-flow states can cause acute arterial ischemia. An aneurysm is one of the most frequent causes of acute arterial ischemia. Other causes are heart conditions including myocardial infarction, mitral valve disease, chronic atrial fibrillation, cardiomyopathies, and prosthesis, in all of which thrombi are prone to develop. Common types of ischemia include, for example, large and small bowel ischemia which can include ischemic colitis, acute and chronic brain ischemia which can include transient ischemic attack or a stroke, limb ischemia including acute limb ischemia, and cutaneous inschemia.

In some embodiments for treating ischemia the disclosed nanocarriers are loaded with an active agent that increases blood flow, reduces coagulation (e.g., with anticoagulants such as heparin), induces arterial dilation, or induces or increases thrombolysis (e.g., with recombinant tissue plasminogen activator (rtPA), streptokinase, urokinase, etc.), or agents that protect and/or promote survival of cells in the region of ischemia (such as cytoprotective proteins including heat shock proteins). In some embodiments, the dose of active agent can be reduced by 10%, 15%, 20%, 25%, 30%, 35%, 40%, 45%, 50%, 60%, 70, 80% or more when administered in the disclosed nanocarriers or conjugates relative to free drug.

In some embodiments, the composition is one that enhances survival of brain cells such as neurons.

In some embodiments, the composition is one that enhances survival of kidney cells such as renal tubule cells and/or other components of the nephron.

In some embodiments, the nanocarrier is microbubbles. For example, microbubbles can be a therapeutic device for vehiculating oxygen to hypoxic tissues. They can show proper permeability and diffusivity properties and be non-toxic. See, for example, Bisazza, et al., Engineering in Medicine and Biology Society, 2008. EMBS 2008. 30th Annual International Conference of the IEEE (20-25 Aug. 2008), 10.1109/IEMBS.2008.4649599, which describes chitosan-coated oxygen microbubbles of average diameter 2.5 µm, which efficiently delivered oxygen both in 'in vitro' and 'in vivo' preparations, and can be conveniently metabolized, reversing the cellular hypoxic response. See also U.S. Pat. No. 9,107,950 and WO 2009/043031. Microbubbles, including oxygen-loaded microbubbles, can be targeted to tissue of interest, such as hypoxic tissue, using the disclosed targeting antibodies. Compositions and methods for modifying microbubbles to include a targeting moiety are known in the art, see, for example, Yeh, et al, "A Targeting Microbubble for Ultrasound Molecular Imaging," *PLoS ONE*, 10(7): e0129681. doi:10.1371/journal.pone.0129681 (2015).

3. Injury

The disclosed compositions can be used to identify, assist in the diagnosis of, and treat an injury. An injury can be generally defined as damage to the body, which can be caused by, for example, accidents, falls, hits, weapons, etc. Injuries include wounds, brain injuries, nerve injuries, and soft tissue injuries. Injury can be to any part of the body, for example, the head, neck, throat, back, eye, nose, throat, chest, foot, toe, hand, finger, knee, elbow, etc. The injury can be any organ or tissue of the body, for example, the kidney, liver, spinal cord, muscle, bone, etc. An example of an injury to an organ is cardiac ischemic injury or ischemic renal disease. The injury can be a traumatic injury.

In some embodiments, the compositions are used to deliver active agents for the treatment of acute, chronic, or infected wounds. Wound healing involves a complex interaction between epidermal and dermal cells, the extracellular matrix, controlled angiogenesis, and plasma derived proteins, all coordinated by an array of cytokines and growth factors. This dynamic process has been classically divided into several overlapping phases: inflammation, proliferation, migration and remodeling.

Representative chronic non-healing wounds that can be treated include, but are not limited to, diabetic ulcers, arterial ulcers, venous ulcers, pressure (decubitus) ulcers and burns. Acute wounds include those that accompany injury or surgery. Bacterial biofilms can impair cutaneous wound healing and reduce topical antibacterial efficiency in healing or treating infected skin wounds. Biofilm bacteria are less susceptible to the immune defense system, and consequently, a biofilm-associated infection can persist for a long period of time (i.e., progress from an acute to a chronic infection).

In some embodiments, the subject has an inflammatory disease. For example, the inflammatory disease can be the result of harmful stimuli, such as pathogens, damaged cells, or irritants. The inflammatory disease can also be the result of hypersensitivity or autoimmunity.

The immune system is often involved with inflammatory disorders, demonstrated in both allergic reactions and some myopathies, with many immune system disorders resulting in abnormal inflammation. Non-immune diseases with etiological origins in inflammatory processes include cancer, atherosclerosis, and ischaemic heart disease. Examples of disorders associated with inflammation include: acne vulgaris, asthma, atherosclerosis, autoimmune diseases, chronic prostatitis, glomerulonephritis, hypersensitivities, inflammatory bowel diseases, pelvic inflammatory disease, reperfusion injury, rheumatoid arthritis, sarcoidosis, transplant rejection, vasculitis, and interstitial cystitis.

The active agent used to treat the injury can be selected based on the injury but can include analgesics, anesthetics, anti-inflammatories, anti-infectives, cytokines, chemokines, immunomodulators, other agents that promote healing, and agents that protect and/or promote survival of cells in the region of injury (such as cytoprotective proteins including heat shock proteins). In some embodiments, the dose of active agent can be reduced by 10%, 15%, 20%, 25%, 30%, 35%, 40%, 45%, 50%, 60%, 70, 80% or more when administered in the disclosed nanocarriers or conjugates relative to free drug 4. Infection a. Infections to be Treated Extracellular DNA can also be found in areas of infection. Thus the disclosed compositions and methods can be used to identify, assist in the diagnosis of, and treat infections in a subject in need thereof. In a mature animal, the immune system usually prevents or eliminates infections, but in some cases invading organisms, such as bacteria, viruses, fungi, parasites, can establish themselves in an organism and cause an infection that may cause significant symptoms and be life-threatening. Sites of infection are associated with increased amounts of extracellular DNA due to release from cell lysis, neutrophil lysis, and neutrophil extracellular traps (NETs) (Okshevsky et al., *Curr Opin Biotech,* 2015, 33:73-80) (Whitchurch et al., Science, 2002, 295: 1487) (Allesen-Holm et al., *Mol Biol* 2006, 59: 1114-1128) and therefore can be targeted using the compositions and methods disclosed herein.

The compositions and methods described herein are useful for treating subjects having infections by delaying or inhibiting the progression of an infection in a subject, reducing and/or eradicating the infection, and/or inhibiting or reducing symptoms associated with the infection, and/or reducing the dosage of other anti-infective agents required to eradicate the infection.

The types of infections that can be treated with the provided compositions and methods include, but are not limited to, bacterial, viral, fungal, and parasitic infections.

b. Exemplary Active Agents for Infection Treatment

In addition or alternative to 4H2 antibody or a fragment or fusion protein derived therefrom, the nanocarriers can be loaded with, or targeting moiety can be conjugated to, proteins, peptides, antibodies, carbohydrates, polysaccharides, nucleic acid molecules, organic molecules, diagnostic active agents, or combinations thereof for treating or diagnosing infection.

In some embodiments, the active agent is a therapeutic drug. Non-limiting examples of anti-infective drugs include antibiotics, antivirals, antiparasitic drugs.

In some embodiments, the dose of active agent can be reduced by 10%, 15%, 20%, 25%, 30%, 35%, 40%, 45%, 50%, 60%, 70, 80% or more when administered in the disclosed nanocarriers or conjugates relative to free drug.

5. Autoimmune and/or Genetic diseases a. Diseases to be Treated

Some autoimmune and/or genetic diseases are characterized by the development of damaged tissues that release DNA. The disclosed compositions and methods can be used to target delivery of active agents to sites of tissue damage in autoimmune and/or genetic diseases.

The compositions and methods described herein are useful for identifying, assisting in the diagnosis of, and treating subjects having autoimmune and/or genetic diseases by delaying or inhibiting the progression of an tissue damage in a subject, reducing and/or eradicating the severity of the disease, and/or inhibiting or reducing symptoms associated with the disease, and/or reducing the dosage of other agents required to treat the disease.

The types of autoimmune or genetic diseases that can be treated with the provided compositions and methods include, but are not limited to: muscular dystrophies (including Duchenne muscular dystrophy and myotonic dystrophy), systemic lupus erythematosus, scleroderma, vasculitis syndromes, rheumatoid arthritis, lysosomal storage diseases (including Tay-Sachs disease and Gaucher disease), glycogen storage diseases (including Pompe disease and McArdle disease).

b. Exemplary Active Agents for Autoimmune and/or Genetic Disease Treatment

In addition or alternative to 4H2 antibody or a fragment or fusion protein derived therefrom, the nanocarriers can be loaded with, or targeting moiety can be conjugated to, proteins, peptides, antibodies, carbohydrates, polysaccharides, nucleic acid molecules, organic molecules, diagnostic active agents, or combinations thereof for treating or diagnosing autoimmune or genetic diseases.

In some embodiments, the active agent is a therapeutic drug. Non-limiting examples of agents to treat autoimmune and/or genetic diseases include immunosuppressive agents, protein replacements (such as dystrophin, utrophin, enzymes), analgesics, anesthetics, anti-inflammatories, anti-infectives, cytokines, chemokines, immunomodulators, and other agents that promote healing, or agents that protect and/or promote survival of cells in the region of damage (such as cytoprotective proteins including heat shock proteins).

In some embodiments, the dose of active agent can be reduced by 10%, 15%, 20%, 25%, 30%, 35%, 40%, 45%, 50%, 60%, 70, 80% or more when administered in the disclosed nanocarriers or conjugates relative to free drug.

6. Kidney Diseases and Disorder a. Diseases to be Treated

The examples below illustrate the disclosed targeting moieties accumulate in the kidney of mice. The disclosed compositions and methods can be used to target delivery of active agents to the kidneys.

Most kidney diseases attack the nephrons. Causes can include genetic problems, injuries, or medicines. Subjects with diabetes, high blood pressure, or a close family member with kidney disease are at a great risk of developing a kidney disease or disorder. Chronic kidney disease damages the nephrons slowly over several years. Other kidney problems include, but are not limited to, cancer cysts, stones, and infections. Exemplary kidney diseases include, but are not limited to, ischemic renal disease, traumatic injury, Alport Syndrome, diabetic nephropathy, Fabry Disease, Focal Segmental Glomerulosclerosis, glomerulonephritis, IgA Nephropathy (Berger's Disease), kidney stones, Minimal Change Disease, Nephrotic Syndrome, and Polycystic Kidney Disease (PKD).

In addition or alternative to 4H2 antibody or a fragment or fusion protein derived therefrom, the nanocarriers can be loaded with, or targeting moiety can be conjugated to, proteins, peptides, antibodies, carbohydrates, polysaccharides, nucleic acid molecules, organic molecules, diagnostic active agents, or combinations thereof for treating or diagnosing a kidney disease or disorder.

In some embodiments, the active agent is a therapeutic drug. Non-limiting examples of agents to treat kidney infections can include anti-infectives and anti-microbials such as those above, and non-limiting examples of agents to treat kidney cancer can include chemotherapeutic drugs and other anti-cancer interventions such as those discussed above.

In some embodiments, the dose of active agent can be reduced by 10%, 15%, 20%, 25%, 30%, 35%, 40%, 45%, 50%, 60%, 70, 80% or more when administered in the disclosed nanocarriers or conjugates relative to free drug.

EXAMPLES

Example 1: 4H2 Penetrates Live Cells and Localizes to the Cytoplasm

A large repertoire of unusual autoantibodies produced by a malfunctioning immune system contributes to chronic inflammation and organ system damage in systemic lupus erythematosus (SLE). Anti-DNA antibodies are an important part of this lupus autoantibody profile, but their biologic functions are unclear. Tissue deposition of complexes of antibody and DNA has been well characterized in SLE, but recent findings indicate some anti-DNA antibodies may have even more direct roles in disease. Some anti-DNA autoantibodies penetrate into living cells, and nuclear-penetrating variants that cause accumulation of DNA damage have been found. Such DNA-damaging autoantibodies may promote inflammation and disease flares, but may also have unexpected beneficial effects and therapeutic applications. The DNA-damaging autoantibodies are particularly toxic to certain cancer cells, and this may help explain why patients with SLE have lower than expected incidence rates of tumors associated with defects in DNA repair, such as triple negative breast cancer (Hansen J E, et al., *Sci Transl Med*, 4(157):157ra42 (2012), Noble, et al. *Sci Rep*, 4:5958 (2014), Noble, et al., *Nat Rev Rheumatol*, 12(7):429-34 (2016)). Additional studies are needed to better understand these emerging principles and the potential to apply lupus antibodies in molecular therapy.

A prime example of a lupus anti-DNA antibody with therapeutic potential is 3E10. 3E10 penetrates into live cell nuclei and inhibits DNA repair, and is well suited for use against cancer because it preferentially homes to tumor sites in vivo as a result of its attraction to the extracellular DNA released by dying tumor cells (Noble, et al., *Nat Rev Rheumatol*, 12(7):429-34 (2016), Weisbart, et al., *Sci Rep*, 5:12022 (2015), Chen, et al., *Oncotarget*, 7(37): 59965-59975 (2016)). A re-engineered form of 3E10, with potentially dangerous elements removed to reduce risks of causing lupus-like symptoms, is actively being developed for use in cancer therapy (Noble, et al., *Cancer Res.*, 75(11): 2285-91 (2015)). 3E10 has also proven useful as a vehicle for intranuclear delivery of therapeutic cargoes because it follows an unusual pathway into cells that relies on a nucleoside transporter and avoids endosomes (Hansen, et al., *J Biol Chem.*, 282: 20790-20793 (2007)). Given the diversity of autoantibodies produced in SLE, it is believed that additional lupus autoantibodies with therapeutic potential that is similar or even complementary to 3E10 await discovery.

The binding specificities of the lupus autoantibodies are varied and include reactivity against individual nucleosides, and anti-guanosine antibodies appear to be particularly important in SLE. Guanosine is the most immunogenic nucleoside, and lupus antibody-DNA complexes are enriched in GC content (Stollar, et al., *J Immunol*, 117:1308-1313 (1976), Sano, et al., *J immunol*, 128:1341-1345 (1982)). Anti-guanosine and anti-GTP antibodies have been identified in SLE serum, and their titers correlate with lupus disease activity better than other anti-DNA antibodies (Ma, et al., *Arthritis Rheum*, 50:1533-1538 (2004), Colburn, et al., *Lupus*, 10:410-7 (2001)). Remarkably, many years before 3E10 was found to inhibit DNA repair, Colburn and Green reported that anti-guanosine antibodies in lupus patient sera cause a reduction in cAMP in cultured cells, and that the monoclonal anti-guanosine antibody 4H2 isolated from the MRL/lpr lupus-prone mouse model had similar effects and appeared to localize to the cytoplasm of cells (Colburn, et al., *Clin Chim Acta*, 370: 9-16 (2006)).

Materials and Methods

Hybridomas and Cell Lines

Hybridomas that produce the 4H2 anti-guanosine antibody and the 3E10 and 5C6 anti-DNA antibodies were obtained under MTA with the University of California, Los Angeles. Hybridomas were maintained and antibodies were harvested from supernatants as previously described (Noble, et al. *Sci Rep*, 4:5958 (2014)). Cal12T, SW48, and DLD1 cells were obtained from Horizon Discovery Ltd (Cambridge, UK). H358, and H441 cells were obtained from the ATCC. PEO1 cells were a gift from Peter Glazer. Cells were grown in culture in incubators at 37° C./5% $CO_2$.

Cell-Penetration and Co-Localization Immunofluorescence Assays

Cal12T cells were grown on glass coverslips and treated with control media or media containing 0.5 mg/mL 4H2 for one hour. Cells were then washed and fixed, and intracellular location of 4H2 was detected by immunostaining with an Alexa488-conjugated goat anti-mouse IgG antibody (Cell Signaling, Danvers, MA) as previously described (Noble, et al. *Sci Rep*, 4:5958 (2014)). For co-localization studies, the fixed cells were also probed overnight with separate rabbit primary antibodies to detect endosomes (C45B10 anti-EEA1 antibody, Cell Signaling), lysosomes (D2D11 anti-LAMP1 antibody, Cell Signaling), endoplasmic reticulum (C81H6 anti-PDI antibody, Cell Signaling), golgi apparatus (D2B6N anti-RCAS1 antibody, Cell Signaling), mitochondria (3E11 anti-COX IV and D3932 anti-AIF antibodies, Cell Signaling), or K-Ras (anti-K-Ras antibody) extensively washed with PBS, and then incubated with an Alexa555-conjugated goat anti-rabbit IgG antibody (Cell Signaling). Cells were also treated with DAPI, and imaged using an EVOS fl digital fluorescence microscope (Advanced Microscopy Group, Bothell, WA) under light, DAPI, GFP, or RFP filters. Fluorescence images were merged using ImageJ (NIH, Bethesda, MD).

Results

3E10 and 4H2 antibodies were harvested from hybridoma supernatants as previously described (Noble, et al. *Sci Rep*, 4:5958 (2014)). Successful production of 4H2 was confirmed by SDS-PAGE, with 3E10 analyzed alongside for comparison. Both intact antibodies migrated at 150 kDa as expected, and the 4H2 heavy and light chains were detected as single bands at 50 and 25 kDa, respectively. The 3E10 heavy chain and two distinct light chains were also seen, which is expected because the 3E10 hybridoma is known to produce two light chains (Zack, et al., *Mol Immunol*, 32:1345-53 (1995)).

The ability of 4H2 to penetrate into live cells was tested. PEO1 human ovarian cancer cells were treated with control media or media containing 4H2 or 3E10 (as a positive control) for one hour, and then cells were washed, fixed, and immunostained with an alkaline phosphatase-conjugated anti-mouse antibody.

Cells treated with 3E10 showed dark nuclear staining consistent with nuclear penetration by the antibody. By contrast, cells treated with 4H2 showed exclusively cytoplasmic staining. To confirm that 4H2 penetrates live cells and exclude the observation as a fixation artifact, FITC-labeled 4H2 was applied to live Cal12T and A549 human lung cancer cells at 4 mg/mL for one hour. Cells were also treated with Hoechst and MitoTracker stains to allow detection of nuclei and mitochondria, respectively. Cells were then washed and visualized under a fluorescence microscope. FITC fluorescence correlating to 4H2 was detected in the cytoplasm of both the live Cal12T and A549 cells. Overlay of the Hoechst, FITC, and MitoTracker signals confirmed absence of 4H2 signal in the nuclei. The FITC and MitoTracker signals overlapped, but a distinct co-localization with mitochondria could not be confirmed.

These findings demonstrate the viability of use of 4H2 as a cytoplasmic delivery vehicle.

Example 2: 4H2 does not Definitively Localize to any Organelle

After confirming that 4H2 penetrates live cells, subcellular localization was investigated through immunofluorescence co-localization studies. Cal12T cells were treated with 4H2 (0.5 mg/mL) for one hour and were then washed, fixed, and immunostained with an Alexa488-conjugated anti-mouse IgG antibody. The Alexa488 signal was detected in the cytoplasm of the treated cells. Cells treated with 4H2 were also co-immunostained with rabbit primary antibodies against markers of early endosomes (EEA1), lysosomes (LAMP1), Golgi (RASC1), ER (PDI), and mitochondria (COX IV), followed by detection with an Alexa555-conjugated anti-rabbit IgG antibody. Use of the Alexa488 and Alexa555-conjugated antibodies to detect 4H2 and organelle markers allowed separate visualization of 4H2 and organelle locations under GFP and RFP filters, respectively. Merging of the GFP and RFP images should yield a yellow signal in areas of co-localization. DAPI co-stain allowed visualization of nuclei in blue. Representative merged images showing DAPI, GFP, and RFP filters for each co-stain were analyzed. 4H2 did not appear to directly localize to any of the organelles tested.

4H2 binds to guanosine at a site that involves positions 1 and 7 and the oxygen associated with position 6, a region on guanosine that is also associated with binding of Ras proteins to GTP and GDP (Colburn, et al., *J Rheumatol*, 30:993-7 (2003)). Because 4H2 does not localize to a specific organelle it colocalization with G-proteins such as K-Ras was investigated. To explore this, Cal12T cells treated with 4H2 were co-stained for 4H2 and K-Ras using the technique described above. Merge of the fluorescence signals for 4H2 and K-ras yielded a bright yellow signal, indicating at least some degree of co-localization.

Thus, 4H2 was detected to penetrate into the cytoplasm of the cells, but did not colocalize with endosomes or lysosomes. This finding demonstrates the viability of use if 4H2 as a cytoplasmic delivery vehicle because it avoids localization to endosomes and lysosomes that would destroy cargo molecules.

Example 3: 4H2 does not Degrade DNA, but does Inhibit Akt Phosphorylation in Cells Materials and Methods Nucleolytic Assay Single-stranded M13mp18 DNA (50 ng; New England Biolabs, Ipswich, MA) was incubated at 37° C. for 10 minutes in control binding buffer (50 mM Tris-HCl, 100 mM NaCl, 10 mM MgCl2) or binding buffer containing 0.5 mg/mL 4H2, 3E10, or 5C6. Samples were then boiled and DNA integrity was analyzed by agarose gel electrophoresis as previously described (Noble, et al. Sci Rep, 4:5958 (2014)).

GTPase Assay

Pi release from GTP after incubation with 4H2 (0-1 mg/mL) for 30 min was measured by colorimetric assay using the Innova GTPase activity kit.

Western Blotting

Cell lysates were prepared and run on 4-15% SDS-PAGE gradient gels, followed by transfer to membranes. Membranes were then blocked and incubated with the indicated primary antibodies, followed by HRP-conjugated secondary antibody and detection of bands by chemiluminescence. Band intensity measurements were taken using ImageJ.

Results

An intriguing feature of some anti-DNA antibodies is an association with catalytic activities. For example, studies show that the nuclear-penetrating lupus anti-DNA antibody 5C6, which was also isolated from the same lupus-prone mouse model that yielded 3E10 and 4H2, has nucleolytic activity and degrades DNA (Noble, et al. Sci Rep, 4:5958 (2014)). To determine if 4H2 has any effect on DNA integrity it was incubated with single-stranded M13mp18 plasmid DNA for 10 minutes and then evaluated the integrity of the DNA on an agarose gel. 3E10 and 5C6 were also included as negative and positive controls, respectively. 5C6 caused complete degradation of the DNA. By contrast, neither 3E10 nor 4H2 had any discernible effects on the DNA integrity.

Figure 4A:
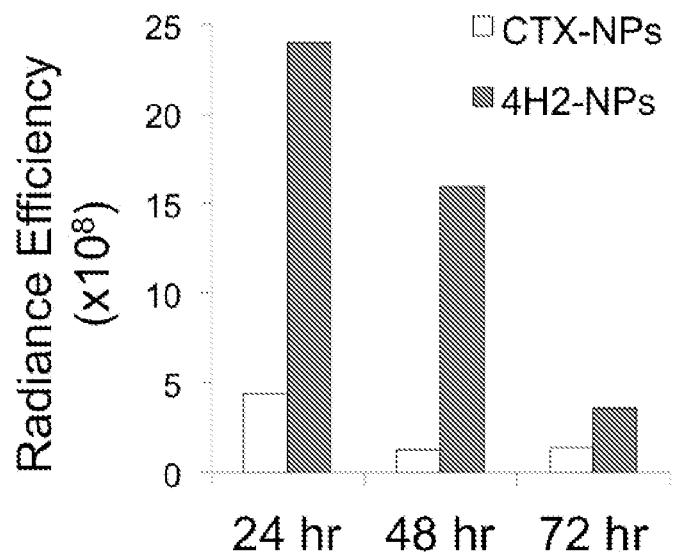
FIG. 4A is a bar graph showing radiance efficiency of brains from C57/BL6 mice subjected to stroke by right MCAO for one hour, followed by reperfusion and tail vein injection of 2 mg of IR780-loaded CTX-NPs (N=3) or 4H2-NPs (N=3). Mouse brains were harvested at 24, 48, and 72 hours and analyzed by IVIS to detect IR780 signal.
Figure 4B:
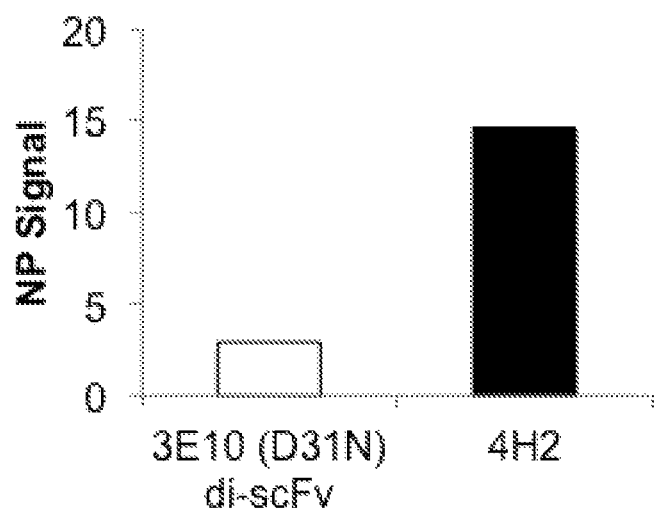
FIG. 4B is a bar graph that quantifies and compares the NP signal in the stroke region in mice treated with 4H2-NPs or 3E10 (D31N) di-scFv-NPs. 4H2 proved capable of delivering NPs to the stroke volume more effectively than 3E10 (D31N) di-scFv.

Colburn and Green previously commented in a review from 2006 that their preliminary findings indicated that 4H2 catalyzed cleavage of the gamma-phosphate bond in radiolabeled GTP (Colburn, et al., Clin Chim Acta, 370: 9-16 (2006)), however the data was not published. The effect of 4H2 on Pi release from GTP was tested using a colorimetric assay. 4H2 (0-1 mg/mL) was incubated with GTP for 30 minutes, and Pi release was measured using the Innova GTPase activity kit. Concentration of Pi released was determined from absorbance at 630 nm and comparison to a free Pi standard curve. 4H2 in buffer alone was used as a blank. As shown in FIG. 1A, 4H2 causes a dose-dependent release of Pi from GTP, consistent with the preliminary findings by Colburn and Green and indicative of GTPase activity.

Figure 1B:
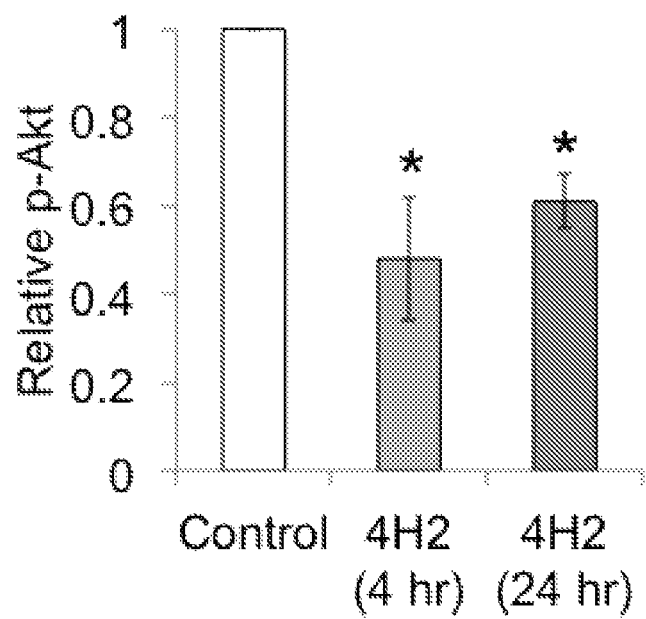
FIG. 1B is a bar graph showing the relative amounts of phospho-Akt in Cal12T cells treated with 1 mg/mL 4H2 at 4 and 24 hours relative to control (*p<0.05. N=4).
Figure 1C:
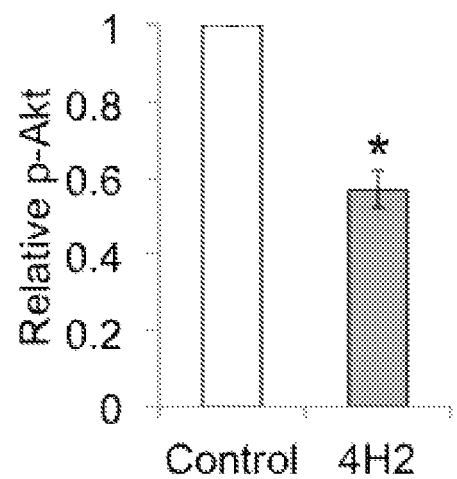
FIG. 1C is a bar graph showing the relative amounts of phospho-Akt in SW48 human colon cancer cells treated with 1 mg/mL 4H2 at 4 hours relative to control (*p<0.05. N=2).

To probe the effect of 4H2 on signaling its effect on the phosphorylation of Akt was tested in cells. Cal12T cells were treated with control media or media containing 4H2 (1 mg/mL) for four or 24 hours, after which cell lysates were prepared and analyzed by Western blot to detect amounts of total and phosphorylated Akt, and β-actin for loading control. At both time points 4H2 reduced the amount of phos-pho-Akt (FIG. 1B). The experiment was repeated using SW48 cells, and 4H2 was again found to reduce amounts of p-Akt (FIG. 1C).

Example 4: 4H2 is Toxic to K-Ras Addicted Cancer Cells and Tumors

Materials and Methods

Tumor Growth Suppression Assay

Subcutaneous xenografts were generated in nude mice by injection of $1\times10^6$ H358 cancer cells. Treatment with direct intratumoral injection of 50 uL of control PBS (N=3) or 4H2 in PBS (0.5 mg/mL) (N=3) twice a week for three weeks was initiated once tumors reached ~100 $mm^3$. Tumor volumes were tracked by caliper measurements.

Results

Figure 2A:
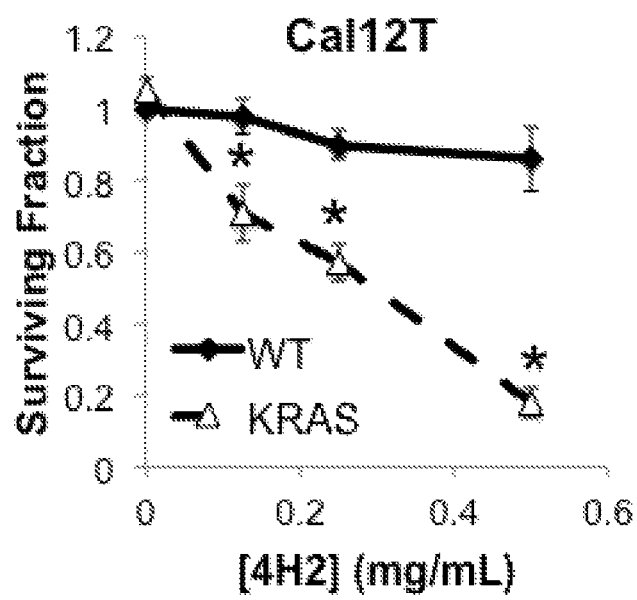
FIG. 2A is a line graph showing the effects of 4H2 on a matched pair of isogenic parental (WT) and G12C K-Ras-mutant (KRAS) Cal12T lung cancer cells. Clonogenic survival was measured by colony formation assay (*p<0.02. N=6).

Aberrations in cell signaling caused by activating mutations in small GTPases such as the Ras family of proteins are found in ~30% of malignancies, and K-Ras is one of the most frequently mutated small GTPases (Adjei, J Natl Cancer Inst, 93:1062-1074 (2001), Gysin, et al., Genes Cancer, 2:359-372 (2011)). Development of therapies that are preferentially toxic to K-Ras mutant cancer cells is a major goal in oncology. Based on the previous findings that 4H2 binds guanosine and reduces cAMP in cells and the above findings of co-localization with K-Ras and interference with cell signaling by 4H2, the effect of 4H2 on K-Ras addicted cancer cells was investigated. The effect of 4H2 was tested on an isogenic pair of Cal12T lung cancer cells with and without an activating K-ras mutation (G12C). As shown in FIG. 2A, the K-Ras mutant Cal12T cells were highly sensitive to 4H2, while the parental Cal12T cells were more resistant to its effects.

Figure 2B:
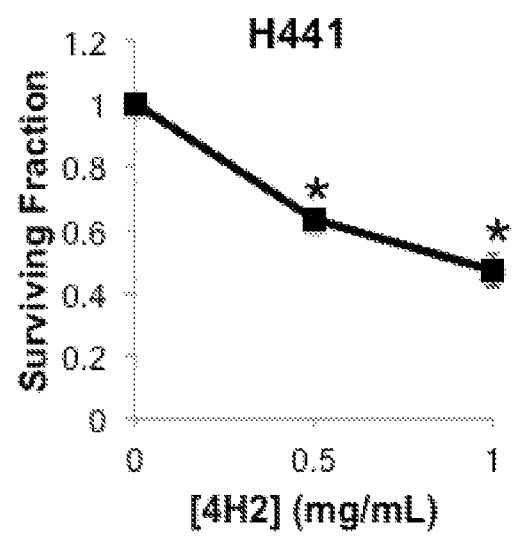
FIGS. 2B and 2C are line graphs showing H441 (2B) and H358 K-Ras (2C) addicted human lung cancer cells (G12V and G12C mutations, respectively) treated with control media or media containing 4H2. Surviving fractions were determined by colony formation assay (*p<0.01. N>3).
Figure 2C:
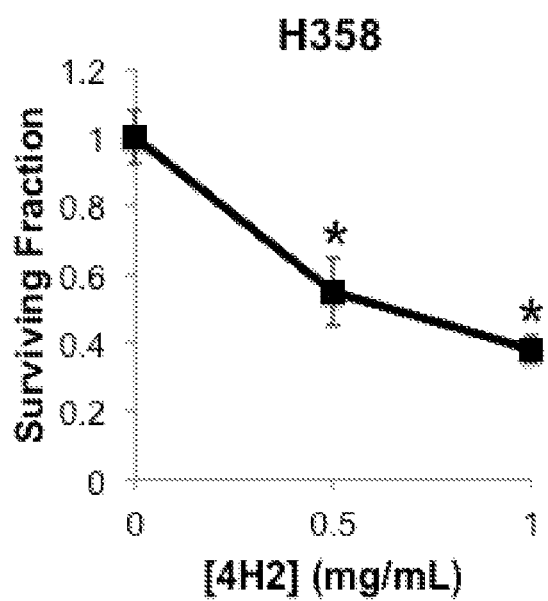
Figure 2D:
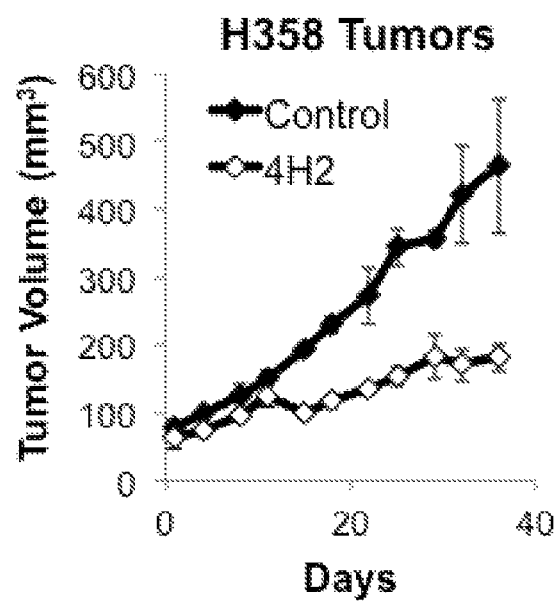
FIG. 2D is a line graph showing the effect of 4H2 on tumor volume ($mm^3$) of H358 tumor xenografts generated in the flanks of nude mice by subcutaneous injection of tumor cells. Once tumors reached ~100 mm3 volume mice were treated with direct tumor injection of 50 uL of control PBS or PBS containing 0.5 mg/mL 4H2 twice a week for three weeks. Tumor volumes were monitored, and growth curves are shown. A statistically significant difference in tumor volumes was established by day 15 after initiation of treatment (p<0.01). N=3 mice per group.

The effect of 4H2 was also tested on two additional K-Ras addicted cancer cells lines, H441 and H358 human lung cancer cells (Singh, et al., Cancer Cell, 15:489-500 (2009)), and both cell lines were sensitive to 4H2 (FIGS. 2B and 2C). Lastly, to confirm that 4H2 is toxic to K-Ras addicted cancer cells in vivo, H358 subcutaneous xenografts were generated in nude mice and treated by direct injection with control buffer or 25 ug of 4H2 twice a week for three weeks. Detectable suppression of tumor growth by 4H2 was observed 15 days after initiation of treatment (p<0.01) (FIG. 2D).

Example 5: Synthesis of Nanoparticles with and without Surface Anti-Guanosine Autoantibody Materials and Methods Synthesis of PLGA-PLL PLGA-PLL was synthesized according to previously reported procedures (Zhou, et al., Biomaterials, 33(2):583-591 (2012), Han, et al., Nanomedicine (2016)). Briefly, PLGA (3 g, 50:50 PLGA Acid End Group; i.v. ~0.67 dL/g; Absorbable Polymers, AL) and 200 mg poly(ε-carbobenzoxyl-L-lysine) (PLL) (MW 1000-4000 Da, Sigma) were dissolved in 6 mL dimethlyformamide in a dry round-bottom flask under argon. Dicyclohexyl carbodiimide (58 mg) and 0.31 mg dimethylaminopyridine in 2 mL dimethlyformamide was added to the polymer solution and allowed to stir for 48 h. The reacted solution was diluted by the addition of chloroform and precipitated in methanol. The dried polymer was then re-dissolved in chloroform, precipitated in ether, and dried under vacuum for 24 h. To remove protection, dried protected product was dissolved in 10 mL hydrogen bromide, 30% wt in acetic acid and allowed to stir for 90 min for deprotection. The polymer was precipitated in ether and washed until the product changed from a yellow to an off-white appearance. The product was then dissolved in chloroform and precipitated in ether. The polymer was vacuum dried for 24 h to remove all traces of ether. Samples before and after deprotection were collected to confirm modification of the polymer and subsequent removal of protecting carbobenzoxyl groups. The samples were dissolved in trifluoroethanol and evaluated from 200 to 350 nm using spectroscopy (Cary 50 Bio UV-Vis Spectrophotometer, Varian, Palo Alto, CA).

4H2 Production and Thiolation

4H2 was produced by a hybridoma derived from the MRL/lpr lupus mouse model. Identity of the 4H2 was confirmed by SDS-PAGE and anti-IgG Western blot prior to conjugation to nanoparticles. Thiolation of 4H2 antibody was performed using Traut's agent. Briefly, 54 uL 4H2 solution (5 mg/ml) and 18 uL Traut's agent solution (10 mg/ml) were added to 1 ml PBS (pH 8.0 with 5 mM EDTA). The thiolation process took 1 hour by rotating the mixed solution on a horizontal shaker at room temperature.

Nanoparticles Synthesis

Loaded nanoparticles were synthesized according to the standard single emulsion procedure. For synthesis of DOX-NPs, 50 mg PLGA-PLL and 6.7 mg doxorubicin were dissolved in 2 mL ethyl acetate. The solution was then added dropwise to a solution of 2 ml 2.5% polyvinyl alcohol (PVA). The resulting emulsion was sonicated on ice 3 times for 10 seconds each. The emulsion was then poured into a beaker containing aqueous 0.3% (v/v) PVA and stirred at room temperature overnight to allow the EA to evaporate and the particles to harden. Particles were collected by centrifugation at 18000 rpm, 30 min, washed twice with water, frozen, and lyophilized. For synthesis of 4H2-NPs, the same emulsion procedures were used. After overnight evaporation, nanoparticles were collected and re-suspended in PBS containing NHS-PEG5000-Mal (8 mg, JenKem Technology). After a 30 minute reaction, extra NHS-PEG5000-Mal was removed by centrifuge (18000 rpm, 30 min). PEGylated nanoparticles were then re-suspended in PBS containing thiolated 4H2 (270 ug). Sixty minutes later, nanoparticles were collected by centrifugation at 18000 rpm, 30 min, washed twice with water, frozen, and lyophilized. Control NPs and 4H2-NPs were synthesized according to the same procedures but with or without 4H2, respectively.

Results

A strategy was developed for autocatalytic, tumor-targeted delivery of nanoparticles by 4H2. PLGA nanoparticles with surface conjugation of 4H2 were developed for guanosine and exDNA targeting. 4H2 can home nanoparticles to tumors, which contain a greater amount of extracellular guanosine and DNA than healthy tissue. The concentration of guanosine and exDNA in tumor environments can increase with time and delivery of cytotoxic therapy. Thereby, the efficiency of nanoparticle accumulation in tumors autocatalytically increases with time and subsequent treatments.

To test the ability of 4H2 to deliver nanoparticles to tumors IR780-loaded PLGA nanoparticles with surface-conjugated 4H2 (4H2-NPs) were synthesized. PLGA was first conjugated with poly(L-lysine) (PLL) and the resulting PLGA-PLL, which contains lysine groups for surface functionalization, was used as the starting material. Nanoparticles were synthesized through the standard single emulsion procedure and further modified with NHS-PEG-Mal to display maleimide groups for conjugation of thiolated 4H2. Controls included nanoparticles without surface conjugated 4H2 and were synthesized using the same procedures but without 4H2 conjugation.

Example 6: 4H2 Delivers Nanoparticles to the Cytoplasm of Cells

Materials and Methods

Nanoparticle Synthesis and Conjugation

IR780-loaded CTX-NPs were generated as previously described (Han, et al., *Nanomedicine*, 12:1833; 1842 (2016)). IR780-loaded 4H2-NPs were generated using PEG linkers as previously described for 3E10 (Chen, et al., *Oncotarget*, 7(37): 59965-59975 (2016)).

Nanoparticle Cell Penetration Assays

Live DLD1 colon cancer cells were treated with free NPs or 4H2-NPs (3 mg/mL) for thirty minutes and then visualized under a fluorescence microscope. After the live cells were visualized they were washed, fixed, and immunostained for 4H2 with the Alexa488-conjugated anti-mouse IgG antibody as previously described (Noble, et al. *Sci Rep*, 4:5958 (2014)). Cal12T cells were similarly treated with control buffer, free 4H2 antibody (0.5 mg/mL), free NPs (3 mg/mL), free 4H2 (0.5 mg/mL) mixed with free NPs (3 mg/mL), or 4H2-NPs (3 mg/mL) for 20 minutes and then visualized under a fluorescence microscope.

Results

Figure 3:
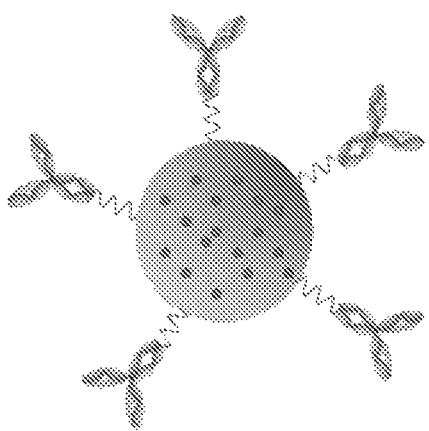
FIG. 3 is a illustration depicting antibody (e.g., 4H2) conjugated to the surface of particles (e.g., PLGA nanoparticles) by a linker (e.g., PEG). Dots represent internally encapsulated active agent (e.g., IR780 dye, drug, etc.).

3E10 is particularly useful as a nuclear delivery vehicle for therapeutic cargoes because its path into the nucleus avoids endosomes and lysosomes (Hansen, et al., *J Biol Chem.*, 282: 20790-20793 (2007)), whereas other cell-penetrating antibodies and protein transduction domains are limited by their need for endosome/lysosome escape before they can exert effects on cells. Based on the immunofluorescence co-localization studies, 4H2 appears to avoid becoming sequestered in endosomes/lysosomes, similar to 3E10. Consistent with this, Colburn reported in abstract form that 4H2 might penetrate cells through ENT2, similar to 3E10 (Andersen, et al., *Journal of Investigative Medicine* (2009)). While 3E10 is an excellent delivery vehicle for agents that need to be in the nucleus, 4H2 may have use as a vehicle for agents better suited to the cytoplasm. As a means to test this 4H2 antibodies were conjugated to the surface of poly(lactic-co-glycolic acid) (PLGA) nanoparticles (NPs) and then examined the ability of the 4H2-NPs to localize into the cytoplasm of live cells. A 4H2-NP schematic is shown in FIG. 3.

Both free and 4H2-conjugated NPs were encapsulated with IR780 fluorescent dye to allow their detection. DLD1 colon cancer cells were treated with free NPs or 4H2-NPs for thirty minutes, and then visualized under a fluorescence microscope. IR780 signal was detected in the cytoplasm of the cells treated with the 4H2-NPs, but not in the cells treated with the free nanoparticles. In addition, after the live cells were visualized they were washed, fixed, and immunostained for 4H2 with the Alexa488-conjugated anti-mouse IgG antibody. 4H2 was detected in the cells treated with the 4H2-conjugated nanoparticles, and its signal co-localized with the IR780 signal from the nanoparticles.

Next, to further confirm that 4H2 can deliver conjugated NPs to cells, Cal12T cells were treated with control buffer, free 4H2 antibody, free NPs, free 4H2 mixed with free NPs, or 4H2-NPs for 20 minutes and then visualized under a fluorescence microscope. Significant IR780 signal was only detected in the cytoplasm of cells treated with the 4H2-NPs. Taken together these data demonstrate minimal cellular uptake of free NPs and that surface conjugation of 4H2 facilitated NP delivery into the cytoplasm.

Example 7: 4H2-NPs Localize into Ischemic Brain in Stroke

Materials and Methods

Stroke Volume Localization Studies

Six male C57BL/6 mice were subjected to 60 min right middle cerebral artery occlusion (MCAO) by monofilament occlusion as previously described (Uemura, et al., Stroke, 22:1548-53 (1991)). Upon removal of the occlusion mice were treated with tail vein infusion of 2 mg of IR780-loaded CTX-NPs (N=3) or 4H2-NPs (N=3). Mice were sacrificed at 24, 48, or 72 hours post-treatment, and brains were excised and imaged by IVIS to detect the IR780-loaded NPs. At the 72-hour time point additional organs were also excised for imaging, including the liver, spleen, kidney, lungs, and heart. IVIS images were processed and radiance efficiency documented as previously described (Han, et al., Nanomedicine, 12:1833; 1842 (2016)).

3E10 (D31N) di-scFv

3E10 (D31N) di-scFv was produced in and purified from P. pastoris as previously described and illustrated below (SEQ ID NO:21) (Noble, et al., Cancer Research, 2015; 75(11):2285-2291). Purity and identity of the 3E10 (D31N) di-scFv isolated from P. pastoris supernatant was confirmed by SDS-PAGE and anti-Myc Western blot prior to conjugation to nanoparticles. Thiolation of 3E10 (D31N) di-scFv antibody was performed using Traut's agent. Briefly, 54 uL 3E10 solution (5 mg/ml) and 18 uL Traut's agent solution (10 mg/ml) were added to 1 ml PBS (pH 8.0 with 5 mM EDTA). The thiolation process took 1 hour by rotating the mixed solution on a horizontal shaker at room temperature.

```
                                              (SEQ ID NO: 21)
    1        10        20        30        40
AGIHDIVLTQSPASLAVSLGQRATISCRASKSVSTSSYSYMHWYQQKP 51        61        71        81        91
GQPPKLLIKYASYLESGVPARFSGSGSGTDFTLNIHPVEEEDAATYYC 101       111       121       131       141
QHSREFPWTFGGGTKLEIKRADAAPGGGGSGGGGSGGGGSEVQLVESG 151       161       171       181       191
GGLVKPGGSRKLSCAASGFTFSNYGMHWVRQAPEKGLEWVAYISSGSS 201       211       221       231
TIYYADTVKGRFTISRDNAKNTLFLQMTSLRSEDTAMYYCARRGLLLD 241       251       261       271       281
YWGQGTTLTVSSASTKGPSVFPLAPLESSGSDIVLTQSPASLAVSLGQ 291       302       312       322       332
RATISCRASKSVSTSSYSYMHWYQQKPGQPPKLLIKYASYLESGVPAR 342       352       362       372       382
FSGSGSGTDFTLNIHPVEEEDAATYYCQHSREFPWTFGGGTKLEIKRA 392       402       412       422
DAAPGGGGSGGGGSGGGGSEVQLVESGGGLVKPGGSRKLSCAASGFT 432       442       452       462       472
FSNYGMHWVRQAPEKGLEWVAYISSGSSTIYYADTVKGRFTISRDNA 482       492       502       512       522
KNTLFLQMTSLRSEDTAMYYCARRGLLLDYWGQGTTLTVSSLEQKLI

532
SEEDLNSAVDHHHHHH.
```

Results

Guanosine is a critical component of DNA and GTP/GDP inside cells, but in the extracellular environment it has important roles in regulation of central nervous system and renal function (Deutsch, et al., Eur Neuropsychopharmacol, 18:299-302 (2008); Rathbone, et al., Nucleosides Nucleotides Nucleic Acids, 27:666-72 (2008); Jackson, et al., Physiol Rep, 2(5). pii: e12028. doi: 10.14814/phy2.12028 (2014); Ahmed, et al., Hypertension, 50:958-63 (2007)). In addition, extracellular quantities of guanosine are focally increased at sites of ischemic brain during and after a stroke (Uemura, et al., Stroke, 22:1548-53 (1991)). Experiments were designed to test if 4H2 would be attracted to and might mediate delivery of conjugated NPs to ischemic brain, and potentially to the kidney as well. Surface conjugation of chlorotoxin (CTX) has previously been used to help target NPs to ischemic brain (Han, et al., Nanomedicine, 12:1833; 1842 (2016)), and CTX-NPs was used as a control for comparisons of delivery efficiency. Right-sided stroke was induced in six C57BL/6 mice by occlusion of the right middle cerebral artery for one hour. After reperfusion was established, mice were treated with tail vein infusion of 2 mg of CTX-NPs (N=3) or 4H2-NPs (N=3). Mice were then observed, and brains were excised at 24, 48, and 72 hours after treatment and analyzed by IVIS to detect IR780 signal. At 24 hours, both CTX-NPs and 4H2-NPs were detected in the region of ischemic brain, but the radiance efficiency of the IR780 signal from the 4H2-NPs was much greater compared to the CTX-NPs. This pattern was also observed at the 48 and 72-hour points (FIG. 5A).

Additional organs were excised and analyzed by IVIS at the 72-hour point, including liver, spleen, lungs, heart, and kidney. Aside from the ischemic brain, the greatest differential localization between the 4H2-NPs and CTX-NPs was observed in the kidneys. 4H2 appeared to increase NP distribution to the kidney.

Additional data is illustrated in FIG. 5B. No significant signal was detected in the brain stroke volume of mice treated with control NPs, but mice treated with 4H2-NPs showed significant IR780 signal in the region of stroke in the brain. Similarly, mice treated with 4H2-NPs showed significant IR780 signal in the region of stroke. The bar graph FIG. 5B compares the NP signal in the stroke region in mice treated with 4H2-NPs or 3E10 (D31N) di-scFv-NPs 4H2 proved capable of delivering NPs to the stroke volume even more effectively that 3E10 (D31N) di-scFv. These data demonstrate effective delivery of NPs to stroke volumes in brain by 4H2.

Example 8: 4H2-NPs Localize into Glioblastoma Brain Tumors

Materials and Methods

Glioblastoma Brain Tumor Localization Studies

Immunodeficient bearing orthotopic intracranial U87 glioblastoma tumors were treated with tail vein injections of control NPs or 4H2-conjugated NPs. NPs were loaded with IR780 for detection. 24 hours after injection the accumulation of NPs in the glioblastoma brain tumors was visualized by IVIS.

Results

Figure 5:
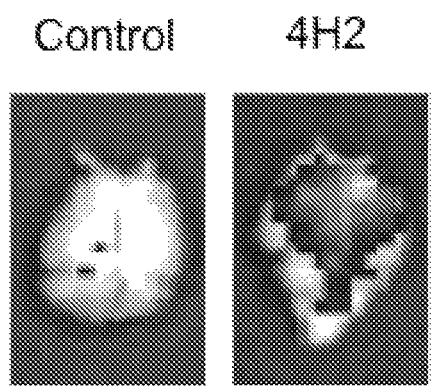
FIG. 5 is a pair of images of brains from mice with U87 glioblastoma brain tumors that have been imaged by IVIS to detect IR780 signal in nanoparticles. The control mouse image is from a mouse that was treated with control nanoparticles that were loaded with IR780 but lack surface 4H2. The 4H2 image is from a mouse that was treated with nanoparticles loaded with IR780 and that have surface conjugated 4H2. The IR780 signal is clearly detected in the mouse brain tumors treated with the 4H2-conjugated nanoparticles but not the mouse treated with control nanoparticles.

As shown in FIG. 5, no significant signal was detected in the brains of mice treated with control, but mice treated with 4H2-NPs showed significant IR780 signal in the brain tumors. These data demonstrate effective delivery of NPs to brain tumors by 4H2.

In the Examples above, 4H2 was shown to penetrate into the cytoplasm of living cells but did not directly localize to any specific organelle. Instead, 4H2 co-localizes with the G-protein K-Ras. Given that the known binding site on guanosine for 4H2 overlaps with the site Ras proteins use to bind GTP/GDP, the finding of an apparent co-localization of 4H2 and K-Ras may indicate competition for binding to cytoplasmic GTP/GDP. Furthermore, 4H2 catalyzes release of Pi from GTP, which indicates that it may deplete cells of their supply of GTP and thereby disrupt G-protein related signaling cascades. Such an effect might partly explain the reduction in cAMP and perturbation of cell signaling caused by 4H2 and the observed sensitivity of K-Ras addicted cancer cells and tumors to treatment with 4H2.

The results also show that 4H2 was not sequestered in endosomes or lysosomes. This makes 4H2 similar to 3E10 and distinguishes it from other cell-penetrating antibodies and peptides that depend on endosomal mechanisms of internalization (Molfetta, et al., *Front Immunol*, 5:449. Doi: 10.3389/fimmu.2014.00449 (2014); Dowdy, et al., *Expert Opin Drug Deliv*, 12:1627-36 (2015)). The findings are consistent with a previous abstract report indicating that 4H2 may use the same ENT pathway to penetrate cells that is used by 3E10 (Andersen, et al., *Journal of Investigative Medicine* (2009)). The ability to penetrate cells through a mechanism that avoids endosomes and lysosomes is a major advantage to the use of 3E10 as a delivery vehicle, but 3E10 is best suited to delivery of agents into the nucleus. The above-results indicate that 4H2 may have similar potential as a delivery vehicle that avoids endosomes and can deliver cargoes, such as nanoparticles, to the cytoplasm. This may afford opportunities to simultaneously deliver 4H2 and drug-loaded nanocarriers to maximize effects on K-Ras addicted and other tumor cells.

Beyond the potential applications in oncology, 4H2 showed improved targeting of NPs to ischemic brain compared to the previously reported CTX method. This is believed to be due to the strong attraction of 4H2 to increased amounts of extracellular guanosine released at the site of stroke (Uemura, et al., *Stroke*, 22:1548-53 (1991)). Similarly, 4H2-NPs showed increased renal localization relative to the CTX-NPs, which may also be due to attraction to the extracellular guanosine known to localize at the kidneys and regulate renal function (Jackson, et al., *Physiol Rep*, 2(5). pii: e12028. doi: 10.14814/phy2.12028 (2014), Shin, et al., *Arch Pharm Res*, 31: 347-53 (2008)). These findings reveal the potential to use 4H2 to deliver drug-loaded NPs to ischemic brain and potentially to kidneys, which may have relevance to the treatment of stroke and renal injury or disease.

The 4H2 hybridoma produces small amounts of 4H2 antibody. It is possible that the 4H2 antibody itself is toxic to its own hybridoma cells, and this may explain the comparatively low yield of 4H2 relative to 3E10 produced by a similar hybridoma. In addition, Colburn and Green previously reported that 4H2 appeared to associate with mitochondria in Htori-3-LLU thyroid epithelial cells (Colburn, et al., *Clin Chim Acta*, 370: 9-16 (2006)). The experiment described above show an overlap of 4H2 and mitochondria signals using FITC and MitoTracker, but direct co-localization was not confirmed. Furthermore, immunofluorescence studies of 4H2 signal did not directly co-localize with the COX IV mitochondrial immunostain. These differences may be in part related to the type of cell being tested and microscopy technique.

The Examples above demonstrate a tumor-targeting mechanism for systemic delivery of nanoparticles to tumors that takes advantage of guanosine and exDNA in the tumor environment. 4H2 was utilized as the targeting ligand for guanosine and exDNA, and the results show that 4H2 mediates efficient delivery of nanoparticles to tumors and to ischemic brain in a stroke model.

In conclusion, nanomedicine has the potential to make major contributions to clinical cancer care. In addition, select lupus anti-DNA autoantibodies have emerged as possible new agents for use in cancer therapy due in part to their affinity for DNA and components thereof, such as guanosine.

The Examples above also demonstrate a cytoplasmic delivery vehicle that takes advantage of the ability of 4H2 to penetrate into cell cytoplasm without localizing into endosomes or lysosomes.

Example 6: Cloning of an Exemplary 4H2 scFv

Materials and Methods

Sequence Design:
Annotation for SEQ ID NO:22:
Single underlining: 4H2 VL sequence
Double underlining: linker sequence
Dashed underlining: 4H2 VH sequence
Wavy underlining: His$_6$ tag (SEQ ID NO: 22)
DIVLTQSPATLSVTPGDRVSLSCRASQSISNYLHWYQQKSHESPRLLI

KYASQSISGIPSRFSGSGSGTDFTLSIISVETEDFGMYFCQQSNSWPLTF

GAGTKLELKADAAPGGGGSGGGGSGGGGSEVQLQQSGPELVKPGAS

VKMSCKASGYTFTDYYMNWVKQSHGKSLEWIGRVNPSNGGISYNQ

KFKGKATLTVDKSLSTAYMQLNSLTSEDSAVYYCARGPYTMYYF

GQGTSVTVSSHHHHHH.

Cloning Strategy
Orientation and annotation for SEQ ID NOS:23 and 24:

```
EcoRI (no underlining)-Kozak sequence (dotted underlining)-Artifical
Signal

Peptide (italics, no underlining)-Light chain (mouse) (single underline)-
linker (double underlining)-Heavy chain (mouse) (dashed underlining)-His*6 tag (wavy underlining)-stop (TAG - no underlining)-HindIII (no underlining)
Protein Sequence (268aa)
```
(SEQ ID NO: 23)

MGWSCHLFLVATATGVHSDIVLTQSPATLSVTPGDRVSLSCRASQSISN

YLHWYQQKSHESPRLLIKYASQSISGIPSRFSGSGSGTDFTLSIISVETE

DFGMYFCQQSNSWPLTFGAGTKLELKADAAPGGGGSGGGGSGGGG

SEVQLQQSGPELVKPGASVKMSCKASGYTFTDYYMNWVKQSHGKS

LEWIGRVNPSNGGISYNQKFKGKATLTVDKSLSTAYMQLNSLTSEDS

AVYYCARGPYTMYYWGQGTSVTVSSHHHHHH

Nucleic Acid Sequence (831 bp)

(SEQ ID NO: 24)

GAATTCCCGCCGCCACCATGGGCTGGTCCTGCATCATTCTGTTTCTG

GTGGCCACAGCCACCGGCGTGCACTCTGATATTGTGCTGACACAGA

GCCCCGCCACACTGTCTGTTACCCCTGGCGATAGAGTGTCCCTGA

GCTGTAGAGCCAGCCAGAGCATCAGCAACTACCTGCACTGGTATC

AGCAGAAGTCCCACGAGAGCCCCAGACTGCTGATTAAGTACGCC

AGCCAGTCTATCAGCGGCATCCCCAGCAGATTTTCTGGCAGCGGC

TCTGGCACCGACTTCACCCTGTCTATCATCAGCGTGGAAACCGAG

GACTTCGGGATGTACTTCTGCCAGCAGTCCAACAGCTGGCCCCTG

ACATTTGGCGCCGGAACAAAGCTGGAACTGAAGGCCGATGCTGCT

CCTGGTGGCGGAGGATCTGGCGGAGGTGGAAGCGGCGGAGGCGG

ATCTGAAGTTCAGCTGCAGCAAAGCGGACCCGAGCTGGTTAAGCC

TGGCGCCTCTGTGAAGATGAGCTGCAAGGCCAGCGGCTACACCTT

CACCGACTACTACATGAACTGGGTCAAGCAGAGCCACGGCAAGA

GCCTGGAATGGATCGGCAGAGTGAACCCCAGCAATGGCGGCATC

AGCTACAACCAGAAGTTCAAGGGCAAAGCCACACTGACCGTGGA

TAAGAGCCTGAGCACCGCCTACATGCAGCTCAACAGCCTGACCAG

CGAGGACAGCGCCGTGTACTATTGTGCCAGAGGACCCTACACCAT

GTACTACTGGGGCCAGGGCACAAGCGTGACCGTGTCTAGCCACCA

CCACCATCACCACTGATAAGCTT.

Expression Strategy
Plasmid Preparation:
1) Transfection grade plasmid was maxi-prepared for ExpiCHO-S cell expression.
Cell Culture and Transient Transfection:
ExpiCHO-S Cell Line
1) ExpiCHO-S cells were grown in serum-free ExpiCHO™ Expression Medium (Thermo Fisher Scientific). 2) The cells were maintained in Erlenmeyer Flasks (Corning Inc.) at 37° C. with 8% CO2 on an orbital shaker (VWR Scientific). 3) One day before transfection, the cells were seeded at an appropriate density in Corning Erlenmeyer Flasks. 4) On the day of transfection, DNA and transfection reagent were mixed at an optimal ratio and then added into the flask with cells ready for transfection. 5) The recombinant plasmid encoding target protein were transiently transfected into suspension ExpiCHO-S cell cultures. The cell culture supernatant collected on day 14 post-transfection was used for purification.
Purification and Analysis:
1) Cell culture broth was centrifuged. 2) Cell culture supernatant was loaded onto affinity purification column at an appropriate flowrate. 3) After washing and elution with appropriate buffer, the eluted fractions were pooled and buffer exchanged to final formulation buffer. 4) The purified protein was analyzed by SDS-PAGE, Western blotting analysis for molecular weight and purity measurements. 5) The concentration was determined by Bradford assay with BSA as a standard.

Results

Expression results evaluated showed successful production of 4H2 scFv at correct molecular weight (SDS-PAGE) and that stains on Western blot for C-terminal His6 tag.

Example 6: 4H2 scFv Penetrates Cells

DLD1 colon cancer cells were treated with control buffer or 4H2 scFv (6 μM) for one hour, and then washed, fixed, and probed with protein L (1:1000 of 0.5 mg/mL stock) for one hour, washed again, and probed with an anti-protein L antibody for one hour, washed again, and then probed with an alkaline phosphatase conjugated secondary antibody for one hour, and then washed and incubated with NBT/BCIP for stain development.

The results demonstrated cell-penetrating activity of 4H2 scFv.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A nanocarrier comprising a nanoparticle comprising a targeting moiety conjugated or linked to the outer surface thereof and a cytotoxic agent encapsulated therein,
    wherein the targeting moiety consists of an effective amount of a plurality of molecules of an antibody that binds to extracellular guanosine to increase localization of the nanocarrier to extracellular guanosine relative to the same nanocarrier in the absence of the targeting moiety,
    wherein the nanocarrier is free from unconjugated antibody, and
    wherein the nanocarrier creates a positive feedback loop that stimulates increased localization of the nanocarrier to the extracellular guanosine over time in vivo when administered to subject.

2. The nanocarrier of claim 1, wherein the antibody is an intact immunoglobulin, or a mono-, di-, or tri-valent or multivalent single chain variable fragment (scFv), an Fab, F(ab')$_2$, minibody, scFv-Fc, diabody, triabody, or tetrabody derived therefrom that comprises the complementarity-determining regions of the intact immunoglobulin and binds to guanosine.

3. The nanocarrier of claim 1, wherein the antibody comprises a heavy chain comprising the three complementarity-determining regions (CDR) of SEQ ID NO:5, and a light chain comprising the three CDR of SEQ ID NO:1.

4. The nanocarrier of claim 3, wherein the antibody is a mono-, di-, or tri-valent or multivalent single chain variable fragment (scFv), an Fab, F(ab')$_2$, minibody, scFv-Fc, diabody, triabody, or tetrabody.

5. The nanocarrier of claim 1, wherein the antibody comprises
    (i) a heavy chain comprising the three complementarity-determining regions (CDR) of SEQ ID NO:5, and a light chain comprising the three CDR of SEQ ID NO:1; or
    (ii) a heavy chain comprising the amino acid sequence from SEQ ID NO: 5, and a light chain comprising the amino acid sequence of SEQ ID NO:1; or
    (iii) the scFv of SEQ ID NO:22.

6. The nanocarrier of claim 1, wherein the nanoparticle is selected from the group consisting of polymeric nanoparticle, liposome, and multilamellar vesicle.

7. The nanocarrier of claim 6, wherein the nanoparticle is a polymeric nanoparticle.

8. The nanocarrier of claim 1, further comprising one or more active agents encapsulated therein.

9. A pharmaceutical composition comprising an effective amount of the nanocarrier of claim 1.

10. A method of detecting site or sites of cancer, tissue damage, injury, or ischemia comprising administering to a subject in need thereof an effective amount of the pharmaceutical composition of claim 9, wherein the one or more active agents is an agent that is detectable using diagnostic imaging or nuclear medicine techniques.

11. A cytoplasmic molecular delivery vehicle consisting of an antibody that binds guanosine comprising a heavy chain comprising the three complementarity-determining regions (CDR) of SEQ ID NO:5, and a light chain comprising the three CDR of SEQ ID NO: 1 linked to a cargo,
    wherein the delivery vehicle can deliver the cargo into the cytoplasm of cells and avoid localization to endosomes or lysosomes.

12. The delivery vehicle of claim 11, wherein the antibody is a mono-, di-, or tri-valent or multivalent single chain variable fragment (scFv), an Fab, F(ab')$_2$, minibody, scFv-Fc, diabody, triabody, or tetrabody.

13. A pharmaceutical composition comprising an effective amount of the delivery vehicle of claim 11.

14. A method of detecting site or sites of cancer, tissue damage, injury, or ischemia comprising administering to a subject in need thereof an effective amount of the pharmaceutical composition of claim 13, wherein the cargo is an agent that is detectable using diagnostic imaging or nuclear medicine techniques.

15. A single chain variable fragment comprising the amino acid sequence of SEQ ID NO:22.

16. The nanocarrier of claim 8, wherein the cytotoxic agent is a chemotherapeutic agent.

17. The nanocarrier of claim 8, wherein the cytotoxic agent is a radiosensitizer.

18. The nanocarrier of claim 5, wherein the nanocarrier can cross the blood-brain-barrier (BBB) following systemic administration to a mammalian subject.

19. A polymeric nanoparticle comprising poly(lactic-co-glycolic acid)-poly(ε-carbobenzoxyl-L-lysine) (PLGA-PLL) and an antibody comprising a heavy chain comprising the three complementarity-determining regions (CDR) of SEQ ID NO:5, and a light chain comprising the three CDR of SEQ ID NO:1 conjugated to PLL and displayed on the exterior of the nanoparticle.

20. The polymeric nanoparticle of claim 19 comprising an active agent encapsulated therein.

* * * * *